(12) United States Patent
Fuhler et al.

(10) Patent No.: US 8,166,450 B2
(45) Date of Patent: Apr. 24, 2012

(54) METHODS AND APPARATUS FOR COMPILING INSTRUCTIONS FOR A DATA PROCESSOR

(75) Inventors: Richard A. Fuhler, Santa Cruz, CA (US); Thomas J. Pennello, Santa Cruz, CA (US); Michael Lee Jalkut, Santa Cruz, CA (US); Peter Warnes, London (GB)

(73) Assignee: Synopsys, Inc., Mountain View, CA (US)

( * ) Notice: Subject to any disclaimer, the term of this patent is extended or adjusted under 35 U.S.C. 154(b) by 989 days.

(21) Appl. No.: 11/906,519

(22) Filed: Oct. 1, 2007

(65) Prior Publication Data

US 2008/0320246 A1    Dec. 25, 2008

Related U.S. Application Data

(62) Division of application No. 10/330,632, filed on Dec. 26, 2002, now Pat. No. 7,278,137.

(60) Provisional application No. 60/343,730, filed on Dec. 26, 2001.

(51) Int. Cl.
*G06F 9/44* (2006.01)
*G06F 9/45* (2006.01)

(52) U.S. Cl. ............... 717/101; 717/140; 717/146

(58) Field of Classification Search ............... 717/101, 717/140, 146
See application file for complete search history.

(56) References Cited

U.S. PATENT DOCUMENTS

| | | |
|---|---|---|
| 4,571,678 A | 2/1986 | Chaitin |
| 4,763,242 A | 8/1988 | Lee et al. |
| 4,827,427 A | 5/1989 | Hyduke |
| 4,956,800 A | 9/1990 | Kametani |
| 4,965,724 A | 10/1990 | Utsumi et al. |
| 5,088,034 A | 2/1992 | Ihara et al. |
| 5,105,353 A | 4/1992 | Charles et al. |
| 5,247,668 A | 9/1993 | Smith et al. |
| 5,249,295 A | 9/1993 | Briggs et al. |
| 5,274,818 A | 12/1993 | Vasilevsky et al. |

(Continued)

FOREIGN PATENT DOCUMENTS

WO    WO 03/091914 A1    11/2003

OTHER PUBLICATIONS

G. J. Chaitin, "Register Allocation $ Spilling Via Graph Coloring", 1982 ACM 0-89791-074-5/82/006/0098.*

(Continued)

*Primary Examiner* — Philip Wang
(74) *Attorney, Agent, or Firm* — Fenwick & West LLP

(57) ABSTRACT

Methods and apparatus optimized for compiling instructions in a data processor are disclosed. In one aspect, a method of address calculation is disclosed, comprising operating a compiler to generate at least one instruction; canonicalizing the address calculation in a plurality of different approaches: in one exemplary embodiment, the first approach comprises canonicalizing the "regular" 32-bit instruction addressing modes, and the second for the "compressed" 16-bit instruction addressing modes. In another aspect, a plurality of functions (up to and including all available functions) are called indirectly to allow addresses to be placed in a constant pool. Improved methods for instruction selection, register allocation and spilling, and instruction compression are provided. An improved SoC integrated circuit device having an optimized 32-bit/16-bit processor core implementing at least one of the foregoing improvements is also disclosed.

20 Claims, 8 Drawing Sheets

U.S. PATENT DOCUMENTS

| | | | |
|---|---|---|---|
| 5,287,510 | A | 2/1994 | Hall et al. |
| 5,293,631 | A | 3/1994 | Rau et al. |
| 5,339,424 | A | 8/1994 | Fushimi |
| 5,428,793 | A | 6/1995 | Odnert et al. |
| 5,448,746 | A | 9/1995 | Eickemeyer et al. |
| 5,450,585 | A | 9/1995 | Johnson |
| 5,481,723 | A | 1/1996 | Harris et al. |
| 5,488,710 | A | 1/1996 | Sato et al. |
| 5,546,552 | A | 8/1996 | Coon et al. |
| 5,555,417 | A | 9/1996 | Odnert et al. |
| 5,586,020 | A | 12/1996 | Isozaki |
| 5,636,352 | A | 6/1997 | Bealkowski et al. |
| 5,638,525 | A | 6/1997 | Hammond et al. |
| 5,659,754 | A * | 8/1997 | Grove et al. ............... 717/158 |
| 5,740,461 | A | 4/1998 | Jaggar |
| 5,752,035 | A * | 5/1998 | Trimberger ............... 717/153 |
| 5,790,854 | A | 8/1998 | Spielman et al. |
| 5,790,877 | A | 8/1998 | Nishiyama et al. |
| 5,794,010 | A | 8/1998 | Worrell et al. |
| 5,809,272 | A | 9/1998 | Thusoo et al. |
| 5,809,306 | A | 9/1998 | Suzuki et al. |
| 5,819,058 | A | 10/1998 | Miller et al. |
| 5,828,884 | A | 10/1998 | Lee et al. |
| 5,828,886 | A * | 10/1998 | Hayashi ............... 717/159 |
| 5,845,127 | A | 12/1998 | Isozaki |
| 5,850,551 | A | 12/1998 | Takayama et al. |
| 5,864,704 | A | 1/1999 | Battle et al. |
| 5,867,681 | A | 2/1999 | Worrell et al. |
| 5,870,576 | A | 2/1999 | Faraboschi et al. |
| 5,878,267 | A | 3/1999 | Hampapuram et al. |
| 5,881,260 | A | 3/1999 | Raje et al. |
| 5,884,057 | A | 3/1999 | Blomgren et al. |
| 5,896,519 | A | 4/1999 | Worrell |
| 5,905,893 | A | 5/1999 | Worrell |
| 5,946,491 | A | 8/1999 | Aizikowitz et al. |
| 5,946,492 | A | 8/1999 | Bates |
| 5,948,100 | A | 9/1999 | Hsu et al. |
| 5,961,632 | A | 10/1999 | Shiell et al. |
| 6,090,156 | A | 7/2000 | MacLeod |
| 6,158,046 | A | 12/2000 | Yoshida et al. |
| 6,209,079 | B1 | 3/2001 | Otani et al. |
| 6,260,189 | B1 | 7/2001 | Batten et al. |
| 6,275,830 | B1 | 8/2001 | Muthukkaruppan et al. |
| 6,282,633 | B1 | 8/2001 | Killian et al. |
| 6,292,940 | B1 | 9/2001 | Sato |
| 6,305,013 | B1 | 10/2001 | Miyamoto |
| 6,308,323 | B1 | 10/2001 | Douniwa |
| 6,334,212 | B1 | 12/2001 | Nakajima |
| 6,367,071 | B1 | 4/2002 | Cao et al. |
| 6,408,382 | B1 | 6/2002 | Pechanek et al. |
| 6,412,066 | B2 | 6/2002 | Worrell et al. |
| 6,425,070 | B1 | 7/2002 | Zou et al. |
| 6,463,520 | B1 | 10/2002 | Otani et al. |
| 6,463,581 | B1 | 10/2002 | Bacon et al. |
| 6,477,683 | B1 | 11/2002 | Killian et al. |
| 6,477,697 | B1 | 11/2002 | Killian et al. |
| 6,564,314 | B1 | 5/2003 | May et al. |
| 6,678,818 | B1 | 1/2004 | Cofler et al. |
| 6,694,511 | B1 | 2/2004 | Yokote |
| 6,701,515 | B1 | 3/2004 | Wilson et al. |
| 6,732,238 | B1 | 5/2004 | Evans et al. |
| 6,760,888 | B2 | 7/2004 | Killian et al. |
| 6,763,327 | B1 | 7/2004 | Songer et al. |
| 6,826,681 | B2 * | 11/2004 | Kissell et al. ............... 712/228 |
| 6,862,563 | B1 | 3/2005 | Hakewill et al. |
| 6,889,313 | B1 | 5/2005 | Cofler et al. |
| 7,103,881 | B2 | 9/2006 | Stone |
| 7,120,903 | B2 | 10/2006 | Toi et al. |
| 7,140,008 | B2 | 11/2006 | Chilimbi et al. |
| 7,203,935 | B2 | 4/2007 | Chakradhar et al. |
| 7,278,137 | B1 | 10/2007 | Fuhler et al. |
| 7,558,462 | B2 | 7/2009 | Kurita |
| 2001/0013093 | A1 * | 8/2001 | Banno et al. ............... 712/210 |
| 2002/0004897 | A1 | 1/2002 | Kao et al. |
| 2002/0073299 | A1 | 6/2002 | Pechanek et al. |
| 2002/0073407 | A1 | 6/2002 | Takayama et al. |
| 2002/0116603 | A1 | 8/2002 | Kissell |
| 2003/0140337 | A1 | 7/2003 | Aubury |
| 2003/0225998 | A1 | 12/2003 | Khan et al. |

OTHER PUBLICATIONS

Intel Pentium Processor Family Developer's Manual—vol. 3: Architecture and Programming Manual (1995) (cover pages, pp. 3-15 to 3-18, pp. 25-189 to 25-192).

Article entitled "The JCN Embedded Processor" by AT&T Laboratories Cambridge (modified Jun. 6, 2002, © 2001) (3 pages) (http://www.uk.research.att.com/jen/).

The History of Language Technology in IBM by F.E. Allen, IBM J. Res. Develop., vol. 25, No. 5, Sep. 1981, pp. 535-548.

Heads and Tails: A Variable-Length Instruction Format Supporting Parallel Fetch and Decode by Heidi Pan and Krste Asanovic, Nov. 16-17, 2001, 8 pages.

SilAria Puts the Squeeze on Code With Tuned Instruction Set by Chris Edwards, EE Times, 2 pages, Oct. 17, 2001, http://www.eetuk.com/tech/news/OEG20011017S0018.

"An Introduction to Thumb", Version 2.0, Mar. 1995.

The Evolution of RISC Technology at IBM by John Cocke and V. Markstein, IBM J. Res. Develop. vol. 34, No. 1, Jan. 1990, pp. 4-11.

Improving Register Allocation for Subscripted Variables by David Callahan, Steve Carr and Ken Kennedy, copyright 2003, 2 pages.

"TriCore 1.3, Architecture Overview Handbook", V1.3.3, May 2002.

"Embedded Control Problems, Thumb, and the ARM7TDMI"; Segas, et al.; 1995; IEEE.

Xtensa: A Configurable and Extensible Processor; Gonzalez; 2000; IEEE.

An Overview of the PL.8 Compiler by M. Auslander and M. Hopkins, IBM T.J. Watson Research Center, 1982, pp. 22-31.

IEEE Std. 1076.3-1997 IEEE Standard VHDL Synthesis Packages—Description, Abstract only, copyright 2004, 2 pages.

Global Optimization by Suppression of Partial Redundancies by E. Morel and C. Renvoise, CII Honeywell Bull, Communications of the ACM, Feb. 1979, vol. 22, No. 2, pp. 96-103.

The 801 Minicomputer by George Radin, IBM J. Res. Develop. vol. 44 No. 1/2 Jan./Mar. 2000, pp. 37-46.

The GNU 64-bit PL8 Compiler: Toward an Open Standard Environment for Firmware Development by W. Gellerich, et al., IBM J. Res. & Dev. vol. 48 No. 3/4 May/Jul. 2004, pp. 543-556.

Motorola Product Brief MCF5202 Embedded Microprocessor, 1996 Motorola, Inc., 6 pages.

PICO: Automatically Designing Custom Computers by Vinod Kathail, et al., Hewlett-Packard Laboratories, Sep. 2002, 17 pages, http://www.hpl.hp.com/research/papers/2002/pico.pdf.

High Performance, Variable-Length Instruction Encodings by Heidi Pan, submitted to the Dept. of Electrical Engineering and Computer Science, Mass. Instit. of Technology, May 2002, 53 pages.

Drinic, et al, "Code Optimization for Code Compression", IEEE, pp. 315-324, 2003.

Ozturk et al, "Access Pattern-Based Code Compression for Memory-Constrained Systems", ACM Transactions on Design Automation of Electronic Systems, vol. 13, No. 4, Article 62; pp. 60:1-60:30, Sep. 2008.

Ozturk, et al, "Access Pattern-Based Code Compression for Memory-Constrained Embedded Systems", IEEE, Proceedings of the Design, Automation and Test in Europe Conference and Exhibition (DATE'05), pp. 1-6, 2005.

Ros, et al, "A Post-Compilation Register Reassignment Technique for Improving Hamming Distance Code Compression", CASES'05, ACM, pp. 97-104, Sep. 24-27, 2005.

Avaz Product Information Sheets on Mozart2 Fully Synthesizable DSP Core, 2 pages, [Online] [Retrieved on Jun. 30, 2003] Retrieved from the Internet<URL:http://www.avaz.com/products/cores/dspcore/mozart2/>.

Chaitin, G., "Register Allocation and Spilling Via Graph Coloring," Best of PLI 1979-1999, ACM SIGPLAN, 1982, pp. 66-74.

Collin, M. et al., "Low Power Instruction Fetch Using Profiled Variable Length Instructions," Dept. of Microelectronics and Information Technology, 2003 Proceedings of the IEEE International Systems-on-Chip Conference, Sep. 17-20, 2003, 17 pages.

Intel 80386 Programmer's Reference Manual—Section 17.1, "17.1 Operand-Size and Address-Size Attributes," [Online] [Retrieved on Jun. 30, 2003] Retrieved from the Internet<URL:http://webster.cs.ucr.edu>.

Krishna, R. et al. "Efficient Software Decoder Design," Advanced Computer Architecture Laboratory, IEEE Computer Society Technical, 2001, 10 pages.

Liao, S. et al., "Storage Assignment to Decrease Code Size," ACM Transactions on Programming Languages and Systems, May 1996, pp. 235-253, vol. 18, No. 3.

Omondi, A.R. "The Microarchitecture of Pipelined and Superscalar Computers" 1999, pp. 98-99, Kluwer Academic Publishers Boston.

Richardson, N. et al., "Chapter 16—The iCore™ 520MHz Synthesizable CPU Code," Closing the Gap Between ASIC & Custom, 2004, pp. 361-381, Part 3.

Slechta, B. et al., "Dynamic Optimization of Micro-Operations," Center for Reliable and High-Performance Computing, Dept. of Electrical and Computer Engineering, Univ. of Illinois at Urbana-Champaign, The Ninth International Symposium on High Performance Computer Architecture (HPCA'03), Feb. 8-12, 2003, 12 pages.

* cited by examiner

METHODS AND APPARATUS FOR COMPILING INSTRUCTIONS FOR A DATA PROCESSOR

This application is a divisional of U.S. application Ser. No. 10/330,632, filed Dec. 26, 2002 now U.S. Pat. No. 7,278,137 and claims priority benefit of U.S. provisional patent application Ser. No. 60/343,730 filed Dec. 26, 2001 and entitled "Methods and Apparatus for Compiling Instructions for a Data Processor" both of which are incorporated herein by reference in their entirety.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates generally to the field of data processors, and specifically to methods and apparatus for compiling computer programs into machine-readable form.

2. Description of Related Technology

As is well known in the computer programming arts, a compiler is an entity which complies or translates high level programming languages (such as C, C++, etc.) into a assembly language or machine readable form for use by a digital processor. A variety of different configurations of and approaches to digital processor code compilers in general are known in the prior art. A treatise on the early development of compilers and other language processing systems is contained in "The History of Language Processor Technology in IBM," by F. E. Allen in the IBM Journal of Research and Development, Vol. 25, No. 5, September 1981, pages 535-548.

Compiler Approaches Generally

Exemplary prior art compiler approaches are now described.

U.S. Pat. No. 6,367,071 to Cao, et al. issued Apr. 2, 2002 entitled "Compiler optimization techniques for exploiting a zero overhead loop mechanism" discloses a compiler loop optimization techniques to take advantage of a zero overhead loop mechanism (ZOLM) in a processor, e.g., a ZOLM in the form of a zero overhead loop buffer (ZOLB). A compiler generates a first set of code, and then applies optimizations to the first set of code so as to generate a second set of code configured to operate efficiently with the ZOLB. The optimizations are designed to increase the number of loops of the first set of code that can be accommodated in the ZOLB, to further reduce the overhead of the loops placed in the ZOLB, and to eliminate redundant loading of the ZOLB. Optimizations for increasing the number of loops that can be accommodated in the ZOLB include, e.g., conditional instructions, loop splitting and function inlining. Optimizations for further reductions in loop overhead include, e.g., loop collapsing and loop interchange. Data flow analysis and loop peeling is disclosed to avoid redundant loading of the ZOLB.

U.S. Pat. No. 6,308,323 to Douniwa issued Oct. 23, 2001 entitled "Apparatus and method for compiling a plurality of instruction sets for a processor and a media for recording the compiling method" discloses compiling a source program for a processor having a plurality of different instruction sets at high speed by selecting an optimum instruction set. The compiling method comprises dividing a source program into a plurality of modules according to a predetermined unit, compiling the respective modules with respective ones of the plurality of different instruction sets, providing data for evaluating an efficient compiling process based upon the module compilations with the respective instruction sets, selecting an optimum instruction set among the plurality of different instruction sets by comparing the evaluation data, and inserting an instruction set changing command at a necessary portion for changing the instruction set.

U.S. Pat. No. 6,305,013 to Miyamoto issued Oct. 16, 2001 entitled "Compiling method for generating target program in accordance with target processor type, compiling device, recording medium with compiling program recorded therein and recording medium with conversion table used in compiling recorded therein" discloses a compiling method of generating a code of a target program operable in a desired target processor, in which an amount of operations required for the code generation is reduced. Specifically, a code generating section comprises a first converting section and a second converting section. The first converting section refers to a first conversion table stored in a first storage device to generate a low-level code from a high-level code, while the second converting section refers to a second conversion table stored in a second storage device to generate an output code from the low-level code. In the second conversion table, output codes indicating the same or similar function are associated to the common low-level code.

U.S. Pat. No. 6,260,189 to Batten, et al. issued Jul. 10, 2001 entitled "Compiler-controlled dynamic instruction dispatch in pipelined processors" discloses techniques for improving the performance of pipelined processors by eliminating unnecessary stalling of instructions. In an illustrative embodiment, a compiler is used to identify pipeline dependencies in a given set of instructions. The compiler then groups the set of instructions into a code block having a field which indicates the types of pipeline dependencies, if any, in the set of instructions. The field may indicate the types of pipeline dependencies by specifying which of a predetermined set of hazards arise in the plurality of instructions when executed on a given pipelined processor. For example, the field may indicate whether the code block includes any Read After Write (RAW) hazards, Write After Write (WAW) hazards or Write After Read (WAR) hazards. The code block may include one or more dynamic scheduling instructions, with each of the dynamic scheduling instructions including a set of instructions for execution in a multi-issue processor.

U.S. Pat. No. 5,946,492 to Bates issued Aug. 31, 1999 entitled "Compiler that reduces call stack size through identification of stackless variables" discloses an optimizing compiler to identify what are referred to herein as stackless variables. A variable is said to be stackless for a given call statement if the calling program does not have a need for the information stored in the variable when the calling program resumes execution after the program that is the subject of the call statement returns control of the processor to the calling program. The decision of whether a variable is stackless or not for a given call statement is made by determining whether the live range of the particular variable spans the location of the call statement in question. If a variable's live range is found to cross the location of the call statement, it is not considered stackless. However, if a variable's live range is not found to cross the location of the call statement, it is considered to be stackless for that particular call statement U.S. Pat. No. 5,850,551 to Takayama, et al. issued Dec. 15, 1998 entitled "Compiler and processor for processing loops at high speed" discloses a compiler comprising a loop detecting unit for extracting information of loops, and a high-speed loop applying unit generating a first loop exclusive instruction, placing the instruction immediately before the entry of a loop, generating second loop exclusive instructions, and placing the instruction at each place to branch to the entry of the loop. Application in the context of variable length instructions is also disclosed.

U.S. Pat. No. 5,845,127 to Isozaki issued Dec. 1, 1998 entitled "Language processor and language processing method to generate object programs by compiling source programs" discloses a language processor for source program compiling and object file generation having a function call counter section to count the number of calls for each function during syntax analysis, a function data storage section to store the call count for each function counted by the function call counter section and the code size of each code for each function generated according to the source program analysis results, and a specific space function designation section which refers to the call count and the code size for each function stored in said function data storage section and designates the functions to be placed in the specific area held by the microcomputer in the program space so that the total sum of the function code sizes does not become larger than the size of the specific area with placing priority to the functions with many calls.

U.S. Pat. No. 5,828,884 to Lee, et al. issued Oct. 27, 1998 entitled "Method for compiling a software program and executing on a system which converts data between different endian formats" discloses a method for compiling a software program and executing the program on a data processing system which performs conversion between data formatted in differing endian formats, namely big-endian and little-endian formats, also known as byte swapping. The disclosed compiler generates object offsets to data elements in a source code module, then adds a format base to the object offset to calculate a data aperture offset for each data element, which is then stored in an object code module. The format bases for the data elements are chosen according to the data type of the data element. A base memory address is bound to each data element at runtime, load-time or compile time. The base memory address for each data element is added to the data aperture offset for the data element to calculate a data aperture address for the data element. As the processor executes the program and performs a transfer of a data element between the processor and data storage device, the processor provides the data aperture address of the data element to the byte swapping device. The byte swapping device selectively byte swaps the data element during the transfer according to a relationship between the data aperture address and the data conversion apertures. The compiler generates data conversion aperture values and the processor programs the data conversion aperture values into aperture storage elements in the byte swapping device when loading the program into system memory for execution. The data conversion apertures are chosen based upon the set of data types comprised by the data elements, namely data types which require byte swapping and data types which do not.

U.S. Pat. No. 5,790,877 to Nishiyama, et al. issued Aug. 4, 1998 entitled "Method for controlling a processor for power-saving in a computer for executing a program, compiler medium and processor system" discloses in a processor system including a plurality of hardware resources, a method for arranging a program to suppress the power consumption by the resources includes the steps of determining which ones of the hardware resources are to be operated and from which instruction cycle to which instruction cycle to execute each instruction of the program; and based on the determination, adding an instruction to lower frequencies of clock signals inputted to the hardware resources and an instruction to restore the frequency at positions adjacent to the beginning and the end of the period during which the hardware resources are not operated and compiling the program. The processor system decodes the compiled program and lowers the frequency of the clock signal inputted to the hardware resources in accordance with the frequency lowering instruction and the frequency restoring instruction detected in the decoding step. The clock signals sent to the hardware resources are stopped by the frequency lowering instruction to the resource of the hardware resources for which the clock frequency may be lowered to zero.

U.S. Pat. No. 5,790,854 to Spielman, et al. issued Aug. 4, 1998 entitled "Efficient stack utilization for compiling and executing nested if-else constructs in a vector data processing system" discloses a computer-implemented method is provided for compiling software code that performs nested conditional constructs in vector data processors. A vector bit stack is provided to record which processing elements were activated and which processing elements were deactivated during execution of a nested conditional construct. Subsequently, when an end of a first nested conditional construct is encountered, a state of the processing elements at a point in time in which the first nested conditional construct was initiated may be popped off of the vector bit stack and a second conditional construct or any other operation may be executed. Therefore, conditional constructs may be executed while ensuring the proper state of the processing elements. The compiler program effectively utilizes the vector bit stack to store prior states of each of the processing elements of the vector data processor such that the processing elements may be efficiently restored to a correct intermediate value.

U.S. Pat. No. 5,752,035 to Trimberger issued May 12, 1998 entitled "Method for compiling and executing programs for reprogrammable instruction set accelerator" discloses a microprocessor having a defined execution unit coupled to internal buses of the processor for execution of a predefined, fixed set of instructions, combined with one or more programmable execution units coupled to the internal buses for execution of a set of program instructions, to provide an on chip reprogrammable instruction set accelerator (RISA). Reprogrammable execution units may be made using field programmable gate array technology having configuration stores. Techniques for translating a computer program into executable code relying on the RISA involve providing a library of defined and programmed instructions, and compiling a program using the library to produce an executable version of the program using both defined and programmed instructions. The executable version can be optimized to conserve configuration resources for the programmable execution unit, or to optimize speed of execution. Thus, seldom used programmed instructions in the final object code can be replaced with segments of defined instructions to conserve configuration resources. Alternatively, specially prepared sets of programmed instructions can be used to compile programs. A variety of versions are formed using separate sets of programmed instructions and the best final version is selected. In addition, commonly used segments of instructions can be synthesized into a programmed instruction dynamically.

U.S. Pat. No. 5,555,417 to Odnert, et al. issued Sep. 10, 1996 entitled "Method and apparatus for compiling computer programs with interprocedural register allocation" discloses optimization techniques implemented by means of a program analyzer used in connection with a program compiler to optimize usage of limited register resources in a processor. The first optimization technique, called interprocedural global variable promotion allows the global variables of a program to be accessed in common registers across a plurality of procedures. Moreover, a single common register can be used for different global variables in distinct regions of a program call graph. This is realized by identifying subgraphs, of the program call graph, called webs, where the variable is used. The second optimization technique, called spill code motion, involves the identification of regions of the call graph, called clusters, that facilitate the movement of spill instructions to procedures which are executed relatively less often. This decreases the overhead of register saves and restores which must be executed for procedure calls.

U.S. Pat. No. 5,450,585 to Johnson issued Sep. 12, 1995 entitled "Compiler with delayed conditional branching" discloses an optimization method and apparatus adapted for use on a compiler for generating machine code optimized for a pipeline processor. A compute-compare-branch sequence in a loop is replaced with a compare-compute-branch sequence. A compute-compare-branch sequence is a sequence of instructions to compute the value of one or more variables, execute a comparison involving the variables, and execute a conditional branch conditioned on the comparison. In the compare-compute-branch sequence, the instructions of the compute-compare-branch sequence are reordered as follows. First, the comparison is executed. In the compare-compute-branch sequence, the comparison involves previously set values of the variables. Second, the computation is executed to compute the current values of the variables. Finally, the conditional branch conditioned on the latter comparison is executed so as to have the effect of executing during the previous execution of the sequence. One or more temporary variables store the previous values of the variables. They are set to the values of the variables at the end of the compare-compute-branch sequence. Before execution of the loop, the temporary variables are set so that the condition will not be met the first time the sequence executes. After execution of the loop, a comparison and a conditional branch are executed. The comparison involves the temporary variables, and the conditional branch is conditioned on the comparison.

U.S. Pat. No. 5,293,631 to Rau, et al. issued Mar. 8, 1994 entitled "Analysis and optimization of array variables in compiler for instruction level parallel processor" discloses a process for optimizing compiler intermediate representation (IR) code, and data structures for implementing the process. The process is embodied in a compiler computer program operating on an electronic computer or data processor with access to a memory storage means such as a random access memory and access to a program mass storage means. The compiler program reads an input source program stored in the program mass storage means and creates a dynamic single assignment intermediate representation of the source program in the memory using pseudo-machine instructions. To create the dynamic single assignment intermediate representation, during compilation, the compiler creates a plurality of virtual registers in the memory for storage of variables defined in the source program. Means are provided to ensure that the same virtual register is never assigned to more than once on any dynamic execution path. An expanded virtual register (EVR) data structure is provided comprising an infinite, linearly ordered set of virtual register elements with a remap function defined upon the EVR. Calling the remap function with an EVR parameter causes an EVR element which was accessible as [n] prior to the remap operation to be accessible as [n+1] after the remap operation. A subscripted reference map comprising a dynamic plurality of map tuples is used. Each map tuple associates the real memory location accessible under a textual name with an EVR element. A compiler can use the map tuple to substitute EVR elements for textual names, eliminating unnecessary load operations from the output intermediate representation.

U.S. Pat. No. 5,287,510 to Hall, et al. issued Feb. 15, 1994 entitled "Method for improving the efficiency of arithmetic code generation in an optimizing compiler using machine independent update instruction generation" discloses a process within an optimizing compiler for transforming code to take advantage of update instructions available on some computer architectures. On architectures which implement some form of autoindexing instructions or addressing modes, this process is intended to improve the code generated for looping constructs which manipulate arrays in memory. The process comprises selecting memory referencing instructions inside loops for conversion to update forms, modifying those instructions to an update form available on a particular processor, and applying an offset compensation to other memory referencing instructions in the loop so as to enable the program to still address the appropriate locations while using the available autoindexing instructions. The improved compiler and compiler process enables the compiler to convert those program instructions that would otherwise convert to autoindexing instructions not supported by the processor to autoindexing instructions that are supported.

U.S. Pat. No. 5,274,818 to Vasilevsky, et al. issued Dec. 28, 1993 entitled "System and method for compiling a fine-grained array based source program onto a course-grained hardware" discloses a parallel vector machine model for building a compiler that exploits three different levels of parallelism found in a variety of parallel processing machines, and in particular, the Connection Machine™ Computer CM-2 system. The fundamental idea behind the parallel vector machine model is to have a target machine that has a collection of thousands of vector processors each with its own interface to memory. Thus allowing a fine-grained array-based source program to be mapped onto a course-grained hardware made up of the vector processors. In the parallel vector machine model used by CM Fortran 1.0, the FPUs, their registers, and the memory hiearchy are directly exposed to the compiler. Thus, the CM-2 target machine is not 64K simple bit-serial processors. Rather, the target is a machine containing 2K PEs (processing elements), where each PE is both superpipelined and superscalar. The compiler uses data distribution to spread the problem out among the 2K processors. A new compiler phase is used to separate the code that runs on the two types of processors in the CM-2; the parallel PEs, which execute a new RISC-like instruction set called PEAC, and the scalar front end processor, which executes SPARC or VAX assembler code. The pipelines in PEs are filled by using vector processing techniques along the PEAC instruction set. A scheduler overlaps the execution of a number of RISC operations.

U.S. Pat. No. 5,247,668 to Smith, et al. issued Sep. 21, 1993 entitled "Methods of realizing digital signal processors using a programmed compiler" discloses a compiler for a digital signal processor allowing the designer to specify separately function, accuracy and throughput. The compiler employs a word structure having the signal attributes of bits, digits and subwords which all have a direct relationship to the size of the processor and throughput. From a budget of working bits and clock cycles implicit in the specification of accuracy and throughput the compiler is able to choose the optimal word structure for the application. The compiler can also propagate throughout an icon network, used for the specification of function, various estimation attributes such as word growth and quantization noise, which allow the designer to observe the effect of design changes without recourse to simulation.

U.S. Pat. No. 5,088,034 to Ihara, et al. issued Feb. 11, 1992 entitled "Compiling method for determining programs to be executed parallelly by respective processors in a parallel computer which transfer data with a data identifier to other processors" discloses a compiler for generating from a serially processed type source program described in a high level language the object codes to be executed in parallel by a parallel processor system which is composed of a plurality of processors marked with respective identification numbers and in which inter-processor data transfer system for identifying data for transfer by data identifiers is adopted. The serially executed source program is first translated to programs to be executed in parallel. The inter-processor data transfer processing is extracted from the flow of processings involved in executing the programs for parallel execution resulting from the above-mentioned translation, and all the interprocessor data transfer processings are attached with data identifiers such that no overlap takes place.

U.S. Pat. No. 4,965,724 to Utsumi, et al. issued Oct. 23, 1990 entitled "Compiler system using reordering of microoperations to eliminate interlocked instructions for pipelined processing of assembler source program" discloses compiling a source program described with assembler instructions, each of which defines microoperations, into a target program for use in a digital signal processor. If two of the assembler instructions are interlocked with each other and if another assembler instructions which is not associated with the interlocked instructions is present, it is inserted between the interlocked instructions to thereby reorder the microoperations of the source program. Thereafter, the microoperations thus reordered are combined so as not to conflict with each other with regard to the fields of the assembler instructions and resources used by the assembler instructions. Prior to combining the microoperations, whether or not a basic block of assembler instructions included in the source program having a loop may be determined. If so, a head portion of the basic block forming the loop may then be transferred to a tail portion of the basic block forming the loop.

U.S. Pat. No. 4,827,427 to Hyduke issued May 2, 1989 entitled "Instantaneous incremental compiler for producing logic circuit designs" discloses a computer aided logic design system for instantaneously compiling circuit component entries into a schematic model which provides immediate simulation of each entry or deletion into the electronic circuit schematic. The system includes software for processing logic designs which produces a signal table for storing all inputs and outputs of chips stored in a specification table. The processor also produces a call table that lists all chips from the chips specification table from which chip models can be retrieved and executed. Additionally, a software routine produces a netlist transfer table that specifies the transfer of signals within the signal table produced by software processing, which correspond to the signal distribution in the circuit being designed. After production of the signal table, specification table, call table and netlist transfer table, a software processing routine executes sequential values retrieved from the call table and netlist transfer table to create a second signal table which is compared with the first signal table. The software processing routine continuous to execute values retrieved from the call table and netlist transfer table and compare the first and second signal tables until both the second signal table being created is identical with the first signal table stored in memory. The software processing means also includes a delay which delays sequential processing until the comparing step for comparing the second signal table with the first signal table reaches a stable state.

Constants and Constant Pools

Constant values are used in all kinds of programs and many programming languages. Since a constant is read-only and may be used many times in a program, constants may be optimized to, inter alia, eliminate any duplicates. The well known "constant pool" is a set of data structures containing data that remains fixed throughout the execution of a program unit. By pooling, or putting all constants together in the same locations, the size of a program can be greatly reduced. This helps eliminate wasted space. In a low level language, a programmer might maintain a constant pool by hand. In a high level language, programming tools are used to maintain a constant pool.

Using a mechanism such as an ID (an index into the constant pool), a program can copy a constant value from the constant pool. When a new value is added to a constant pool, it is given a unique ID.

Constant pools may contain, among other things: string constants, information for exception handlers, data type descriptors for various data types, and function call descriptors (metadata describing a called function). For example, a constant pool for a program that prints text, named PrintText, may contain a function descriptor describing an invocation of the function 'print'. The function descriptors are then followed by a set of constant strings, which represent the text to print.

Various approaches to structuring and accessing constants in RISC processors have been suggested. For example, U.S. Pat. No. 6,282,633 to Killian, et al. (Tensilica) issued Aug. 28, 2001 and entitled "High data density RISC processor" discloses a RISC processor implementing an instruction set which seeks to optimize the relationship between the number of instructions required for execution of a program, clock period and average number of clocks per instruction, as well as the equation $S=IS*BI$, where S is the size of program instructions in bits, IS is the static number of instructions required to represent the program (not the number required by an execution) and BI is the average number of bits per instruction. This processor is intended to lower both BI and IS with minimal increases in clock period and average number of clocks per instruction. The processor implements a variable-length encoding.

In attempts to lower IS and IE (the number of instructions required to implement a given algorithm), the Tensilica invention uses single instructions that combine that functions of multiple instructions typically found in RISC and other instruction sets. An example of a simple compound instruction is left shift and add/subtract. The Tensilica approach also utilizes a load instruction to reference constants, thereby ostensibly providing lower IS and IE than using a sequence of instructions if the load itself requires only a single instruction. Compilers compatible with processors offered by MIPS Technologies, for example, dedicate one of the 31 general registers to hold a pointer to a constant pool where 4-byte and 8-byte floating point constants are stored. If the area addressed by this register is less than a predetermined size (e.g., 64 KB offset range in loads for MIPS), the constants may be referenced by a single load instruction. For a constant that is referenced once, the 32-bit load instruction plus the 32-bit constant is the same total size as two instruction words. If the constant is referenced twice or more, the constant pool provides smaller total size. The tradeoff is different for other instruction lengths, such as the 24-bit size of the Tensilica approach, where the constant pool plus load is 56 bits vs. 48 bits for a pair of 24-bit instructions.

U.S. Pat. No. 6,275,830 to Muthukkaruppan, et al. issued Aug. 14, 2001 and entitled "Compile time variable size paging of constant pools" discloses a method and apparatus for paging data in a computer system. A set of data associated with a program unit is divided into pages such that no item of the set of data spans more than one page. The size of one page may vary from the size of another. When the program unit is compiled, metadata is generated that indicates the division of items into pages. At load time, a page mapping is generated based on the metadata. The page mapping is used to locate an item that belongs to the set of data. Other parts of the program unit, such as byte code, can contain references to items in the constant pool. Each reference specifies the number of the page in which the corresponding item will be stored at runtime, and the offset of that item within the page.

"Coloring" and Register Spilling

So-called "optimizing" compilers utilize one or more optimization algorithms such as common sub-expression elimination, moving code out of loops, eliminating dead code, strength reduction, and register assignment to make the code more compact and efficient. Register assignment can be very significant, since operations wherein the operands are obtained from and results return to registers can proceed at a much higher speed than those which require memory or storage device access.

The article "An Overview of the PL.8 Compiler," by Auslander and Hopkins appearing in the ACM SIGPLAN Notices, Vol. 17, No. 6, June 1982, pages 22-31 describes an optimizing compiler with register assignment. Similarly, "Measurement of Code Improvement Algorithms," in "Information Processing '80," J. Cocke and P. W. Markstein, (edited by S. H. Lavington), pages 221-228, North-Holland, Amsterdam, (1980), and "A Program Data Flow Analysis Procedure," F. E. Allen and J. Cocke, Communications ACM 19, pages 137-147 (1976), both discuss the objectives and concepts involved in the design of optimizing compilers.

U.S. Pat. No. 5,659,754 to Grove, et al. issued Aug. 19, 1997 and entitled "Method and apparatus for an improved optimizing compiler" discloses an optimizing compiler process and apparatus for more accurately and efficiently identifying live variable sets in a portion of a target computer program, so as to more efficiently allocate registers in a computer central processing unit. The process of the invention includes the steps of performing a static single assignment transform to a computer program, including the addition of phi functions to a control flow graph. Basic blocks representing a use of a variable are further added to the control flow graph between the phi functions and definitions of the variables converging at the phi functions. A backward dataflow analysis is then performed to identify the live variable sets. The variables in the argument of phi functions are not included as a use of those variables in this dataflow analysis. The dataflow analysis may be iteratively performed until the live variable sets remain constant between iterations.

Many compilers assume a large number of registers during their optimization procedures. In fact the result of each different computation in the program is conventionally assigned a different register. At this point a register allocation procedure is invoked to assign real registers, from those available in the machine, to these different (symbolic) registers. Conventional approaches use a subset of the real registers for special purposes while the remaining set is assigned locally. Between these assignments, results which are to be preserved are temporarily stored, and variables are redundantly reloaded. These approaches are inefficient in that significant processor cycles are wasted while data is being transferred between storage and registers or conversely, data is accessed from and returned to storage directly bypassing the registers completely.

"Register Allocation Via Coloring," by G. J. Chaitin et al, appearing in Computer Languages, Vol. 6, pages 47-57, Pergamon Press, Great Britain, 1981, referred to above, describes the basic concepts of register allocation via coloring but utilizes a different approach to the "spilling" problem.

"The 801 Minicomputer," by George Radin, published in the ACM SIGPLAN Notices, Vol. 17, No. 4, April 1982, pages 39-47, is an overview of an experimental minicomputer which incorporated an optimizing compiler utilizing the concepts of register allocation via coloring described in the above-referenced article by Chaitin.

The foregoing references observed that the register assignment or allocation problem is equivalent to the graph coloring problem, where each symbolic register is a node and the real registers are different colors. When two symbolic registers have the property that there is at least one point in the program when both their values must be retained, that property is modeled on the graph as a vertex or edge between the two nodes. Thus the register allocation problem is analogous to coloring the graph so that no two nodes connected by a vertex are colored the same. This in effect says that each of these two (or more) nodes must be stored in different registers.

However, a potentially significant shortcoming of the register allocation via coloring procedure referenced above regards the "spilling" problem; i.e., the situation where there are more data items to be retained than there are machine registers available. A number of different solutions for the spilling problem have been proffered, the following being exemplary.

U.S. Pat. No. 4,571,678 to Chaitin issued Feb. 18, 1986 and entitled "Register allocation and spilling via graph coloring" discloses an optimizing compiler which receives a high level source language program and produces machine interpretable instructions, including a method for assigning computational data utilized by the program to a limited number of high speed machine registers in a target CPU. Specifically, the patent discloses methods for determining that there are not enough registers available in the CPU to store all of the data required at the given point in time and for the determining which data should be stored in the system memory until they are actually needed. These methods utilize a graph reduction and coloring approach in making the "spill" decisions.

U.S. Pat. No. 5,249,295 to Briggs, et al. issued Sep. 28, 1993 entitled "Digital computer register allocation and code spilling using interference graph coloring" discloses a method for allocating internal machine registers in a digital computer for use in storing values defined and referenced by a computer program. An allocator in accordance with the present invention constructs an interference graph having a node therein for the live range of each value defined by a computer program, and having an edge between every two nodes whose associated live ranges interfere with each other. The allocator models the register allocation process as a graph-coloring problem, such that for a computer having R registers, the allocator of the present invention iteratively attempts to R-color the interference graph. The interference graph is colored to the extent possible on each iteration before a determination is made that one or more live ranges must be spilled. After spill code has been added to the program to transform spilled live ranges into multiple smaller live ranges, the allocator constructs a new interference graph and the process is repeated.

U.S. Pat. No. 5,946,491 to Aizikowitz, et al. issued Aug. 31, 1999 entitled "Register allocation method and apparatus for generating spill code as a function of register pressure compared to dual thresholds" discloses a method and apparatus for minimizing spill code in regions of low register "pressure." The invention determines the register pressure at various locations in the computer program. When a live range is selected for spilling, spill code is generated to relieve the register pressure in regions of high register pressure, while spill code is avoided in regions of low register pressure. In this manner a minimum amount of spill code is generated, enhancing both the compile time and the run time of the resultant instruction stream.

U.S. Pat. No. 6,090,156 to MacLeod issued Jul. 18, 2000 and entitled "System for local context spilling for graph coloring register allocators" discloses a register allocator for allocating machine registers' during compilation of a computer program. The register allocator performs the steps of building an interference graph, reducing the graph using graph coloring techniques, attempting to assign colors (i.e. allocate machine registers to symbolic registers), and generating spill code. The spill code is generated by a local context spiller which processes a basic block on an instruction by instruction basis. The local context spiller attempts to allocate a machine register which is free in the basic block. If the basic block does not have any free machine registers, the local context spiller looks ahead to select a machine register for spilling. The register allocator improves the performance of a compiler by limiting the rebuilding of the interference graph and the number of the graph reduction operations.

However, despite the broad array of prior art compiler and optimization techniques, the prior art lacks the ability to effectively and efficiently handle variable- or mixed-length instruction formats within the instruction stream, including dynamically determining which form (of several possible) of a given instruction that it must generate, and optimising the selection of such varying formats based on one or more parameters. Furthermore, prior art techniques of register allocation and spilling handling are not optimized for the aforementioned mixed-length ISA environment, and do not take into account register set usage based on the ISA. For many of the smaller instructions, there are limitations to a subset of the general purpose registers. For example, of the "normal" number (e.g., 32) of registers, only a subset (e.g., 8) are available for the smaller or compressed instructions. Although these registers are the same color as the normal registers, there is no current technique in assigning a priority to the subset of the registers. Prior art coloring algorithms, including those of Chatin, et al described above, do not consider the actual register being selected. These algorithms are only concerned with edges and interference, and have no heuristic for choosing one machine register over another in the general purpose case (outside of the case where a register is assigned specifically to a GPR of a certain color by other optimizations).

Chatin and others do address the concept of a register that can have different colors: it is up to the coloring algorithm to determine which color to select based on register pressure and contention. There is no effort to select a specific color based on further compressing the size of the instruction, or reducing the overall size of the compiled function.

Spilling in general is assumed to be to memory locations since there are not enough GPRs to accommodate all of the virtual registers being used by the optimising compiler. This is the fundamental definition—to spill means to use memory to temporarily hold the results of an instruction due to too many registers alive across the span of the specific instruction. The prior art is generally deficient at localizing such spilling.

Address Canonicalization

Another area of interest in compiler and instruction set optimization relates to address canonicalization; see, e.g., the "canonical reduction sequence" on pg. 152 of "Principles of Compiler Design" by Aho and Ullman, April 1979. In practice, addresses are canonicalized to the specifics of the machine for which code is being generated. Typical decisions are made to base/index/scale operations as well as size of displacements and allowed formats (for example, a load instruction may have a base register plus either an immediate offset or an index register with a scaling factor). By generating the same sequence of instructions for the address (no matter how redundant), one hopes to take advantage of global common sub-expression elimination, such as that defined in "Global Optimization by Suppression of Partial Redundancies" by Morel and Renvoise, CACM February 1979; "The Pascal XT Code Generator" by Drechsler and Stadel, SIGPLAN Notices, August 1987; and Cliff Click, "Global code motion/global value numbering", ACM SIGPLAN Notices, v. 30 n. 6, p. 246-257, June 1995.

One significant problem associated with prior art canonicalization techniques is that the decisions as to how to canonicalize the necessary address must be performed prior to the common sub-expression elimination (unless these very costly algorithms are run more then once, which is not practical in practice). Hence, an improved method for choosing the correct address canonicalization when an instruction set has 2 or more distinct sets of addressing is needed.

SUMMARY OF THE INVENTION

The present invention satisfies the aforementioned needs by an improved method and apparatus for compiling instructions in the context of a variable- or mixed-length digital processor ISA.

In a first aspect of the invention, an improved method of compiling an instruction set for a digital processor having variable length instructions is disclosed. The method generally comprises: generating at least one instruction; canonicalizing the address calculation associated with the at least one instruction in at least first and second instances, the first instance relating to a first instruction length, and the second instance relating to a second instruction length being smaller than the first length; and selecting one of the first or second instances based on producing the smallest instruction set. In one exemplary embodiment, the digital processor comprises an extensible RISC processor having a mixed freeform 16- and 32-bit ISA.

In a second aspect of the invention, an improved digital processor is disclosed. The processor comprises an instruction set being generated using the method comprising: performing address calculations associated with a plurality of instructions in said set in a plurality of forms, said plurality comprising at least a first form for first addressing modes, and a second form for second addressing modes; determining which of the first or second forms will optimize the instruction set; selecting the first or second form based at least in part on the act of determining; and compiling the instruction set based at least in part on the act of selecting.

In a third aspect of the invention, an improved method of streamlining call functions within a digital processor is disclosed, generally comprising: indirectly calling a plurality of functions; and placing the addresses associated with the plurality of functions in at least one constant pool; wherein the act of indirectly calling comprises using a reduced-length instruction format. In one exemplary embodiment, the reduced-length format comprises a 16-bit format used in a variable length ISA.

In a fourth aspect of the invention, an improved method for instruction selection is disclosed. In one exemplary embodiment, the methodology comprises first reading all or a subset of the instructions under consideration, then translating each selected instruction and verifying that the translation is complete and valid. Once these steps have been completed, the translated instructions are examined to determine which is smaller. The "best" version of the instruction(s) is selected based on one or more selection criteria.

In a fifth aspect of the invention, an improved method of reducing instruction pairs down to a lesser number of operations is disclosed. In one exemplary embodiment, compare/branch instruction pairs are compressed to a lower number of instructions.

In a sixth aspect of the invention, an improved method of register allocation is disclosed. In one exemplary embodiment, the method comprises: attempting to "color" a graph with a predetermined number n of registers; if spilling is required (e.g., more than n−1 registers alive in any one basic block), then reassigning the chosen registers to the remaining general purpose registers (GPRs), and inserting copies into the graph between these two "banks" (colors) of registers. After spilling has occurred, the methodology utilizes coalescing of instructions (i.e., the elimination of registers alive across an instruction) to "clean up" the spills. The disclosed methodology further improves the locality of spilling in effect by utilizing less "efficient" registers of another color.

In a seventh aspect of the invention, an improved integrated circuit (IC) device generated using one or more of the foregoing methodologies is disclosed. In one exemplary embodiment, the device comprises an extensible RISC processor having a multi-stage pipeline (e.g., comprising instruction fetch, decode, execute, and writeback stages) embodied in an SoC device. The device also included on-chip embedded memory and peripheral functions.

DETAILED DESCRIPTION

Figure 1:
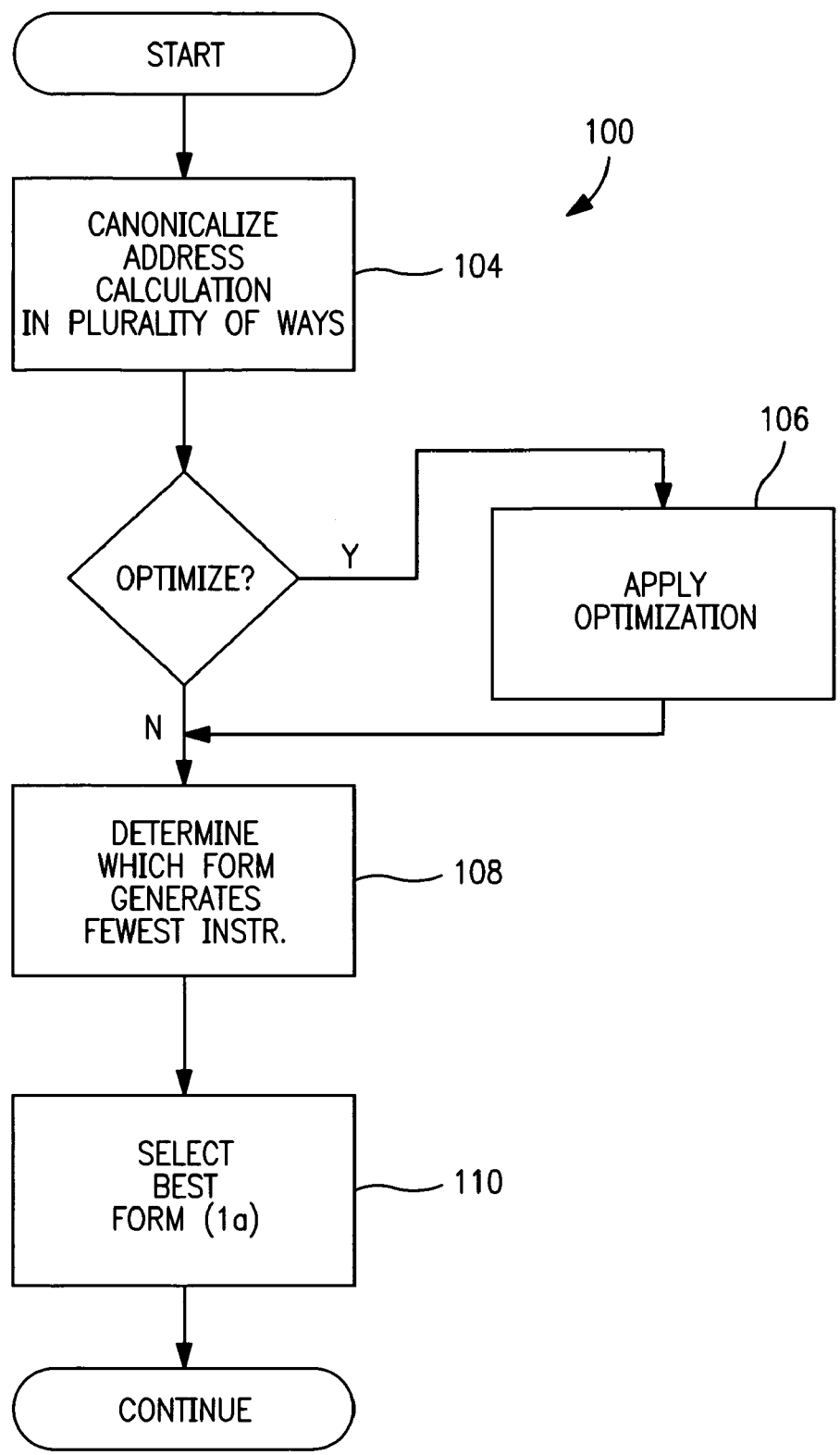
FIG. 1 is logical flow diagram illustrating one exemplary embodiment of address calculation according to the present invention.

Reference is now made to the drawings wherein like numerals refer to like parts throughout.

As used herein, the term "processor" is meant to include any integrated circuit or other electronic device (or collection of devices) capable of performing an operation on at least one instruction word including, without limitation, reduced instruction set core (RISC) processors such as for example the ARCtangent™ user-configurable core produced by the Assignee hereof, central processing units (CPUs), and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor.

Additionally, it will be recognized by those of ordinary skill in the art that the term "stage" as used herein refers to various successive stages within a pipelined processor; i.e., stage 1 refers to the first pipelined stage, stage 2 to the second pipelined stage, and so forth.

Such stages may comprise, for example, instruction fetch, decode, execution, and writeback stages.

As used herein, the term "extension" is meant to broadly refer to any instruction, hardware, or other device which does not exclusively form part of the "base case" core instruction set or architecture, and is in no way limited to the specific instructions or hardware explicitly described herein.

As used herein, the term "canonical", "canonicalize" and "canonicalization" refer generally to the process whereby code is converted to a standard form or syntax, and/or redundancies removed such as through common sub-expression elimination and other techniques.

Lastly, any references to hardware description language (HDL) or VHSIC HDL (VHDL) contained herein are also meant to include other hardware description languages such as Verilogg. Furthermore, an exemplary Synopsys® synthesis engine such as the Design Compiler 2000.05 (DC00) may be used to synthesize the various embodiments set forth herein, or alternatively other synthesis engines such as Buildgates® available from, inter alia, Cadence Design Systems, Inc., may be used. IEEE std. 1076.3-1997, *IEEE Standard VHDL Synthesis Packages*, describes an industry-accepted language for specifying a Hardware Definition Language-based design and the synthesis capabilities that may be expected to be available to one of ordinary skill in the art.

It will be appreciated that while the following discussion is cast in terms of the ARCompact ISA and ARCtangent processor produced by the Assignee hereof, the present invention may be readily applied to other suitable types of digital processors and architectures as referenced above by those of ordinary skill in the art given the present disclosure and its Appendices.

The ARCtangent-A5 processor is a 32-bit four stage pipeline RISC architecture that implements the ARCompact™ instruction set. The ARCompact ISA is described in detail in co-owned, co-pending U.S. provisional patent application No. 60/353,647 filed Jan. 31, 2002 and entitled "Configurable Data Processor With Multi-Length Instruction Set Architecture" which is incorporated herein by reference in its entirety. ARCompact™ is an instruction set architecture (ISA) that allows designers to mix 16 and 32-bit instructions on its 32-bit user-configurable processor. The key benefit of the ISA is the ability to cut memory requirements on a SoC (system-on-chip) by significant percentages, resulting in lower power consumption and lower cost devices in deeply embedded applications such as wireless communications and high volume consumer electronics products.

The main features of the ARCompact ISA include 32-bit instructions aimed at providing better code density, a set of 16-bit instructions for the most commonly used operations, and freeform mixing of 16- and 32-bit instructions without a mode switch—significant because it reduces the complexity of compiler usage compared to competing mode-switching architectures. The ARCompact instruction set expands the number of custom extension instructions that users can add to the base-case ARCtangent™ processor instruction set. The ARCtangent processor architecture allows users to add as many as 69 new instructions to speed up critical routines and algorithms. With the ARCompact ISA, users can add as many as 256 new instructions. Users can also add new core registers, auxiliary registers, and condition codes. The ARCompact ISA thus maintains and expands the user-customizable features of ARC's configurable processor technology.

As 32-bit architectures become more widely used in deeply embedded systems, code density can have a direct impact on system cost. Typically, a very high percentage of the silicon area of a system-on-chip (SoC) is taken up by memory.

The ARCompact ISA delivers high density code helping to significantly reduce the memory required for the embedded application, an important factor for high-volume consumer applications, such as flash memory cards. In addition, by fitting code into a smaller memory area, the processor potentially has to make fewer memory accesses. This can cut power consumption and extend battery life for portable devices such as MP3 players, digital cameras and wireless handsets. Additionally, the new, shorter instructions can improve system throughput by executing in a single clock cycle some operations previously requiring two or more instructions. This can boost application performance without having to run the processor at higher clock frequencies.

The support for freeform use of 16- and 32-bit instructions advantageously allows compilers and programmers to use the most suitable instructions for a given task, without any need for specific code partitioning or system mode management. Direct replacement of 32-bit instructions with new 16-bit instructions provides an immediate code density benefit, which can be realized at an individual instruction level throughout the application. As the compiler is not required to restructure the code, greater scope for optimizations is provided, over a larger range of instructions. Application debugging is also more intuitive because the newly generated code follows the structure of the original source code.

Since the foregoing exemplary ARCompact ISA (as well as other ISAs) allows for variable length instructions within the instruction stream, the compiler employed for such applications must utilize significant complexity of analysis to determine which form of the instruction that it must generate. There are several components to this analysis, now described in detail.

Address Calculation and Selection—Typically, when a compiler generates an instruction that uses some sort of memory address, it creates the effective address operand and canonicalizes this operand in such a way that global optimizations can be done on the address components. This canonicalization takes into account displacement limitations, address forms (can there be a base register and an index register for example), and other factors. So for a machine that only allows one base register with no index, scale, or offset, the compiler will typically generate something of the form:

```
MOV r0 <- <addr of var + nearest "page" offset of available disp>
// a "page" is the known offset of the variable within the local data section
// divided by the total range of the displacement. For example, a machine
// that allows -32/31 would divide the offset by 64 and use that "page"
// value in the above calculation.
ADD r1 <- r0,<remainder of displacement that fits within available disp>
MPY r2 <- r3,#4                    scale index by element size
ADD r4 <- r1,r2                    address fully calculated now
LOAD r5 <- [r4]
```

In machines with large displacements, the foregoing is not prohibitive for code generation. Classic optimization phases of the type well known in the art can reduce the number of instructions by common sub-expression elimination and the like.

With the variable-length ISAs such as ARCompact, however, there are several issues to be considered since the compressed (e.g., 16-bit) instructions use such comparatively small offsets. Generating the above code to fit within +/−32 bytes would create an undesirable number of instructions, where alternatively one "regular" 32-bit instruction with its wide range of offsets could be used.

To solve this problem, the methodology 100 of the present invention (FIG. 1) canonicalizes the address calculation in a plurality different ways per step 104. In one exemplary embodiment, the aforementioned plurality comprises two; e.g., the address calculation is canonicalized first for the "regular" 32-bit instruction addressing modes, and second for the "compressed" 16-bit instruction addressing modes. It will be recognized, however, that the methodology 100 of the present invention is not restricted to two-length ISAs such as ARCompact, but rather may also be applied to ISAs with three or more differing instruction forms, as well as to ISAs with different addressing modes (e.g., section relative addressing vs. direct variable addressing, or small data section addressing vs. section relative addressing vs. direct variable addressing, etc.).

Hence, in the exemplary embodiment, the LOAD instruction of the above example would have two (2) effective address operands (EAs) as the sources to the load instruction.

Next, classic optimization phases such as common sub-expression elimination, moving code out of loops, eliminating dead code, strength reduction, induction variable elimination, and register assignment may be employed (step 106) to reduce the instructions further. For example, the following exemplary code illustrates how such optimization phases may be performed:

```
1) Common sub-expression elimination:-
      ADD R100 <- R101,R102
      ....
      ADD R200 <- R102,R101
Would then be converted to:
      ADD R100 <- R101,R102
      ....
      COPY R200 <- R100
2) Moving code out of loops -
      for (int I = 10; I < n; I++) {
         double a = sin(x);
         b[I] = b[I] * a;
      }
would effectively be treated as:
      double a = sin(x);
      for (int I = 10; I < n; I++) {
         b[I] = b[I] * a;
      }
```

-continued

3) Eliminating dead code -
    int a = x+2;
    a = y/3;
The first calculation of 'x+2' would be killed if no other use of it and the assignment into 'a' would be killed generally.
4) Strength reduction -
    int x = y *2; // typically an expensive instruction operation
    int x = y+y; // strength reduced into simpler and faster instruction.
5) Induction variable elimination -
    for (int I = 0; I < n; I++) {
        a[I] = b[I] * dx;
    }
can be optimized as follows:
    int j = n;
    int a1 = a,*b1 = b;
    while (n--) *a1++ = *b1++ dx;
6) Register assignment -
    // the following two instructions can be combined
    add r0,r13,r14
    mov r15,r0
    // into (as long as no use of r0)
    add r15,r13,r14

It will be recognized that other optimizations may be optionally employed as well, the forgoing being merely illustrative.

The methodology 100 next requires determining which form of the addressing generated per step 104 will generate the fewest number of instructions (step 108). This form is subsequently selected for the instruction form per step 110. This approach allows the selective determination of which instruction addressing mode is desired, with the goal being that the fewest possible instructions will be generated (and the instruction size being optimized as well).

Figure 1A:
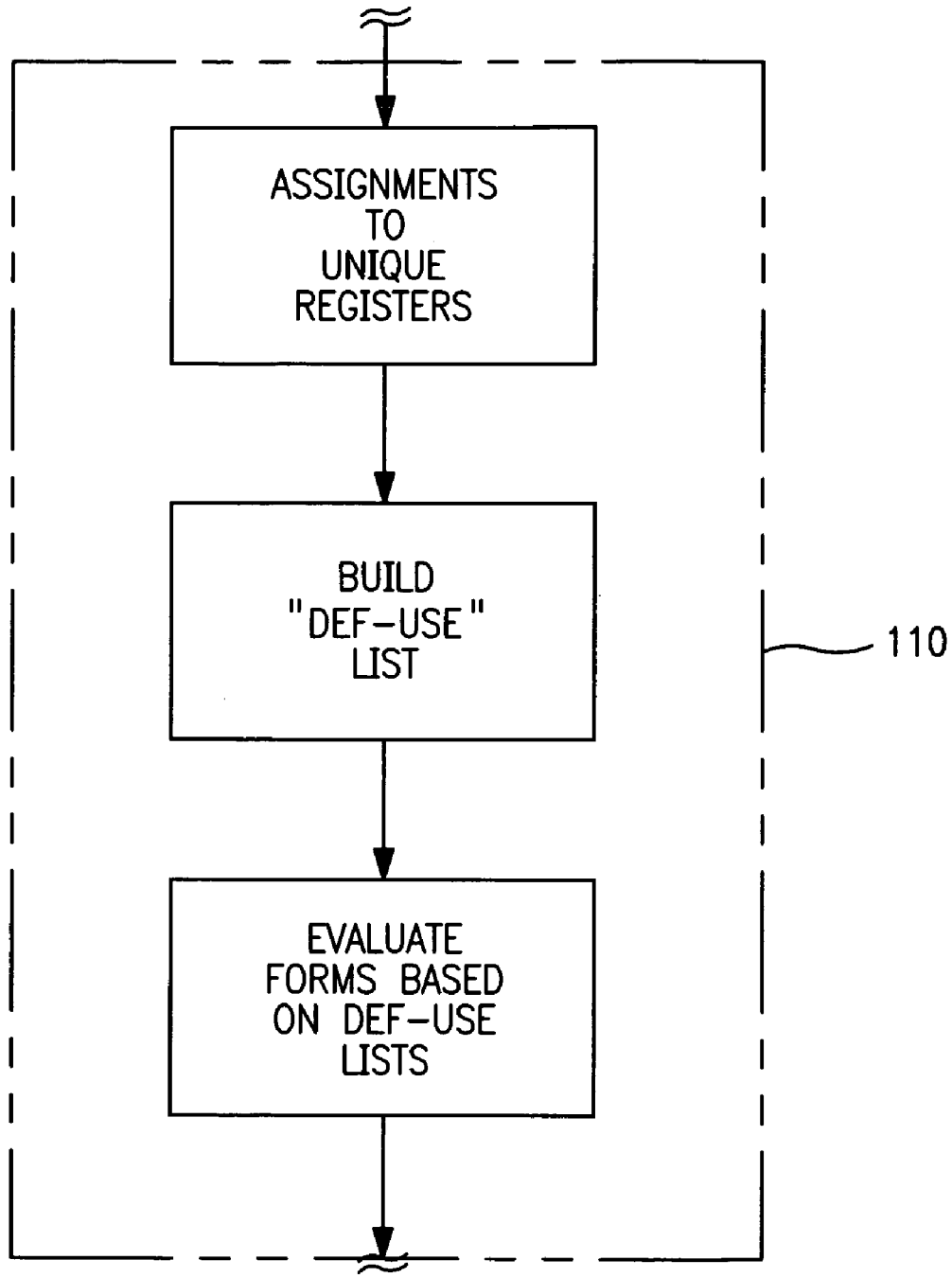
FIG. 1a is a logical flow diagram illustrating one exemplary embodiment of address selection in the method of FIG. 1.

The selection process of step 110 comprises in one exemplary embodiment use of a Single Static Assignment (SSA) approach of the type generally well known in the programming arts; see FIG. 1a. Specifically, the primary property of this approach is that all assignments are conducted to a unique register across the function body. Since every register has exactly one definition, "def-use" lists may be constructed while in the SSA form. These lists allow the programmer to see how many times the definition was used. Since several other optimization phases "common up" similar code, the address form which is most beneficial can be readily identified.

As a specific example of the foregoing, if the 32-bit canonicalized address was used only once per the def-use list, while the 16-bit address was used 10 times, the 16-bit form would be selected. In the case where the number of uses between the different forms is equal, the smaller (e.g., 16-bit) form is selected in order to compress code space.

Exemplary code used in accomplishing the foregoing in the context of the ARCompact processor is provided in Appendix I (canonicalization) and Appendix II (address selection) hereto.

Figure 2:
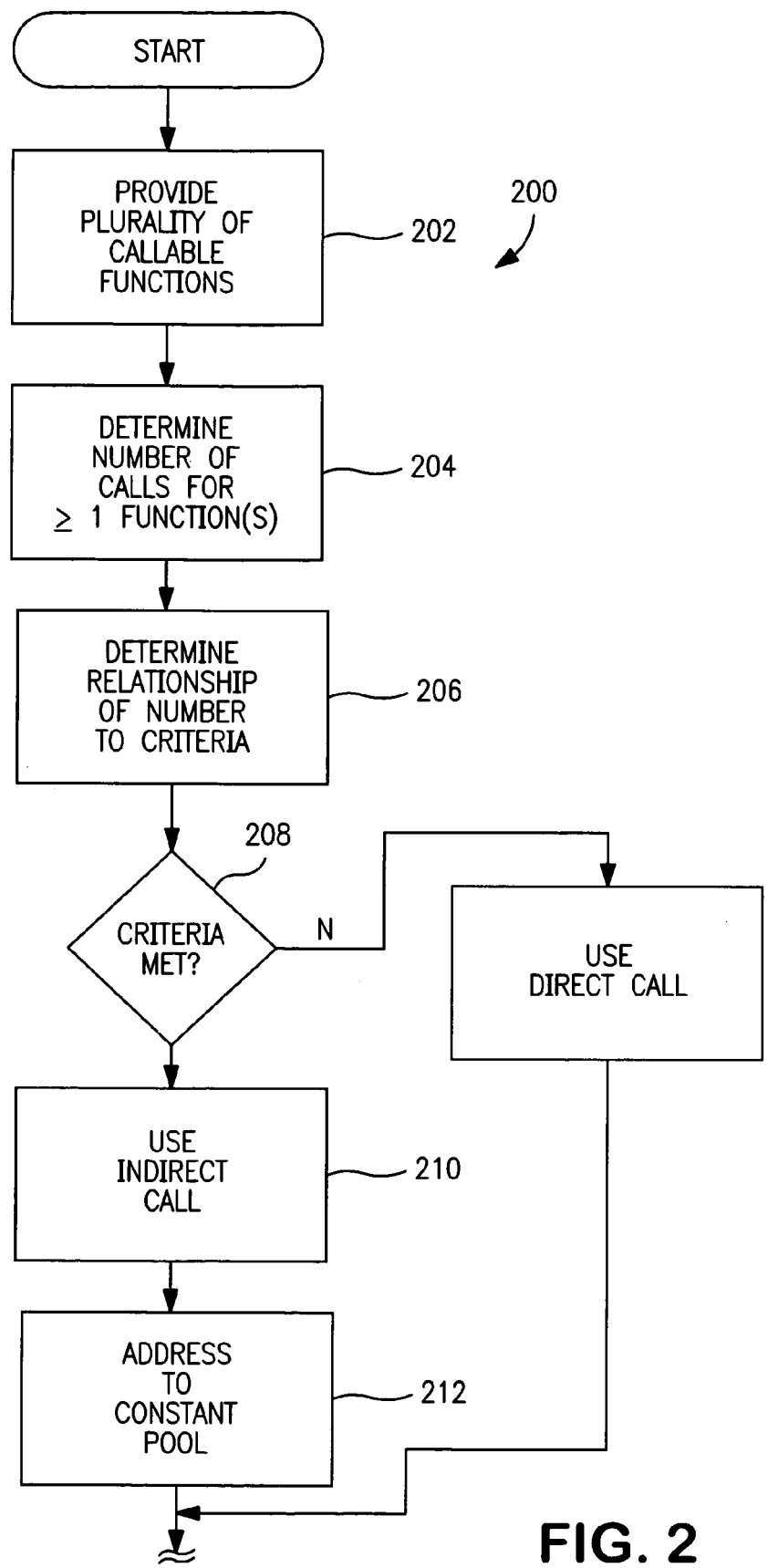
FIG. 2 is logical flow diagram illustrating one exemplary embodiment of the call reduction methodology according to the present invention.

Call Instruction Reduction—In another aspect of the invention, an improved methodology for streamlining call functions within the processor is disclosed (FIG. 2). Specifically, in the exemplary embodiment FIG. 2, a plurality of callable functions are first provided within the processor (step 202). Per step 204, a determination is made as to how many times a given function is called. In the illustrated embodiment, a minimum number n of calls (e.g., 3) is required in order to make use of the indirect call methodology beneficial. Per step 206, this minimum number n is compared to the number of calls determined per step 204; if greater than or equal to this number n, the indirect form is used (step 208). Per step 208, functions are called (step 210) using an indirect approach of the type well known in the programming arts.

Using this indirect call approach, the addresses may be placed in the constant pool (step 212).

This methodology 200 advantageously allows the call instruction(s) to be selectively reduced to a 16-bit form. This methodology also does not create undue register pressure at register allocation time, since the indirect call can be easily reversed into a "normal" call instruction (albeit at a loss of code compression).

The 'indirect_calls' routine provided below is an example of code used to implement the foregoing functionality in the context of one function; it will be recognized that this methodology may be utilized for any number of different functions.

```
static int deal_with_indirect_calls(IL_entry *def,Register r) {
    int cnt = 0,did_something = 0;
    int scnt = il_src_cnt(def);
    if (scnt > 1) return 0;    // don't know what this is
    if (debug_ssa_tog) {
        printf("[ssa] R%d-def: ",r); print_il(def);
    }
    for_each_ref_il(ref,r) {
        IL_opcode op = il_op(ref);
        if (Oneof2(op,il_CALL,il_XCALL)) {
            IL_opd *f = &CALL_FUNC(ref);
            if (f->type == REG_i && oREG(*f) == r) {
                cnt++;
            }
        }
    } end_for
    if (cnt > 3) {
        // call foo <-- 4 bytes
        //
        // ld     r1,[pc-rel zpool]     <-- 2 bytes + (4 for store)
        //
        // so for 3 calls: 8 bytes normally and 8 bytes for 16-bit.
        // So this only benefits when called 3 or more times....
        if (debug_ssa_tog) {
            printf("..no change: uses=%d\n",cnt);
        }
        return 0;
    }
    for_each_ref_il(ref,r) {
        IL_opcode op = il_op(ref);
        if (Oneof2(op,il_CALL,il_XCALL)) {
            IL_opd *f = &CALL_FUNC(ref);
            if (f->type == REG_i && oREG(*f) == r) {
                *f = SRC1(def);
                if (debug_ssa_tog) {
                    printf("..ref-change: "); print_il(ref);
                }
                did_something = 1;
                DEC_REF_COUNT(r);
            }
        }
    } end_for
    return did_something;
}
```

© 2000-2002 ARC International. All rights reserved.

As illustrated in the foregoing code example, the availability of the constant pool and the 16-bit pc-relative load instruction, plus the 16-bit jump-indirect instruction, further reduces the size of the resulting code as the number of occurrences calling the one function increases. In this particular instance, the trade-off in ld/jmp is beneficial when 3 or more occurrences of the function are found within the function.

Figure 3:
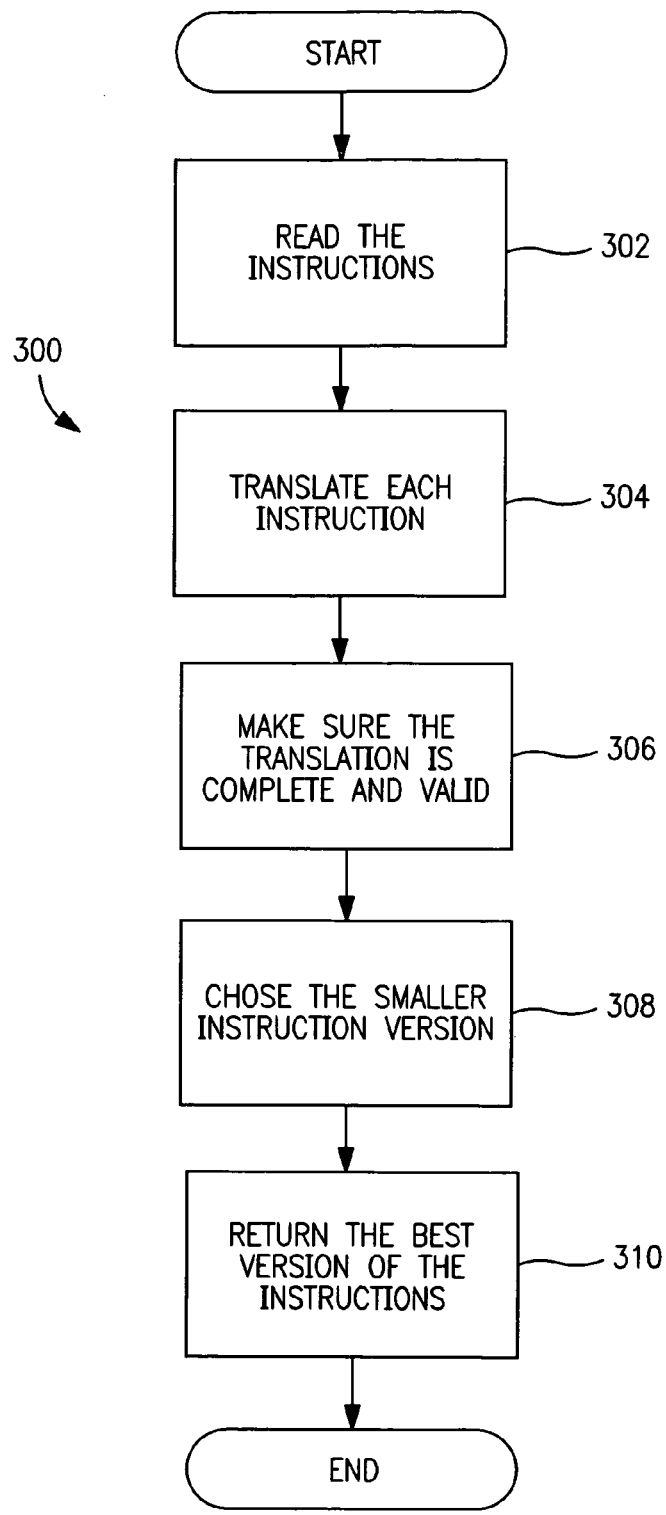
FIG. 3 is logical flow diagram illustrating generally the methodology of instruction selection of the present invention.

Instruction Selection—Referring now to FIG. 3, another aspect of the present invention is described. As shown in the exemplary methodology of FIG. 3, the present invention generally determines instruction selection; i.e., which is more desirable between the various (e.g., 16-bit or 32-bit) instruction length options. Specifically, the methodology 300 comprises first reading all or a subset of the instructions under consideration (step 302), then translating each selected instruction (step 304) and verifying that the translation is complete and valid (step 306). Once these steps have been completed, the translated instructions are examined to determine which is smaller (step 308). The "best" version of the instruction(s) is selected and returned (step 310). It will be recognized that the "best" version may in certain circumstances be different than the smallest version. For example, with the smallest version, two (2) instructions may need to be generated which alternatively could have been generated with one 32-bit instruction. By using the 32-bit instruction, the instruction count is reduced, but not the size (which would be the same). As an example, consider the following:

```
mov_s r0,r16
add_s r0,r0,r0
// both 16-bit instructions, can be combined into
add   r0,r16,r16
// which is one 32-bit instruction that reduces the instruction
//and clock count for the program
```

Appendix III contains exemplary code useful for providing this determination in the context of the foregoing ARCompact ISA.

Figure 4:
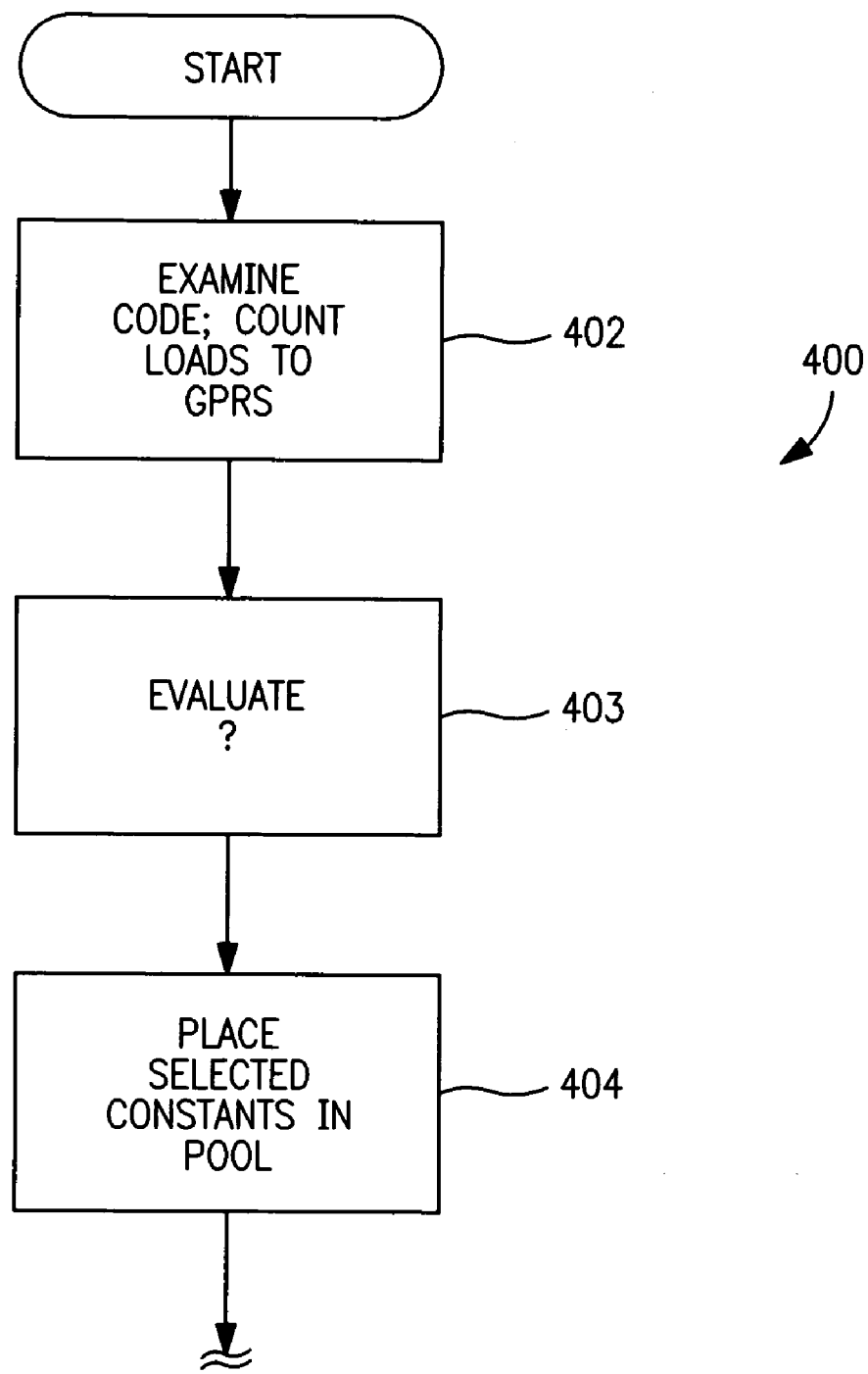
FIG. 4 is a logical flow diagram illustrating one exemplary embodiment of the methodology for constant pool plus instruction size selection (PC-relative loads) according to the present invention.

Constant Pool. Additionally, the present invention advantageously allows for constant pool plus instruction size selection for PC-relative loads. Specifically, in one exemplary embodiment (FIG. 4), the code is examined to determine the number of times each constant/address is loaded into a general purpose register (step 402). Based on this count, the given constant is placed into a constant pool per step 404 (there can be several strategically placed portions of the pool within the executable). This determination of constants is done across function boundaries. By doing this, constant/address loads from several smaller functions can be aggregated or "commoned up" into a unitary constant pool location.

In one exemplary embodiment of this method, a scan of the function being compiled is performed to determine how many times the constant (e.g., 12345678) is used. Since both negative and positive displacements exist for the pc-relative load, and the negative load does not have a compressed instruction format, a determination is made as to whether the constant should be placed into a different constant pool, or address it from an existing pool. For two exemplary uses with one forward reference and one backward reference, the size would be 10 bytes:
  2-bytes for constant pool load (forward reference)
  4-bytes for constant pool entry
  4-bytes for constant pool load (backward reference)
However, say that there were four references. If there were one forward and 3 backward references, 18 bytes of code would be generated:
  2-bytes for constant pool load (forward reference)
  4-bytes for constant pool entry
  4-bytes for constant pool load (backward reference)
  4-bytes for constant pool load (backward reference)
  4-bytes for constant pool load (backward reference)

But if the constant is duplicated and placed in another constant pool after the references, the code size would be decreased by 2 bytes:
  2-bytes for constant pool load (forward reference)
  4-bytes for constant pool entry
  2-bytes for constant pool load (forward reference)
  2-bytes for constant pool load (forward reference)
  2-bytes for constant pool load (forward reference)
  4-bytes for constant pool entry Additionally, by making the load operation relative to the program counter (PC), the so-called "normal" general purpose registers or GPRs (e.g., the first 32 in the ARCompact context) are not monopolized. Furthermore, this approach provides additional flexibility in that negative or positive incrementing based on the 32-bit aligned architectural PC register may be performed. Specifically, the load instruction has an implicit base register of the architectural PC register similar to the implicit base register used in a typical PC-relative branch instruction. In many constant pool implementations, a specific GPR is assigned the based of the fixed-size constant pool which reduces the number of registers available for coloring (which can create undue register pressure that results in spilling).

Appendix IV contains exemplary code useful for implementing such functionality in the context of the ARCompact processor instruction set architecture.

Compare and Branch Pair Reduction—Furthermore, the present invention advantageously reduces compare and branch pairs down to compare/jump ("cmpjmp") or equivalent instructions, thereby economizing on the number of processor instruction cycles needed to effectuate this function. Specifically, in one exemplary embodiment, each compare instruction that sets the condition flags (which are used in only one subsequent branch instruction) is selectively combined with the branch in order to avoid the overhead of setting the condition flags. In the exemplary ARCtangent context, a normal "cmp" (compare) followed by an immediate branch has a 1-clk penalty on the use of the condition flags. The branch also must be within a certain range of the compare; i.e., there is a limited displacement on the instruction. To accomplish this combination, the compiler of the present invention determines the size of all instructions being generated and then assembled.

Figure 5:
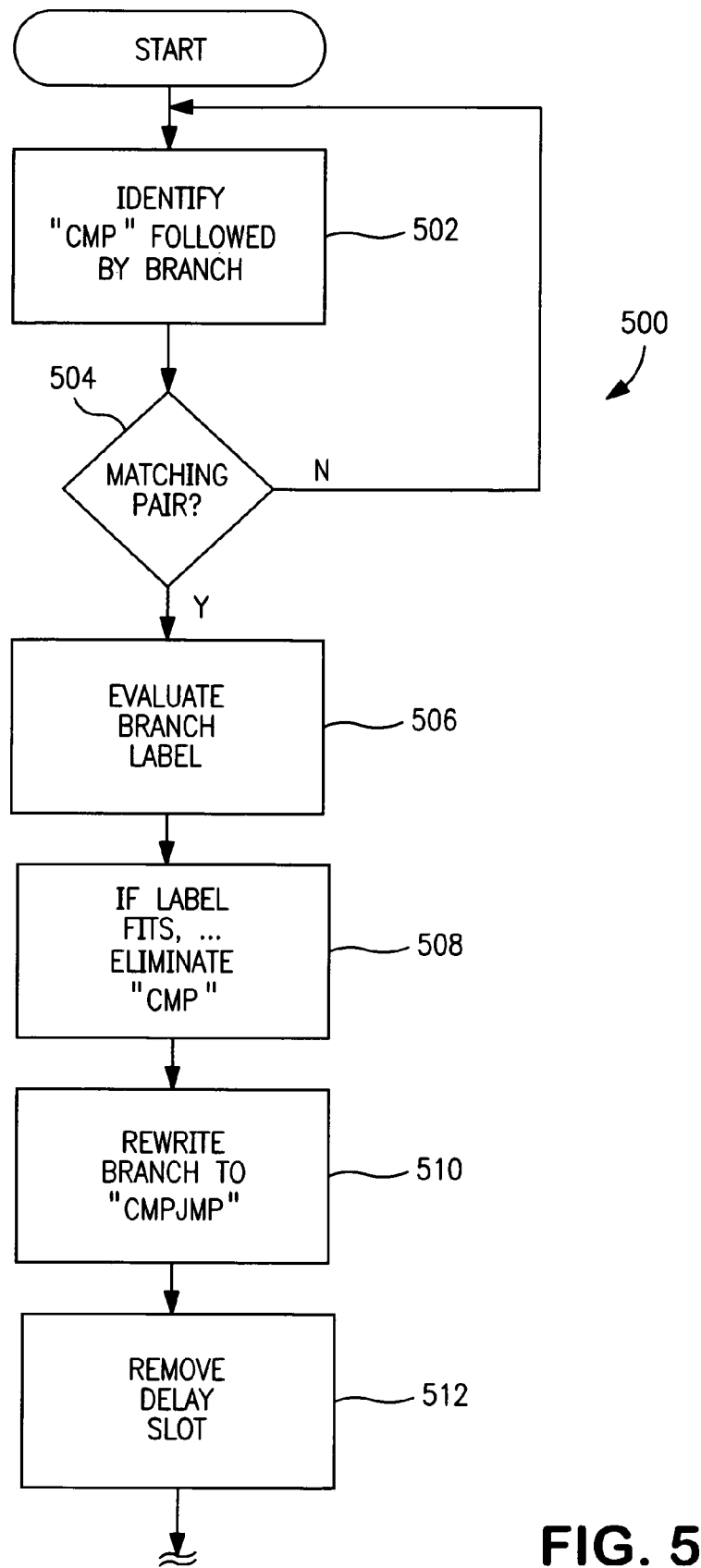
FIG. 5 is a logical flow diagram illustrating one exemplary embodiment of the compare-branch pair reduction methodology of the present invention.

In one exemplary embodiment (FIG. 5) of the method 500, a 'cmp' instruction followed by a pc-relative branch instruction is located (step 502). Once it is determined that it comprises a matching pair (step 504), the label associated with the branch instruction is evaluated (lookup) to determine if the difference between the branch instruction and the label (compensating for the removal of the 'cmp' instruction if the branch is backwards) will fit within the limited displacement of the cmpjmp instruction (step 506). If it does fit, the 'cmp' instruction is generally eliminated (step 508), the branch instruction is rewritten to a cmpjmp instruction (step 510), and the delay-slot of the branch (if present) is removed per step 512 (the instruction is removed before the cmpjmp instruction).

In general, the 'cmp' can be eliminated, but there are various compiler optimizations that allow the condition codes of the 'cmp' to be alive across several basic blocks in the control flow graph. When the condition codes need to be set, the first cmp/branch set is converted into a cmpjmp, and the cmp instruction re-inserted after the newly created cmpjmp instruction. By doing this, further "commoning up" of another set may be possible. For example, the following pseudo code:

```
CMP     status32 <- r1,r2
CJMP.eq     status32,node 2,node 4
CJMP.gt     status32,node 3,node 5
```

Would be changed to:

```
CMP     status32 <- r1,r2
CJMP.eq     status32,node 2,node 4
CMP     status32 <- r1,r2     // added CMP to allow
  for further optimizations
CJMP.gt     status32,node 3,node 5
```

Which would then collapse into the following:

```
CMPJMP.eq   r1,r2,node 2,node 4
CMPJMP.gt   r1,r2,node 3,node 5
```

Appendix V contains exemplary code, adapted for the ARCompact environment, which accomplishes the foregoing functionality.

It will be recognized that in the context of the exemplary ARCompact ISA (and any other comparable architectures), there may a large variety of different instruction formats (e.g., an exemplary "add" instruction has up to 26 different encodings for the 32- and 16-bit formats). The ARCompact ISA is unique from the standpoint that it generates code for a homogeneous; e.g., 32-bit, instruction set initially, and then reduces the size of the instructions where applicable. Unlike prior art approaches (such as those employed by ARM, MIPS, and others), the ARCompact ISA can freely intermix 32-bit and 16-bit instructions within the same function; separate code for 32-bit and 16-bit functions need not be generated. Specifically, in one exemplary embodiment, the aforementioned initial 32-bit coding is subsequently evaluated and adapted so as to reduce code size (and to fit the 32-bit codings into the ARCtangent instruction set). The instructions are then sized and reduced to 16-bit where applicable.

Figure 6:
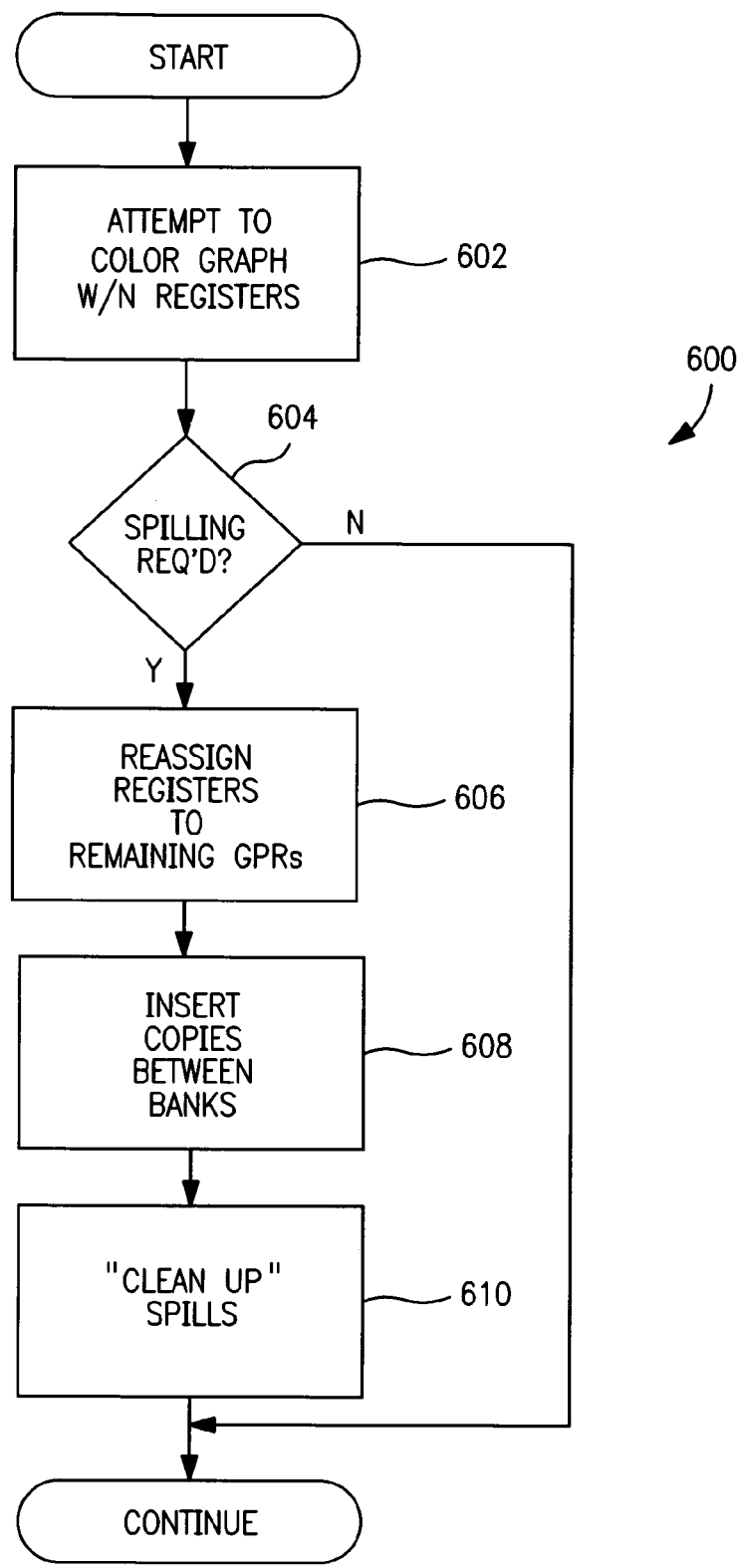
FIG. 6 is logical flow diagram illustrating one exemplary embodiment of register allocation methodology of the present invention.

Register Allocation—A significant aspect of instruction selection relates to determining which general purpose machine registers (GPRs) are used in the instructions. Under the exemplary compressed instruction stream of the ARCtangent A5 processor, for example, eight (8) GPRs may be used in most of the 16-bit instructions. Global register allocation must therefore be considered in this regard, especially with respect to coloring and spilling inadequacies. Accordingly, another aspect of the present invention provides for an improved methodology for register allocation using a limited number of registers. As shown in the exemplary embodiment of FIG. 6, the method 600 generally comprises first attempt to color the graph with a predetermined or limited number n of registers (e.g., 8) per step 602. If spilling is required (i.e., more than n−1 or 7 registers alive in any one basic block) per the determination of step 604, then the chosen registers are reassigned to the remaining GPRs per step 606. Copies are also inserted into the graph between these two "banks" (colors) of registers per step 608. Specifically, in the present embodiment, the copies are forced into the different register banks so that normal coalescing of registers within the coloring algorithms cannot occur (which would increase the size of the generated code significantly).

Next, after spilling has occurred, spills are "cleaned up" through aggressive coalescing of instructions; i.e., eliminating registers alive across an instruction.

In the illustrated embodiment, this methodology is accomplished specifically as follows. After assigning a different color to the virtual registers that are going to be spilled, a pass of local common sub-expression elimination (on a per basic block basis) is performed to remove redundant copy instructions inserted into the graph. Since the colors of the registers in the COPY instruction are different, the COPY effectively becomes a transfer instruction between banks (XFER). Next, it is determined whether the graph is colorable. If not, the "normal" spill to memory operations are performed. Once all the virtual registers have been spilled to either a register of a different color or to memory, normal register allocation is performed. Since the XFER instructions have been inserted within the graph, the coloring algorithm cannot consider the registers to be "buddies" of each other since they have distinct colors. Hence, a priority is in effect forced onto the register used within the instruction that allows use of the 8 registers that the compressed instructions require. As will be recognized, this technique can potentially cause code "bloat" since there can be many XFER instructions between the banks.

After register allocation is complete, the flow graph is analyzed and aggressive reduction of the instructions performed as previously described herein (Instruction Selection). An example of this methodology is as follows:

```
ADD     r0,r1,r2
MOV     r16,r0; spill due to register pressure on original 8 registers
ADD     r0,r2,r3
MOV     r2,r16; re-load of spill
ADD     r0,r0,r2
```

Since the coloring algorithm tried to weigh the coloring to the reduced number of registers, the MOV instructions were generated. If no change was made to the instruction, the generated code size would be 10 bytes. If there are no other uses of the destination registers in the MOV instructions (in the above example both MOVs are superfluous), the number of instructions, as well as the clk-cnt necessary for executing the instructions, can be reduced by coalescing the MOV instructions into their surrounding def/use. In one exemplary approach, the first two instructions are coalesced by replacing the destination of the first ADD with the destination of the first MOV; the third ADD is coalesced by replacing its second source register with the source of the previous MOV instruction. After this process is complete, the following result is obtained:

```
ADD   r16,r1,r2;    4-bytes in size now instead of 2
ADD   r0,r2,r3;     unchanged, still 2-bytes
ADD   r0,r0,r16;    unchanged in size, still 2bytes since we have
                    ; an ADD encoding that allows addition of a
                    ; compressed and a non-compressed register together
                    ; with the destination being the same compressed
                    register as the source
```

By aggressively coalescing the instructions, the clock count is reduced by 1, and the code size reduced by 2 bytes. By using this technique across the entire flow graph, when spills are required, significant reduction of the code size as well as the clock counts is obtained. This is especially true since memory operations, which are typically slower then the speed of the processor, are advantageously not used. This approach has significant advantages in programs with fairly large and complex functions.

Appendix VI hereto provides exemplary code implementing the foregoing register allocation functionality in the context of the ARCtangent A5 processor.

Constant Generation—In yet another aspect of the invention, improved methods for constant generation are disclosed. Specifically, since the ARC ISA has several instructions for scaled multiply and add/sub instructions (a=b+(c*8) can be encoded in 1 instruction), a great amount of strength reduction can be performed when constant multiply operations present in the code are found. In practice, many compilers take advantage of the well known algorithm described by Robert D. Grappel in Dr. Dobb's Journal, March 1987 (or some variant thereof). This algorithm converts a multiply operation to a series of shift and add/sub instructions. For example, a multiply by the constant 9 would generate the following pseudo code:

```
SLL  r100 <- r2,3
ADD  r101 <- r100,r2
```

More complicated shift/add sequences generally cannot take advantage of the available instructions within the ISA. It may be desirable to generate:

```
MPYADD  r101 <- r100,r2,3
``` which could then be transformed into one 16-bit instruction versus two 16-bit instructions. Since the use of these MPY-ADD and MPYSUB instructions require such a different view of the constants being used, significant modifications to the typical "powers of two" method currently used are necessitated.

Appendix VII hereto provides exemplary code implementing the foregoing constant generation functionality in the context of the ARCtangent A5 processor.

Integrated Circuit (IC) Device

Figure 7:
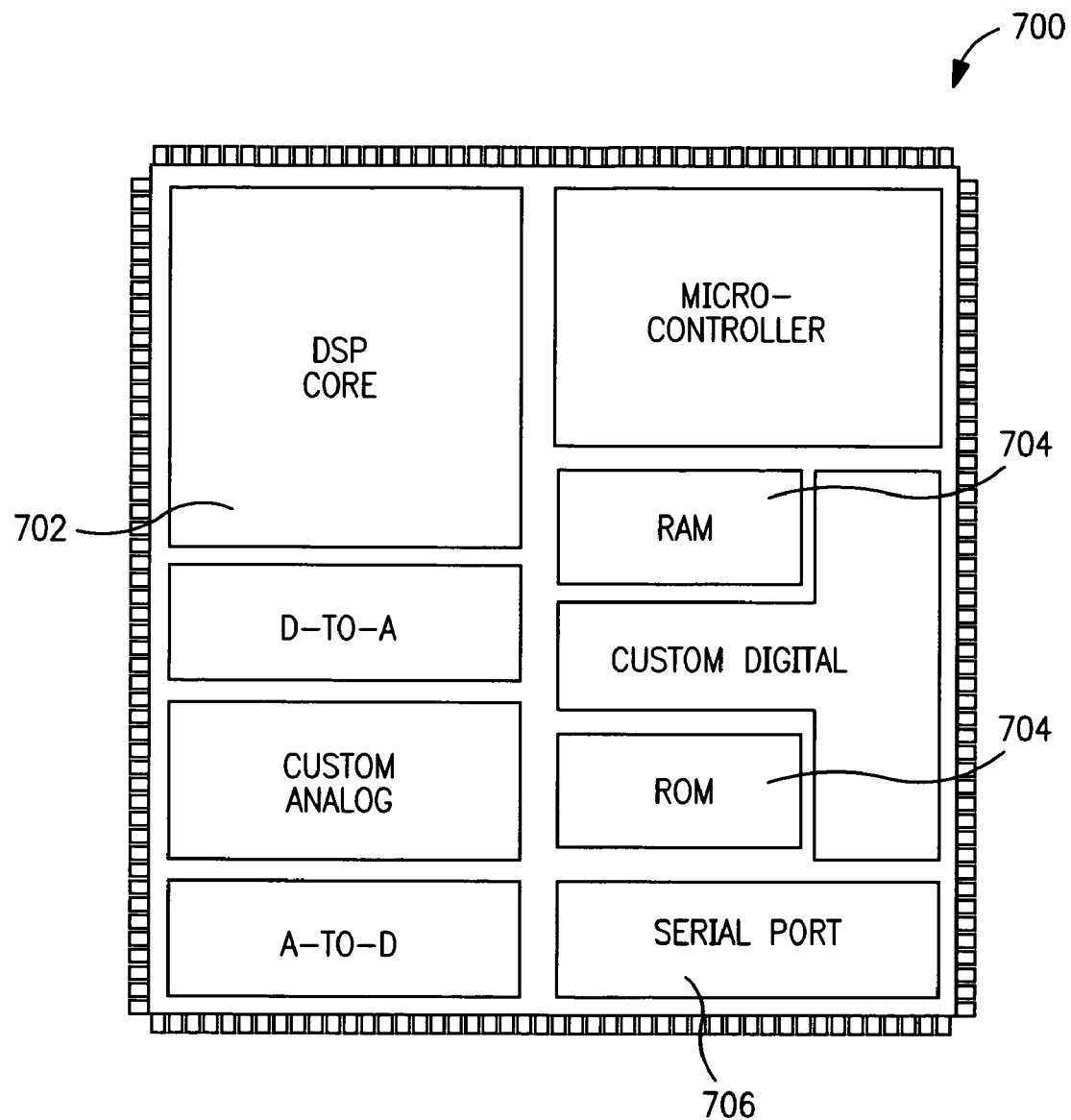
FIG. 7 is block diagram illustrating an exemplary embodiment of an SoC integrated circuit device incorporating using the improved address calculation and other aspects of the ISA of the invention.

Referring now to FIG. 7, one exemplary embodiment of an integrated circuit device generated from the improved instruction set selection, addressing, pooling, and compression methodologies previously described herein is disclosed. As previously described, the Assignee's ARCtangent processor core configuration with improved (ARCompact) ISA is used as the basis for the IC device; however, other arrangements and configurations may be substituted if desired.

As shown in FIG. 7, the integrated circuit device 700 is digital processor SoC device having, inter alia, a processor core 702, on-chip memory 704, and an external interface 706. The device is fabricated using the customized VHDL design obtained using the method referenced subsequently herein, which is then synthesized into a logic level representation, and then reduced to a physical device using compilation, layout and fabrication techniques well known in the semiconductor arts. For example, the present invention is compatible with 0.35, 0.18, 0.13, and 0.1 micron processes, and ultimately may be applied to processes of even smaller or other resolution. An exemplary process for fabrication of the device is the 0.1 micron "Blue Logic" Cu-11 process offered by International Business Machines Corporation, although others may be used.

It will be appreciated by one skilled in the art that the IC device of FIG. 7 may also contain any commonly available peripheral such as serial communications devices, parallel ports, timers, counters, high current drivers, analog to digital (A/D) converters, digital to analog converters (D/A), interrupt processors, LCD drivers, memories and other similar devices. Further, the processor may also include other custom or application specific circuitry, such as to form a system on a chip (SoC) device useful for providing a number of different functionalities in a single package as previously referenced herein. The present invention is not limited to the type, number or complexity of peripherals and other circuitry that may be combined using the method and apparatus. Rather, any limitations are primarily imposed by the physical capacity of the extant semiconductor processes which improve over time. Therefore it is anticipated that the complexity and degree of integration possible employing the present invention will further increase as semiconductor processes improve.

It will be further recognized that any number of methodologies for synthesizing logic incorporating the enhanced ISA functionality previously discussed may be utilized in fabricating the IC device 600 of FIG. 7. One exemplary method of synthesizing integrated circuit logic having a user-customized (i.e., "soft") instruction set is disclosed in co-pending U.S. patent application Ser. No. 09/418,663 entitled "Method And Apparatus For Managing The Configuration And Functionality Of A Semiconductor Design" filed Oct. 14, 1999, which is incorporated herein by reference in its entirety, and assigned to the Assignee hereof. Other methodologies, whether "soft" or otherwise, may be used, however.

It will be appreciated that while certain aspects of the invention have been described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

© 2000-2002 ARC International. All rights reserved.

```
static void cvt_to_ldst_instr(IL_entry *il,
                              IL_opd o32,IL_opd o16,int is_def) {
//printf("..cvt_to_ldst: "); print_il(il);
    if (!SSA_tog || may_execute_throw || il->len > REGSIZE ||
        il->op == il_LA ||
        (il_opds_equal(o32,o16) && il->op != il_MOVE)) {
        // we can't do this optimization for MOVE since the other side
        // may need 2 different EAs. put_move_arc() deals with this.
        if (is_def) DEST1(il) = o32;
        else SRC1(il) = o32;
        }
    else if (il->op == il_STORE) {
        il->op = il_PSEUDO; SET_PSEUDO_NO(il,DUAL_EA_STORE_func);
        DEST1(il) = o32;
        il->append_def_opd(&o16);
        }
    else if (il->op == il_LOAD) {
        il->op = il_PSEUDO; SET_PSEUDO_NO(il,DUAL_EA_LOAD_func);
        SRC1(il) = o32;
        il->append_src_opd(&o16);
        }
    else if (il->op == il_LOADU) {
        il->op = il_PSEUDO; SET_PSEUDO_NO(il,DUAL_EA_LOADU_func);
        SRC1(il) = o32;
        il->append_src_opd(&o16);
        }
    else if (il->op == il_LA) {
        il->op = il_PSEUDO; SET_PSEUDO_NO(il,DUAL_EA_LA_func);
        SRC1(il) = o32;
        il->append_src_opd(&o16);
        }
    else if (il->op == il_MOVE) {
        // since this one is done in parts, we don't change the op.
        // put_move_arc() does that.
        if (is_def) {
            DEST1(il) = o32;
            il->append_def_opd(&o16);
            }
        else {
            SRC1(il) = o32;
            il->append_src_opd(&o16);
            }
        }
    else if (il->op == il_PSEUDO) {
      switch (_arc_case_type(PSEUDO_NO(il))) {
            case STORE_BITU_func: {
              SET_PSEUDO_NO(il,DUAL_EA_STORE_BITU_func);
              goto do_st_bits;
            case STORE_UNCACHED_BITU_func:
              SET_PSEUDO_NO(il,DUAL_EA_STORE_UNCACHED_BITU_func);
              goto do_st_bits;
            case STORE_UNCACHED_BITS_func:
```

```
                    SET_PSEUDO_NO(il,DUAL_EA_STORE_UNCACHED_BITS_func);
                    goto do_st_bits;
                case STORE_BITS_func:
                    SET_PSEUDO_NO(il,DUAL_EA_STORE_BITS_func);
do_st_bits:         ;
                    DEST1(il) = o32;
                    il->append_def_opd(&o16);
                    } break;
                case LOAD_BITS_func: {
                    SET_PSEUDO_NO(il,DUAL_EA_LOAD_BITS_func);
                    goto ld_bits;
                case LOAD_UNCACHED_BITS_func:
                    SET_PSEUDO_NO(il,DUAL_EA_LOAD_UNCACHED_BITS_func);
                    goto ld_bits;
                case LOADU_UNCACHED_BITS_func:
                    SET_PSEUDO_NO(il,DUAL_EA_LOADU_UNCACHED_BITS_func);
                    goto ld_bits;
                case LOADU_BITS_func:
                    SET_PSEUDO_NO(il,DUAL_EA_LOADU_BITS_func);
ld_bits:            ;
                    IL_opd bitlen = SRC3(il);
                    il->append_src_opd(&bitlen);
                    SRC3(il) = SRC2(il);
                    SRC2(il) = o16;
                    SRC1(il) = o32;
                    } break;
                default: goto err;
                }
        }
        else {
err:        ;
            system_error("arc:normalize:cvt_to_ldstr","op botch",ABORT);
            }
        return;
        }
```

```
static void strip_index_and_scale(Adrrec *m,graph_builder *gb) {
    if (m->index == null_reg) return;
    // we can't have an index on a store, or on a load with an offset,
    // we treat all the same way: no index and scale allowed.
    // opt/ssa.cc will undo this if need be.
    Register b = m->index;
    if (m->scale > 1) {
      b = putri(il_MPY,tc_INT,REGSIZE,b,m->scale,gb);
      m->scale = 1;
      }
    m->index = null_reg;
    if (m->base == null_reg) m->base = b;
    else {
      m->base = putrr(il_ADDA,tc_UINT,REGSIZE,m->base,b,gb);
      }
    } static void fix_segrel_ref(IL_entry *il,
                Adrrec *m,
                SectionHandle sect,
                long off,
                int is_def,
                graph_builder *gb) {
    IL_opd fixit(Adrrec *m,int lo,int hi) {
      m->klass = SEGREL_ea;
      int page,disp;
      compute_page_disp(m->disp+off,lo,hi,&page,&disp,m->len);
      m->disp = disp;
      m->adjust -= page;
      Register b = put_section_address(sect,page,gb);
      if (m->base == null_reg) m->base = b;
      else {
          m->base = putrr(il_ADDA,tc_UINT,REGSIZE,m->base,b,gb);
          }
      m->sect = sect;
      if (page) m->base_is_biased = TRUE;
      strip_index_and_scale(m,gb);
      IL_opd o = null_opd; o.type = EA_i; SET_oEA(o,new_ea(m));
      return o;
      }
    Adrrec m32 = *m,m16 = *m;
    cvt_to_ldst_instr(il,fixit(&m32,-256,255),fixit(&m16,0,31),is_def);
    }
```

```
static void do_disp(IL_entry *il,Adrrec *m,int len,
                int is_def,graph_builder *gb) {
    int frame_rel = Oneof2(m->base,FP_REG,SP_REG);
    IL_opd fixit(Adrrec *m,int lo,int hi) {
      int page,disp;
      compute_page_disp(m->disp,lo,hi,&page,&disp,m->len);
      m->disp = disp;
      m->adjust -= page;
      if (page) {
          if (m->base) {
              m->base = putri(il_ADDA,tc_UINT,REGSIZE,m->base,page,gb);
              }
          else m->base = puti(il_LI,REGSIZE,page,gb);
          m->base_is_biased = TRUE;
          }
      strip_index_and_scale(m,gb);
      IL_opd o = null_opd; o.type = EA_i; SET_oEA(o,new_ea(m));
      return o;
      }
    Adrrec m32 = *m,m16 = *m;
    int _s_hi = frame_rel ? 124 : 31;
    cvt_to_ldst_instr(il,fixit(&m32,256,255),
                fixit(&m16,0,_s_hi),is_def);
    } static void fix_extrel_ref(IL_entry *il,Adrrec *m,
                    int len,int is_def,graph_builder *gb) {
    IL_opd fixit(Adrrec *m,int lo,int hi) {
      m->klass = EXTREL_ea;
      int page,disp;
      compute_page_disp(m->disp,lo,hi,&page,&disp,m->len);
      m->disp = disp;
      m->adjust -= page;
      Register b = null_reg;
      if (m->var) {
          b = put_global_address(m->var,page,REGSIZE,gb);
          }
      else if (m->lab) {
          b = put_load_lit(m->lab,page,gb);
          }
      else {
          system_error("arc:normalize:do_load_adrrec",
            "unknown adrrec type",ABORT);
          }
      if (m->base == null_reg) m->base = b;
      else {
          m->base = putrr(il_ADDA,tc_UINT,REGSIZE,m->base,b,gb);
          }
      if (page) m->base_is_biased = TRUE;
      strip_index_and_scale(m,gb);
      IL_opd o = null_opd; o.type = EA_i; SET_oEA(o,new_ea(m));
      return o;
      }
    Adrrec m32 = *m,m16 = *m;
    cvt_to_ldst_instr(il,fixit(&m32,-256,255),fixit(&m16,0,31),is_def);
    }
```

```
static void do_var(IL_entry *il,Adrrec *m,int len,
                   int is_def,graph_builder *gb) {
    VarInfoHandle vp = varinfo(m->var);
    if (m->align == 0) m->align = var_align(vp);
    switch(var_class(vp)) {
       case s_COMMON: case s_IMPORT: case s_EXPORT:
          /*
           * If exported variables are to be referenced as
           * imported variables (i.e., not section relative) then
           * so be it.
           */
          if (var_class(vp) != s_EXPORT ||
            machine->treat_var_as_import(m->var)) {
            fix_extrel_ref(il,m,len,is_def,gb);
            break;
          }
          /* fall-thru */
       case s_STATIC: case s_STATIC_DEFINED: {
          SectionHandle sect = var_section(vp);
          if (Oneof2(sect,null_section,alternate_data_section) ||
            /* bigger then page size is no good */
            (sect == bss_section && var_length(varinfo(m->var)) >= 128)
            || machine->treat_var_as_import(m->var)) {
            fix_extrel_ref(il,m,len,is_def,gb);
            break;
          } static void normalize(IL_entry *il,Adrrec *m,int is_def,
                      graph_builder *gb) {
    if (trace_il) {printf("..normalize: "); print_il(il);}
    IL_entry *lil = gb->last_il_put;
    gb->last_il_put = il_prev(il);
    int len = il->len;
    if (m->klass == DIRECT_ea) {
      if (m->var != null_var) do_var(il,m,len,is_def,gb);
      else if (m->lab != null_label) do_lab(il,m,len,is_def,gb);
      else {
           if (m->align == 0) {
               align_t al = SYS_MAX_VARIABLE_AL;
               m->align = alignment_boundary_of(m->disp,al);
               }
           if (m->base == null_reg) {
             // we have something like:
             //    (*(char*)(4294967295UL)) = -1;
             m->base = puti(il_LI,REGSIZE,0,gb);
             }
           if (m->pointer_base == null_reg) m->pointer_base = m->base;
           do_disp(il,m,len,is_def,gb);
           }
      }
    gb->last_il_put = lil;
    if (trace_il) {
      printf("after normalize: "); print_il(il);
      }
    }
```

```
PUBLIC int put_move_arc(IL_opcode op,
                Adrrec *dest,
                Adrrec *src,
                long len,
                Register rlen,
                int alignment,
                graph_builder *gb) {
    if (trace_il) {
      printf("[canon] put_move...\n");
      printf("..dest="); print_adrrec(dest);
      printf("..src="); print_adrrec(src);
      }
    IL_entry *move = alloc_IL_after(gb->last_il_put,op,alignment,3,gb);
    move->op = op;
    DEST1(move).type = EA_i; SET_oEA(DEST1(move),new_ea(dest));
    SRC1(move).type = EA_i; SET_oEA(SRC1(move),new_ea(src));
    if (rlen == null_reg) make_int_opd(&SRC2(move),len);
    else {
         SRC2(move).type = REG_i;
         SET_oREG(SRC2(move),rlen);
         }
    normalize(move,dest,TRUE,gb);
    normalize(move,src,FALSE,gb);
    if (SSA_tog && !may_execute_throw &&
       (il_def_cnt(move) > 1 || il_src_cnt(move) > 2)) {
      move->op = il_PSEUDO;
      if (il_def_cnt(move) == 1) {
          move->append_def_opd(DEST1(move));
          }
      if (il_src_cnt(move) == 2) {
          move->append_src_opd(SRC1(move));
          }
      SET_PSEUDO_NO(move,DUAL_EA_MOVE_func);
      }
    if (trace_il) {printf("..final move il: "); print_il(move);}
    return TRUE;
    }

PUBLIC Register put_load_arc(Adrrec *m,
                 type_class tc,
                 unsigned len,
                 graph_builder *gb) {
    if (trace_il) {printf("[canon] put_load: "); print_adrrec(m);}
    if_signed_bits_then_get_tc_right(m,&tc);
    if_word_then_kill_bitlen(m,&len);
    check_for_misaligned_pointer_derefs(m);
    if (IS_REG_EA(*m)) {
      if (m->bitlen) {
          system_error("canon:put_load_arc",
            "no bitfields on regvar",ABORT);
          }
      int shiftby = 0;
      Register second = null_reg;
      Register r = adrrec_reg(m,m->off,len,&shiftby,&second);
      if (shiftby != 0 || second != null_reg) {
          system_error("canon:put_load_arc",
```

```
                        "adrrec_reg() botch",ABORT);
        }
    if (IS_MACHINE_REG(r)) {
        r = putr(il_COPY,tc,regtab[r].size,r,gb);
        }
    return r;
    }
    // attach small data info or thread-local storage info to the adrrec.
    bool done = deal_with_sdata_and_tls_data(m,gb);
    // compute the load as if we had full base/index/scale/disp since
    // we want to find this register exactly the same way each time.
    IL_entry *il = alloc_IL_after(gb->last_il_put,il_LOADU,len,1,1,gb);
    SRC1(il) = make_ea(m,len);
    int bits_done = 0;
#define doing_getbit\
    (!xbarrel_shifter_tog || (m->bitsigned && optimize_for_space))
    if (m->bitlen && doing_getbit) {
        // for bitfields that we're not going to gen inline, create
        // a pseudo bitfield load of the kind:
        //     PSEUDO.getbitu.4    <EA>,#5,#4
        // where Src1 is the EA, Src2 is the bit offset into the EA,
        // and Src3 is the number of bits being extracted.
        cvt_bits(il,m,m->bitsigned ? LOAD_BITS_func : LOADU_BITS_func);
        bits_done = 1;
        }
    Register r = null_reg;
    if (!(m->type_flags & tf_VOLATILE)) {
        bool found = compute_dest_reg(il,tc,len);
        r = oREG(DEST1(il));
        if (!found && !bits_done) {
            // first time for this register -- setup recomputable.
            // bit functions don't count -- they have side-effects.
            regtab[r].recomputable = is_recomputable_EA(oEA(SRC1(il)));
            // regardless of the recomputable-ness of this IL,
            // opt/loopmem.cc
            // needs to know the shadow location for this register.
            regtab[r].il = dup_il(il);
            }
        }
    else {
        // volatile are never commoned up. load/store must always
        // be materialized.
        r = get_unique_reg(tc,len);
        il->tc = tc;
        DEST1(il).type = REG_i;
        SET_oREG(DEST1(il),r);
        regtab[r].notcse = TRUE;
        }
    normalize(il,m,FALSE,gb);
    if (trace_il) {printf("..final load il: "); print_il(il);}
    if (!bits_done && m->bitlen)   {
        // we're doing the bitfield extraction inline. Go do it.
        r = extract_field(il,m,gb);
        }
    return r;
    }
```

```
PUBLIC Register put_store_arc(Register src,Adrrec *m,type_class tc,
                unsigned dest_len,unsigned src_len,
                graph_builder *gb) {
   if (trace_il) {
     printf("[canon] put_store: "); print_adrrec(m);
     printf("..dest_len=%d,src_len=%d\n",dest_len,src_len);
   }
   if_signed_bits_then_get_tc_right(m,&tc);
   if_word_then_kill_bitlen(m,&dest_len);
   check_for_misaligned_pointer_derefs(m);
   int is_volatile = (m->type_flags & tf_VOLATILE) != 0;
   if (IS_MACHINE_REG(src)) {
      // because of load/store eliminations (copy inserted after the
      // store), we need to move a machine reg into a virtual register
      // so that the virtual register can be safely moved down. We also
      // need to do it in case of tls issues.
      IL_entry *copy = alloc_IL_after(gb->last_il_put,
                      il_COPY,src_len,1,1,gb);
      SRC1(copy).type = REG_i; SET_oREG(SRC1(copy),src);
      src = get_unique_reg(tc,src_len);
      DEST1(copy).type = REG_i; SET_oREG(DEST1(copy),src);
      if (trace_il) {
          printf("..copy machine src into virtual: "); print_il(copy);
      }
   }
   // comes after the copy of the machine reg into a virtual reg.
   bool done = deal_with_sdata_and_tls_data(m,gb);
   if (IS_REG_EA(*m)) {
      if (m->bitlen) {
          system_error("canon:put_load_arc",
                      "no bitfields on regvar",ABORT);
          mwassert((m->ea_flags & ea_XY) == 0); // No X/Y bit fields
      }
      int shiftby = 0;
      Register second = null_reg;
      Register r = adrrec_reg(m,m->off,dest_len,&shiftby,&second);
      if (shiftby != 0 || second != null_reg) {
          system_error("canon:put_load_arc",
                      "adrrec_reg() botch",ABORT);
      }
      if (trace_il) {
          printf("..reg="); print_reg(r,stdout); printf("\n");
      }
      if (src_len > dest_len) {
          src = cvt_int(src,is_signed(tc),src_len,dest_len,gb);
      }
      put_copy(il_COPY,dest_len,r,src,gb);
      if (trace_il) {
          printf("..final store il: "); print_il(gb->last_il_put);
      }
      return r;
   }
   else if (m->bitlen) {
      // get conversion right. We completely disable the usual
      // after the STORE that the optimizer does - to many issues (plus
      // SSA does a better job of eliminating the conversion.)
      if (m->bitsigned) {
```

```
        int shiftby = 32,shiftsize = 4;
        if (regtab[src].size > REGSIZE) {
            shiftby = 64; shiftsize = 8;
            }
        shiftby -= m->bitlen;
        IL_entry *s1,*s2;
        s1 = alloc_IL_after(gb->last_il_put,il_SLL,shiftsize,1,2,gb);
        SRC1(s1).type = REG_i; SET_oREG(SRC1(s1),src);
        make_int_opd(&SRC2(s1),shiftby);
        compute_dest_reg(s1,tc_INT,shiftsize);
        s2 = alloc_IL_after(gb->last_il_put,il_SRA,shiftsize,1,2,gb);
        SRC1(s2) = DEST1(s1);
        make_int_opd(&SRC2(s2),shiftby);
        compute_dest_reg(s2,tc_INT,shiftsize);
        src = oREG(DEST1(s2));
        }
    else {
        int shiftby = m->bitlen,shiftsize = 4;
        if (regtab[src].size > REGSIZE) shiftsize = 8;
        IL_entry *s1;
        s1 = alloc_IL_after(gb->last_il_put,il_AND,shiftsize,1,2,gb);
        SRC1(s1).type = REG_i; SET_oREG(SRC1(s1),src);
        if (shiftsize > REGSIZE) {
          Big_int v = {-1,-1},v1;
          v1.lo = shiftby;
          v1.hi = 0;
          v = bshl(v,v1);
          v.lo = ~v.lo; v.hi = ~v.hi;
          make_bigint_opd(&SRC2(s1),v);
          }
        else make_int_opd(&SRC2(s1),~(-1 << shiftby));
        compute_dest_reg(s1,tc_UINT,shiftsize);
        src = oREG(DEST1(s1));
        }
    }

IL_entry *store = NULL;
Register result = src;
if (is_volatile) {
  // can't optimize load/stores of volatile memory. Don't even try
  // for a recomputable here.
  IL_entry *store =
    alloc_IL_after(gb->last_il_put,il_STORE,dest_len,1,1,gb);
  if (m->ea_flags & ea_XY) store->op = il_pST;
  DEST1(store) = make_ea(m,dest_len);
  SRC1(store).type = REG_i; SET_oREG(SRC1(store),src);
  if (m->bitlen) {
      cvt_bits(store,m,m->bitsigned ?
              STORE_BITS_func : STORE_BITU_func);
      }
  normalize(store,m,TRUE,gb);
  fixup_store_bit(store);
  return src;
  }
// now, determine the result reg of a load of this same EA.
store = alloc_IL_after(gb->last_il_put,il_LOADU,dest_len,1,1,gb);
if (tc == tc_INT && dest_len < REGSIZE) store->op = il_LOAD;
```

```
SRC1(store) = make_ea(m,dest_len);
int must_compute_result = 1;
if (m->bitlen) {
  if (!doing_getbit) {
      // since we don't have the final result of the load register,
      // we won't do the valnum copy thing below.
      result = src;
      must_compute_result = 0;
      }
  _arc_case_type t = m->bitsigned ?
          LOAD_BITS_func : LOADU_BITS_func;
  cvt_bits(store,m,t);
  }
if (must_compute_result) {
  compute_dest_reg(store,tc,dest_len);
  result = oREG(DEST1(store));
  must_compute_result = 0;
  }
// change it to a store    DEST1(store) = SRC1(store);
SRC1(store) = null_opd;
SRC1(store).type = REG_i; SET_oREG(SRC1(store),src);
if (m->bitlen) {
  _arc_case_type t = _arc_case_type(PSEUDO_NO(store));
  switch (t) {
      case LOAD_BITS_func: t = STORE_BITS_func; break;
      case LOADU_BITS_func: t = STORE_BITU_func; break;
      case LOAD_UNCACHED_BITS_func:
          t = STORE_UNCACHED_BITS_func;
          break;
      case LOADU_UNCACHED_BITS_func:
          t = STORE_UNCACHED_BITU_func;
          break;
      default:
          system_error("put_store","unknown bit helper",ABORT);
      }
  SET_PSEUDO_NO(store,t);
  }
else store->op = il_STORE;
canon_xy_ldst(store,m);
normalize(store,m,TRUE,gb);
fixup_store_bit(store);
if (trace_il) {printf("..final store il: "); print_il(store);}
if (result != src) {
  put_copy(il_COPY,dest_len,result,src,gb);
  /*
   * turn on the "CHANGED_BY_VALNUM" bit (a misnomer) to tell CSE
   * that this register def doesn't represent the identity of the
   * destination register, but rather is a synonym for it.
   */
  gb->last_il_put->flags |= CHANGED_BY_VALNUM_IL;
  }
// the src has been correctly sized, don't do the result reg here.
return src;
}
```

APPENDIX II

© 2000-2002 ARC International. All rights reserved.

```
static void delete_EA_opd(IL_entry *il, int which_one) {
    _arc_case type t = _arc_case_type (PSEUDO_NO(il));
    switch (t) {
        case DUAL_EA_LOAD_UNCACHED_BITS_func: {
            SET_PSEUDO_NO (il, LOAD_UNCACHED_BITS_func);
            goto ldbits;
        case DUAL_EA_LOADU_UNCACHED_BITS func:
            SET_PSEUDO_NO (il, LOADU_UNCACHED_BITS_func);
            goto ldbits;
        case DUAL_EA_LOAD_BITS_func:
            SET_PSEUDO_NO (il, LOAD_BITS_func);
            goto ldbits;
        case DUAL_EA_LOADU_BITS_func:
            SET_PSEUDO_NO (il, LOADU_BITS_func);
ldbits:     ;
            if (which_one == 1) SRC1 (il) = SRC2 (il);
            SRC2 (il) = SRC3 (il);
            SRC3 (il) = SRC4 (il);
            il->set_src_cnt (3);
        } break;
        case DUAL_EA_LOAD_func: {
            il.op = il_LOAD;
            il.cond = Cond_NULL;
            goto fixit;
        case DUAL_EA_LA_func:
            il->op = il_LA;
            il->cond = Cond_NULL;
            goto fixit;
        case DUAL_EA_LOADU_func:
            il.op = il_LOADU;
            il.cond = Cond_NULL;
fixit:      ;
            if (which_one == 1) SRC1 (il) = SRC2 (il);
            il->set_src_cnt(1);
        } break;
        case DUAL_EAT_STORE_UNCACHED_BITU_func: {
            SET_ PSEUDO_NO (il, STORE_UNCACHED_BITU_func);
            goto stbits;
        case DUAL_EA_STORE_UNCACHED_BITS_func:
            SET_PSEUEO_NO (il, STORE_UNCACHED_BITS_func);
            goto stbits;
        case DUAL_EA_STORE_BITU_func:
            SET_PSEUDO_NO (il, STORE_BITU_func);
            goto stbits;
        case DUAL_EA_STORE_BITS_func:
            SET_PSEUDO_NO (il, STORE_BITS_func);
stbits:            ;
            if (il_src_cnt(il) != 5) {
                print_il (il);
                system_error("arc:ssa:delete_ea_opd",
                    "wrong src cnt for storebits", ABORT);
            }
            if (il_def_cnt (il) != 2) {
                print_il (il);
                system_error("arc:ssa:delete_ea_opd",
                    "wrong def cnt for storebits", ABORT);
            }
            if (which_one == 1) {
                DEST1(il) =DEST2 (il);
                SRC4 (il) = SRC5 (il);
            }
            il->set_def_cnt (1);
            il->set_src_cnt (4);
        } break;
        case DUAL_EA_STORE_func:
            if (which_one == 1) DEST1(il) = DEST2 (il);
            il->set_def_cnt(1);
            il.op =il_STORE;
            il.cond = COND_NULL;
            break;
```

APPENDIX II-continued

© 2000-2002 ARC International. All rights reserved.

```
        default:
            system_error("SSA-delete-ea-opd","unknown IL", ABORT);
            break;
    }
}
static int do_canonicalization(bool *live_dead_bad) {
    determine_ref_counts(1);
    int deleted_something = 0;
    if (trace_ssa_tog)
        printf("[ssa] deal with dual-EA instructions . . . \n");
    for_each_node(bp, n) {
    for_each_il(il, bp) {
            if (trace_ssa_tog) {
                printf("looking at: "); print_il (il); fflush(stdout);
            }
            EA_entry *ep = NULL;
            /////////////////////////////////////////////////////
            int ldst_common(void) {
                long cnt = 0;
                if (ep.base.type == REG_i) {
                    cnt += REG_REFS_CNT(oREG(ep.base));
                }
                if (ep.index.type == REG_i) {
                    cnt += REG_REFS_CNT(oREG(ep.index));
                }
                return cnt ? cnt : 1;
            }
            /////////////////////////////////////////////////////
            if (il.op == il_PSEUDO)
            switch (_arc_case_type(PSEUDO_NO(il))) {
                case DUAL_EA_MOVE_func: {
                    // take care of srcs
                    ep = oEA(SRC1(il));
                    int cnt1 =ldst common( );
                    ep = oEA(SRC3 (il));
                    int cnt2 = ldst_common( );
                    if (cnt2 >= cnt1) {
                        SRC1(il) = SRC3 (il);
                        il->set_src_cnt(2);
                    }
                    // take care of defs
                    ep = oEA(DEST1 (il));
                    int cnt3 = ldst_common( );
                    ep = oEA(DEST2 (il));
                    int cnt4 = ldst_common( );
                    if (cnt4 >= cnt3) {
                        DEST1(il) = DEST2 (il);
                        il->set_def_cnt(1);
                    }
                    il->cond = Cond_NULL;
                    il->op = il_MOVE;
                    deleted_something++;
                } break;
        case DUAL_EA_LA_func:
        case DUAL_EA_LOADU_UNCACHED_BITS_func:
        case DUAL_EA_LOAD_UNCACHED_BITS_func:
        case DUAL_EA_LOADU_BITS_func: case DUAL_EA_LOAD_BITS_func:
        case DUAL_EA_LOAD_func: case DUAL_EA_LOADU_func: {
                if (trace_ssa_tog) {
                    printf("looking at: "); print_il (il); fflush(stdout);
                }
                ep = oEA(SRC1 (il));
                int cnt1 = ldst_common( );
                ep = oEA(SRC2 (il));
                int cnt2 = ldst_common( );
                delete_EA_opd (il,l+ (cnt2 >= cnt1));
                deleted_something++;
            } break;
        case DUAL_EA_STORE_UNCACHED_BITU_func:
        case DUAL_EA_STORE_UNCACHED_BITS_func:
        case DUAL_EA_STORE_BITU_func:
```

APPENDIX II-continued

© 2000-2002 ARC International. All rights reserved.

```
        case DUAL_EA_STORE_BITS_func:
        case DUAL_EA_STORE_func: {
                if (trace_ssa_tog) {
                    printf("looking at: "); print_il (il); fflush(stdout);
                }
                ep =oEA(DEST1(il));
                int cnt1 =ldstcommon();
                ep =oEA(DEST2(il));
                int cnt2 =ldst common();
                delete EA_opd(il,1+(cnt2 >=cnt1));
                deleted_something++;
                } break;
            }
        } end_for
    } end_for
if (deleted_something && live_dead_bad) *live_dead_bad = TRUE;
// so no other dual-EAs emitted . . . .
return deleted_something;
}
```

APPENDIX III

© 2000-2002 ARC International. All rights reserved.

```
// example of converting an existing 32-bit instruction into
// something use-able by compressed instruction set.
static void modify_r_imm_r_instr(gentab **_gp, bool is_delay_slot) {
  if (is_delay_slot) return;
  gentab *gp = *_gp;
    Register a = get(r_imm_r, a);
    Register b = get(r_imm_r, c);
    long limm = get(r_imm_r, limm);
    IL_condition cc = get(r_imm_r, cc);
    bool f = get(r_imm_r, f);
    switch (gp_op(gp)) {
        case_32_16 (g_ASL): case_32_16(g_LSL): {
            if (a != b && !f) {
                cg_opcode op = gp_op(gp);
                if (limm == 1) {
                    limm =0;
                    op = g_BSET;
                }
                gentab *mov = Alloc_gen_entry(gp_prev(gp) , g_MOV, r_imm);
                copyto_(mov, r_imm, a, a);
                copyto_(mov, r_imm, limm, limm);
                copyto_(mov, r_imm, cc, cc);
                cvt_to_rrr_instr(gp, op, a, a, b, cc, f);
                *_gp = gp_prev(mov);
                return;
            }
        } break;
        case_32_16(g_SUB): case_32_16(g_CMP):
        case g_RSUB: case g_RCMP: {
            // communative as long as reversed . . . .
            switch (gp_op (gp)) {
                case_32_16 (g_SUB): gp_op(gp) = g_RSUB; break;
                case g_RSUB: gp_op (gp) = g_SUB; break;
                case_32_16(g_CMP): gp_op (gp) = g_RCMP; break;
                case g_RCMP: gp_op (gp) = g_CMP; break;
            }
            cvt_to_rr_imm_instr(gp, gp_op (gp) , a, b, limm, cc, f);
            if (DEBUG_CVT_ARC4_INSTRS | {
                printf(". . cvt'ed to:\t" | ;
                print_gp (gp);
            }
            if (a == null_reg && f) {
                // this is a compare . . .
                if (DEBUG_CVT_ARC4_INSTRS) {
                    printf(". . chg to compare. . . \n");
                }
```

APPENDIX III-continued

© 2000-2002 ARC International. All rights reserved.

```
            // first swap above took care of r_imm_r to rr_imm.
            // this one converts it fully to a compare.
            switch (gp_op (gp)) {
                case_32_16 (g_SUB): gp_op (gp) = g_CMP; break;
                case g_RSUB: gp_op (gp) = g_RCMP; break;
            }
            cvt_to_r_imm_instr(gp, gp_op (gp), b, limm, cc, FALSE);
            if (DEBUG_CVT_ARC4_INSTRS) {
                print(". . into:\t"); print_gp (gp);
            }
            return;
            }
        *_gp = gp_prev(gp);
        return;
        }
    case_32_16 (g_ADD): case_32_16 (g_AND):
    case_32_16 (g_OR): case_32_16 (g_XOR):
    case g_MAX: case g_MIN: {
        cvt_to_rr_imm_instr(gp, cg_opcode (gp_op (gp)), a, b, limm, cc, f);
        *_gp = gp_prev (gp);
        return;
        }
    }
}
Register c = null_reg;
if (a != b) c = a;
else if (!Oneof2 (TEMP_REG, a, b)) c = TEMP_REG;
else return;
if (DEBUG_CVT_ARC4_INSTRS) {
    printf(". . trying to use mov %%r%d. . .\n",c-1);
}
// see if using r12 (or the dest) here would reduce the size of the
// instruction. answer should be yes if we use the dest.
int size1 = size_instr(&gp, NULL, NULL, hte_query_only);
if Oneof2(size1, unk, bogus) return;
gentab g, *gl = &g;
cvt_to_r_imm_instr(&g, g_MOV, c, limm, cc, f);
int size2 = size_instr(&gl, NULL, NULL, hte_query_only);
if Oneof2(size1, unk, bogus) return;
cvt_to_rrr_instr(&g, gp_op(gp), a, c, b, cc, f);
int size3 = size_instr(&gl, NULL, NULL, hte_query_only);
if (size2+size3 < size1) {
    // the 2-pair sequence will be better . . . .
    gentab *mov = Alloc_gen_entry(gp_prev (gp), g_MOV, r_imm);
    cvt_to_r_imm_instr (mov, g_MOV, c, limm, cc, f);
    if (DEBUG_CVT_ARC4_INSTRS) {
        printf(". .deleting (size=%d):\t", size1);
        print_gp (gp);
        printf(". . added (size=%d):\t", size2);
        print_gp (mov);
    }
    cvt_to_rrr_instr(gp, gp_op (gp), a, c, b, cc, f);
    if (DEBUG_CVT_ARC4_INSTRS) {
        printf(". . cvt'ed to (size=%d):\t", size3);
        print_gp (gp);
    }
    *_gp = mov;
}
return;
}
// example of 16-bit instruction selection.
static int size16_jmp_instr(gentab **_gp, int *isize, int *psize, int hte) {
    gentab *gp = *_gp;
    if (cpt_phase < cpt_shrink_disp_related_instrs) {
        // gathering constants, doing cmp-branch, and doing offsets. . .
        return size32_jmp_instr(_gp, isize, psize, hte);
    }
```

APPENDIX III-continued

© 2000-2002 ARC International. All rights reserved.

```
    arc_delay dd;
    IL_condition cc;
    get_jmp_call_info(gp, dd, cc);
    long that_off = aa55aa55, howfar = that_off;
    long this_off = gp.off;
    bool found_lab = find_posted_lab(gp, curr_gen_sect, &that_off);
    if (dd == delay_d) this_off = next_gen_executable(gp) .off;
    if (found_lab) howfar = that_off - this_off;
    if (DEBUG_GEN_ARC5) }
        printf("[size16_jmp]"); print_gp (gp);
        printf("[jmp]
found=%c, howfar=%d, this_off=0x%x, that_off=0x%x\n", "FT"[found_lab], howfar, th
is_off, that_off);
    }
switch (gp_op (gp)) {
    case_32_16(g_Bcc) : {
        if (found_lab) switch (cc) }
            Cond_GT: case Cond_GE: case Cond_GTU: case Cond_GEU:
            Cond_LT: case Cond_LE: case Cond_LTU: case Cond_LEU: {
                if (is_s7(howfar)) {
                    if (hte & hte_query_only) {
                        chg_to_16b(gp, asi_d7, hte);
                        return sizeit16(gp, 2, isize, psize);
                    }
                    else if (dd == delay_none) {
                    // Section 6.15
                    //      bgt     s7
                    //      bge     s7
                    //      blt     s7
                    //      ble     s7
                    //      bhi     s7
                    //      bhs     s7
                    //      blo     s7
                    //      bls     s7
                        gp.isize_is_constant = TRUE;
                        chg_to_16b(gp, asi_d7, hte);
                        int x = sizeit16(gp, 2, isize, psize);
                        return x;
                    }
                else }
                    // need to rewire since no .d on 16-bit
                    // instructions. To do this, return size of the
                    // next instruction after rewiring this one to be
                    // the true next instruction.
                    gentab *gp1 = next_gen_executable (gp);
                    *_gp = gp1;
                    rewire(gp, gp1);
                    if (DEBUG_GEN_ARC5) {
                        printf("after rewiring, sizing: ");
                        print_gp(*_gp);
                        printf("gp-next=");
                        print_gp(gp_next(*_gp));
                    }
                    return size_instr(_gp, isize, psize, hte);
                    }
                }
            } break;
        case Cond_NULL: case Cond_EQ: case Cond_NE: {
            if (is_s9(howfar)) }
                if (hte & hte_query_only) }
                    chg_to_16b(gp, asi_d9, hte);
                    return sizeit16(gp, 2, isize, psize);
                {
                else if (dd == delay_none) }
```

APPENDIX III-continued

© 2000-2002 ARC International. All rights reserved.

```
                    // Section 6.14
                    //      b     s9
                    //      beq   s9
                    //      bne   s9
                    gp.isize_is_constant = TRUE;
                    chg_to_16b(gp, asi_d9, hte);
                    int x = sizeit16(gp, 2, isize, psize);
                    return x;
                    }
                else }
                    // need to rewire since no .d on 16-bit
                    // instructions. To do this, return size of the
                    // next instruction after rewiring this one to be
                    // the true next instruction.
                    gentab *gp1 = next_gen_executable (gp);
                    *_gp = gp1;
                    rewire(gp, gp1);
                    return size_instr(_gp, isize, psize, hte);
                    }
                }
            } break;
            }
        } break;
    case_32_16(g_BLcc): {
        if (cc == Cond_NULL && found_lab) {
            if (is_s13(howfar)) {
                if (hte & hte_query_only) {
                    chg_to_16b (gp, asi_d13, hte);
                    return sizeit16(gp, 2, isize, psize);
                    }
                else if (dd == delay_none) {
                    // Section 6.16
                    //      bl    s13
                    gp.isize_is_constant = TRUE;
                    chg_to_16b (gp, asi_d13, hte);
                    int x = sizeit16(gp, 2, isize, psize);
                    return x;
                    }
                else {
                    // need to rewire since no .d on 16-bit
                    // instructions. To do this, return the size of the
                    // next instruction after rewiring this one to be
                    // the true next instruction.
                    gentab *gp1 = next_gen_executable (gp);
                    *_gp = gp1;
                    rewire(gp, gp1);
                    return size_instr(_gp, isize, psize, hte);
                    }
                }
            }
        } break;
        }
    return size16_unknown(_gp, isize, psize, hte, size32_jmp_instr);
    }
```

APPENDIX IV

© 2000-2002 ARC International. All rights reserved.

```
static bool cvt_to_ld_pcrel(gentab *gp,Register a,
         Memref *m,long limm,bool backward_ok) {
   // we try to common this constant up with another one
   // already in the zpool. And we keep code sequences
   // shorter (constant pool is in code, but it is not
   // within basic blocks).
   long off = gp.off,isize = gp.isize;
   zero_gentab_entry(gp);
   gp.off = off;
   if (isize < 4)
      system_error("cvt_to_ld_pcrel","changing a 2-byte!",ABORT);
   gp_klass(gp) = pcld_INSTR;
   gp_op(gp) = g_LD;
   copyto(ldst,zz,zz_long);
   copyto(ldst,a,a);
   Memref *__m = &get(ldst,m);
   *__m = null_memref;
   __m.klass = LABEL_REL;
   zpool_entry *zp;
   if (limm && m == NULL) zp = add_to_zpool(limm,gp,backward_ok);
   else zp = add_to_zpool(m,gp,backward_ok);
   __m.base = PC_REG;
   __m.u.label.label_val = (lit_index) zp.label;
   __m.u.label.type = LAB_zpool;
   __m.off = zp.off;
   __m.disp = zp.disp; // really the index into the constant pool
   __m.size = zp.size;
   if (DEBUG_CONSTANT_POOL) {
      printf("..into: ");
      print_gp(gp);
   }
   int new_isize = 4; // always. we never allow 6/8 byte forms
   gp.isize = new_isize;
   if (new_isize != isize) redo_downstream_offsets(gp);
   return zp.out;
}

PUBLIC bool has_limm_or_disp(gentab *gp) {
   size_instr(&gp,NULL,NULL,hte_query_only);
   if Oneof2(gp.isize,unk,bogus) {
      // _Asm functions and things that we haven't transformed yet
      // cannot fit into delay slot or whereever we're looking.
      return TRUE;
   }
   if In_range(gp.asi_choosen,asi_d32,asi_d32_s32_d32) return TRUE;
   if In_range(gp.asi_choosen,asi_limm,asi_limm_limm) return TRUE;
   if (gp.asi_choosen == asi_s32) return TRUE;
   return FALSE;
}
```

```
static gentab *locked_start,*locked_end;
PUBLIC void init_locked_range(gentab *gp) {
    locked_start = locked_end = gp;
    if (DEBUG_CONSTANT_POOL) {
      if (gp) printf("..reset locked range to off=0x%x.\n",gp.off);
      else printf("..clear locked range.\n");
      fflush(stdout);
      }
    } static void add_to_locked_range(gentab *gp) {
    locked_end = gp;
    if (DEBUG_CONSTANT_POOL) {
      printf("..extending locked range: start_off=%x,end_off=%x.\n",
             locked_start ? locked_start.off : 0,locked_end.off);
      fflush(stdout);
      }
    } static bool within_locked_range(gentab *gp) {
    long locked_off_start = locked_start ? locked_start.off : 0;
    long locked_off_end = locked_end ? locked_end.off : 0;
    long this_off = gp.off+gp.isize; // this instr is ok -- not the next
    if (locked_off_end < locked_off_start) {
       fprintf(stderr,"start=%08lx,end=%08lx\n",
         locked_off_start,locked_off_end);
       system_error("gen_compress","within_locked_range e2",ABORT);
       }
    return In_range(this_off,locked_off_start,locked_off_end);
    } static long up(long off) {
    // constant pools are always aligned to a 4-byte boundary.
    if (off & 3) off = (off + 3) & ~3;
    return off;
    } static const branch_and_align_size = 6;
static gentab *check(char *who,gentab *insert_after,
                long start_off,long last_off) {
    if (insert_after == NULL) return NULL;
    if (insert_after.exclude) return NULL;
    if (DEBUG_CONSTANT_POOL) {
      printf("..Check %s: off=0x%04x: ",who,insert_after.off);
      print_gp(insert_after);
      printf("..");
      }
    if (insert_after.off < start_off) {
      if (DEBUG_CONSTANT_POOL) printf("off < start_off: Failed!\n");
      return NULL;
      }
    if (In_range(insert_after.off,start_off,last_off)) {
      if (DEBUG_CONSTANT_POOL) printf("in range start/last: Failed!\n");
      return NULL;
      }
    if (within_locked_range(insert_after)) {
      if (DEBUG_CONSTANT_POOL) printf("within locked range: Failed!\n");
```

```
      return NULL;
      }
    int howfar =
up(insert_after.off+insert_after.isize+branch_and_align_size);
    howfar -= start_off;
    if (!is_ul0(howfar)) {
      if (DEBUG_CONSTANT_POOL) printf("insert off > 1023: Failed!\n");
      return NULL;
      }
    if (DEBUG_CONSTANT_POOL) printf("Ok to use!\n");
    return insert_after;
    }

//
// zlist is used to prerecord the number of uses of a literal
// so as to make better guesses when considering loading
// a const from a previously emitted pool
//
struct zpool_const
    {
    int         count;
    int         sym;
    int         limm;
    int     labtype;
    };
#define ZLIMIT 100
static struct zpool_const *zlist;
static int zcount;
static int zhbound;
static int add_zconst(int sym, int limm, int labtype)
    {
    if (zcount >= zhbound - 2)
      {
      zhbound += ZLIMIT;
      if (zlist == 0)
          zlist = alloc_dynarray(zhbound,sizeof *zlist,"zlist");
      else
          zlist = realloc_dynarray(zlist,zhbound);
      }
    ++zcount;
    zlist[zcount].count = 0;
    zlist[zcount].sym = sym;
    zlist[zcount].limm = limm;
    zlist[zcount].labtype = labtype;
    return zcount;
    }
static void free_zlist()
    {
    if (zlist) free_dynarray(zlist);
    zlist = 0;
    zhbound = 0;
    zcount = 0;
    }
static int lookup_zconst(int sym, int limm, int labtype)
    {
    for (int x = 1; x <= zcount; x++)
```

```
        if (zlist[x].sym == sym && zlist[x].limm == limm
             && zlist[x].labtype == labtype) return x;
    return 0;
    }
static void record_zconst(int sym, int limm, int labtype)
    {
    int x = lookup_zconst(sym,limm,labtype);
    if (!x) x = add_zconst(sym,limm,labtype);
    zlist[x].count++;
    }
#   define RECORDABLE_MEM(m)   (Oneof3(m->klass,SYMBOL,ABSOLUTE,LABEL_REL))
static int lookup_zmem(Memref *m)
    {
    if (RECORDABLE_MEM(m))
       {
       if (m->klass == LABEL_REL)
           return lookup_zconst(m->u.label.label_val,m->off,m-
>u.label.type);
       else
           return lookup_zconst(m->name,m->off,0);
       }
    return 0;
    }
static void record_zmem(Memref *m)
    {
    if (RECORDABLE_MEM(m))
       {
       if (m->klass == LABEL_REL)
           record_zconst(m->u.label.label_val,m->off,m->u.label.type);
       else
           record_zconst(m->name,m->off,0);
       }
    } static bool not_node_lab(Memref *m) { return m.klass != NODE_REL; }
static int process_gp(gentab *gp, bool emit,bool dont_lock)
    {
    int did_something = 0;
    bool debug = DEBUG_CONSTANT_POOL && emit;
    if (debug) printf("..Try to convert");
    switch (gp_klass(gp))
       {
       case la_INSTR: case la_16b_INSTR:
          {
          if (debug) printf(": la");
          Register a = get(la,a);
          Memref *m = &get(la,m); // we're going to modify the Memref...
          if (no_cc(la) && is_const_memref(m) && not_node_lab(m))
             {
             if (!emit)
                 record_zmem(m);
             else
                {
                int x = lookup_zmem(m);
                if (x && debug)
                   printf("Found %s %d\n", symbol_ptr(zlist[x].sym),
                              zlist[x].count);
```

```
              bool back_ok = TRUE;
              if (x && --zlist[x].count) back_ok = FALSE;
              Memref mcopy = *m;  // were going to modify it
              bool locked = cvt_to_ld_pcrel(gp,a,&mcopy,0,back_ok);
              if (locked && !dont_lock)
                {
                  // we're referencing a previous constant pool.
                  // Make sure that we don't insert anything between
                  // it and us.
                  add_to_locked_range(gp);
                }
              if (debug)
                {
                  printf(": cvt to: ");
                  print_gp(gp);
                }
              did_something++;
            }
        }
      else if (debug) printf(": no chg.\n");
      } break;
 case r_imm_INSTR: case r_imm_16b_INSTR:
    {
    if (debug) printf(": r_imm");
    Register a = get(r_imm,a);
    long limm = get(r_imm,limm);
    if (no_f_or_cc(r_imm) &&
        Oneof2(gp_op(gp),g_MOV,g_MOV_16) &&
        a != LP_COUNT_REG)
      {
      if (gp.isize > REGSIZE && has_limm_or_disp(gp))
          {
          if (!emit)
            record_zconst(0,limm,0);
          else
            {
              int x = lookup_zconst(0,limm,0);
              bool back_ok = TRUE;
              if (x && --zlist[x].count) back_ok = FALSE;
              bool locked = cvt_to_ld_pcrel(gp,a,NULL,limm,back_ok);
              if (locked && !dont_lock)
                  {
                    // we're referencing a previous constant pool.
                    // Make sure that we don't insert anything between
                    // it and us.
                    add_to_locked_range(gp);
                  }
              if (debug)
                  {
                  printf(": cvt to: ");
                  print_gp(gp);
                  }
              did_something++;
              }
          }
      else if (debug) printf(": no chg.\n");
      }
```

```
            else if (debug) printf(": no chg.\n");
        } break;
    default:
        if (debug) printf(": no chg.\n");
        break;
    }
    return did_something;
} static void check_lp_exclude_ranges(void) {
    // make sure all of our logic worked and we didn't insert any
    // constant pools into a ZD loop. And also make sure that we didn't
    // insert any pc-relative load instructions.
    for _gp <- each_gentab_entry(func_gentab_block) do {
      gentab *gp = *_gp;
      if (gp.exclude) switch (gp_klass(gp)) {
          case zpool_table_INSTR:
            print_info("constant pool in ZD loop!",NULL);
            system_error("check_lp_exclude_ranges","dwcp(A)",ABORT);
            break;
          case pcld_INSTR: case pcld_16b_INSTR:
            print_info("constant pool load in ZD loop!",NULL);
            system_error("check_lp_exclude_ranges","dwcp(B)",ABORT);
            break;
          case last_gentab_INSTR:
            system_error("check_lp_exclude_ranges","dwcp(C)",ABORT);
            break;
       }
    }
    return;
} static void mark_range(gentab *x,gentab *y) {
    x.exclude = 1;
    while (x != y) { x.exclude = 1; x = gp_next(x); }
} static void mark_lp_exclude_ranges(void) {
    for _gp <- each_gentab_entry(func_gentab_block) do {
      gentab *gp = *_gp;
      gp.exclude = 0;
    }
    for _gp <- each_gentab_entry(func_gentab_block) do {
      gentab *gp = *_gp;
      if (gp_op(gp) == g_LPcc) {
          gentab *lab_gp = NULL;
          long that_off = 0,this_off = gp.off;
          if (!find_posted_lab(gp,curr_gen_sect,&that_off,&lab_gp)) {
            system_error("mark_lp_exclude_ranges","dwcp(a)",ABORT);
          }
          if (that_off < this_off) {
            // this is ugly and problematic. Move forward until we find
            // the first hard branch back to an instruction less then
            // the lp_targ.
            gentab *x = gp;
            while (1) {
                x = next_gen_executable(x);
```

```
            if (Oneof2(x,last_gen_entry(),NULL)) {
              system_error("mark_lp_exclude_range","dwcp(b)",ABORT);
            }
            if (!Oneof2(gp_klass(x),jmp_INSTR,jmp_16b_INSTR)) {
              continue;
            }
            long off1 = 0;
            gentab *z = NULL;
            if (!find_posted_lab(x,curr_gen_sect,&off1,&z)) {
              system_error("mark_lp_exclude_range","dwcp(c)",ABORT);
            }
            if (off1 < that_off) {
              // best guess -- and there's two parts...
              mark_range(z,lab_gp);
              mark_range(gp,x);
              *_gp = x;
              break;
            }
          }
        }
        else {
          mark_range(gp,lab_gp);
          *_gp = lab_gp;
        }
      }
    }
    return;
  } static phase_type DWCP_PHASE = define_phase("A5 constant pool creation");
PUBLIC int deal_with_constant_pool(long guessed_function_size) {
    if (!ldst_from_code_tog || each_function_in_own_section_tog) return 0;
    start_phase(DWCP_PHASE);
    gentab *last_unconditional_jmp = NULL;
    gentab *prev_unconditional_jmp = NULL;
    gentab *last_conditional_jmp = NULL;
    gentab *prev_conditional_jmp = NULL;
    int did_something = 0;
    // we need to check to see if we found a func_start since we need to
    // know what section we're in. .init and .fini sections for example,
    // generate the code directly for the ctor/dtor stuff.
    int func_start_encountered = 0;
    static SectionHandle zpool_sect = null_section;
    if (DEBUG_CONSTANT_POOL) printf("[deal with constant pool]\n");
    mark_lp_exclude_ranges();
    // first do prepass to cound the consts
    for _gp <- each_gentab_entry(func_gentab_block) do {
      gentab *gp = *_gp;
      if (!gp.exclude) process_gp(gp,FALSE,FALSE);
    }
    // now do actual processing
    for _gp <- each_gentab_entry(func_gentab_block) do {
      bool dont_lock = FALSE;
      gentab *insert_before = NULL;
      gentab *gp = *_gp;
      if (DEBUG_CONSTANT_POOL) {
          printf("Looking at: "); print_gp(gp);
```

```
        }
    if (gp.exclude) continue;
    if (is_non_executable_gp(gp)) {
        SectionHandle s = null_section;
        switch (gp_klass(gp)) {
            case func_start_INSTR: {
                func_start_encountered = 1;
                s = func_section(funcinfo(get(func_start,f)));
                if (section_class(s) == COMMON_TEXT_SECTION) {
                    // don't do constant pool within comdat sections
                    // since we need to use 8-byte form of instruction
                    // to get the difference between 2 sections calculated.
                    func_start_encountered = 0;
                }
                goto check_section_switch;
            case section_INSTR:
                s = get(section,sect);
check_section_switch: ;
                if (s != zpool_sect) {
                    // must flush the pool
                    // multiple pools.
                    if (zpool_sect != null_section) {
                        insert_before = gp;
                        if (DEBUG_CONSTANT_POOL) {
                            printf("..section change.\n");
                            printf("..insert before=");
                            if (insert_before) {
                                print_gp(insert_before);
                            }
                            else printf("start of gentab\n");
                        }
                        last_unconditional_jmp = NULL;
                        prev_unconditional_jmp = NULL;
                        last_conditional_jmp = NULL;
                        prev_conditional_jmp = NULL;
                        if (first_zpool_offset_not_flushed() != -1) {
                            if (DEBUG_CONSTANT_POOL) {
                                printf("..must flush...\n");
                            }
                            goto force_flush;
                        }
                        else insert_before = NULL;
                    }
                    zpool_sect = s;
                }
            } break;
            case func_end_INSTR:
                if (g_flag && first_zpool_offset_not_flushed() != -1) {
                    if (DEBUG_CONSTANT_POOL) {
                        printf("..must flush...\n");
                    }
                    insert_before = gp;
                    goto force_flush;
                }
                break;
            case zpool_table_INSTR: {
                // must record jmp info below...
```

```
                } break;
            default: {
                if (DEBUG_CONSTANT_POOL) {
                  printf("..non-executable: continue.\n");
                  }
                continue;
                }
            }
        }
    if (!func_start_encountered) continue;

////////////////////////////////////////////////////////////////
    // update where we can insert the pool...
    IL_condition cc;
    arc_delay dd;
    jmp_info(gp,&dd,&cc);
    if (dd != delay_max) {
        gentab *branch = gp;
        if (dd != delay_none) {
          if (DEBUG_CONSTANT_POOL) printf("..skip delay");
          *_gp = gp = gp_next(gp);
          }
        switch (gp_op(branch)) {
          case g_Jcc: case_32_16(g_Bcc): case_32_16(g_JccI): {
              if (cc == Cond_NULL) {
                prev_unconditional_jmp = last_unconditional_jmp;
                last_unconditional_jmp = gp;
                }
              else {
                prev_conditional_jmp = last_conditional_jmp;
                last_conditional_jmp = gp;
                }
              if (DEBUG_CONSTANT_POOL) {
                printf(": set-%sj: ", cc == Cond_NULL ? "lu" : "lc");
                print_gp(branch);
                if (gp != branch) print_gp(gp);
                }
              } break;
          default: {
              if (DEBUG_CONSTANT_POOL) {
                printf(": not a branch.\n");
                }
              } break;
          }
        }
    else switch (gp_klass(gp)) {
        case zpool_table_INSTR: {
          if (DEBUG_CONSTANT_POOL) {
              printf(": zpool: set-uj: "); print_gp(gp);
              }
          // can't insert prior to this point
          prev_conditional_jmp = last_conditional_jmp = NULL;
          prev_unconditional_jmp = NULL;
          // but we can insert right after this table.
          last_unconditional_jmp = gp;
          } break;
        case func_end_INSTR: {
```

```
            if (DEBUG_CONSTANT_POOL) {
                printf(": func_end: set-uj: "); print_gp(gp);
                }
            prev_unconditional_jmp = last_unconditional_jmp;
            last_unconditional_jmp = gp;
            } break;
        case func_start_INSTR: {
            prev_unconditional_jmp = last_unconditional_jmp;
            last_unconditional_jmp = gp_prev(gp);
            if (DEBUG_CONSTANT_POOL) {
                printf(": func_start: set-uj: ");
                print_gp(last_unconditional_jmp);
                }
            } break;
        }

///////////////////////////////////////////////////////////////
// Check to see if we need to flush the pool.
if (DEBUG_CONSTANT_POOL) printf("..Check");
long start_off,last_off,poolsize,howfar;
int ii,zd;
zd = 0;
for (ii = 0; ii < 2; ii++) {
    start_off = first_zpool_offset_not_flushed();
    if (start_off == -1) {
      if (DEBUG_CONSTANT_POOL) printf(": empty.\n");
      goto Cvt_entry;
      }
    start_off &= ~3; // %pcl truncation on access
    last_off = last_zpool_offset_not_flushed();
    poolsize = current_zpool_size();
    // we don't want to insert a constant pool into a ZD-loop. So
    // go find the end of the ZD-loop and see if we fit. If the
    // 1024 limit is reached somewhere in the ZD-loop, we'll dump
    // it here before the 'lp' instruction.
    howfar = (gp.off - start_off);
    if (_Rarely(howfar < 0)) {
      system_error("gen_compress","dwcp(2)",ABORT);
      }
    // calculate if this instr, plus the branch around and align
    // instr that will be inserted before the pool, will fit into
    // the range of the first ref. But since we're geting close
    // to the limit, make sure offsets are as correct as can be.
    howfar += (gp.isize+branch_and_align_size);
    howfar = up(howfar);
    }
if is_u10(howfar) {
    if (DEBUG_CONSTANT_POOL) printf(": OK.\n");
    goto Cvt_entry;
    }

///////////////////////////////////////////////////////////////
if (DEBUG_CONSTANT_POOL) {
    printf(": flush: determine where.\n");
    }
int need_branch_around; need_branch_around = 1;
gentab *x;
```

```
            x = check("LUJ",last_unconditional_jmp,start_off,last_off);
            if (x) need_branch_around = 0;
            else x = check("PUJ",prev_unconditional_jmp,start_off,last_off);
            if (x) need_branch_around = 0;
            else x = check("LCJ",last_conditional_jmp,start_off,last_off);
            if (!x) x = check("PCJ",prev_conditional_jmp,start_off,last_off);
            if (!x) {
                // we're going to insert into the instr stream. Find a place.
                gentab *gp1 = gp;
                int bytes_to_backup = gp1.off - start_off - 1023;
                bytes_to_backup += gp1.isize + branch_and_align_size;
                if (DEBUG_CONSTANT_POOL) {
                  printf("..Back up at least %d bytes...\n",
                    bytes_to_backup);
                }
                while (bytes_to_backup > 0 || gp1.exclude ||
                  gp1.klass == xtab_INSTR) {
                  if (DEBUG_CONSTANT_POOL) {
                      printf("..back up over: off=0x%04x ",gp1.off);
                      print_gp(gp1);
                  }
ReCheck:            ;
                  if Oneof2(gp_klass(gp1),pcld_INSTR,pcld_16b_INSTR) {
                      // we might be referencing the pool we're putting out.
                      // undo the constantness of the instruction and make
                      // size_instr() recalculate its ASI and such.
                      gp1.isize_is_constant = FALSE;
                      gp1.asi_choosen = asi_unknown;
                  }
                  bytes_to_backup -= gp1.isize;
                  gp1 = gp_prev(gp1);
                  if (gp_klass(gp1) == first_gentab_INSTR) {
                      // although a good place to insert, we should never get
                      // here since func_start should have set
                      // last_unconditional_jmp
                      system_error("gen_compress","dwcp(11)",ABORT);
                  }
                }
                // don't insert between a branch and its delay slot.
                arc_delay dd;
                IL_condition cc;
                jmp_info(gp1,&dd,&cc);
                if (!Oneof2(dd,delay_max,delay_none)) {
                  if (DEBUG_CONSTANT_POOL) {
                      printf("..backing up over delay slot: ");
                      print_gp(gp1);
                  }
                  goto ReCheck;
                }
                if (within_locked_range(gp1)) {
                  system_error("gen_compress","dwcp(8)",ABORT);
                }
                x = gp1;
            }
///////////////////////////////////////////////////////////////
            if (need_branch_around) {
```

```
// we're inserting into the instr stream, so we need a branch
// instr since our insert point is a fall-thru in execution.
// See if the instr after where the constant pool is going to
// be inserted has a label associated with it. If so, use it.
// If not, create a new label that we can jump to.
gentab *jump_around_labdef = next_gen_exec_or_lab(x);
while (jump_around_labdef != NULL) {
  if (DEBUG_CONSTANT_POOL) {
      printf("..Checking for existing label: ");
      print_gp(jump_around_labdef);
      }
  if (gp_klass(jump_around_labdef) == lab_INSTR) {
      if (DEBUG_CONSTANT_POOL) {
         printf("..Using existing label: ");
         print_gp(jump_around_labdef);
         }
      break;
      }
  if Oneof2(gp_klass(jump_around_labdef),block_INSTR,bb_INSTR) {
      jump_around_labdef =
         next_gen_exec_or_lab(jump_around_labdef);
      continue;
      }
  // executable instruction here
  jump_around_labdef = NULL;
  break;
  }
if (jump_around_labdef == NULL) {
  // the next gentab entry was not a labdef, insert
  // one since the zpool entry will go out just before this
  // label. Plus, this is the point where we will jump too.
  int nja_loc = next_local_label();
  label_type nja_type = LAB_local;
  jump_around_labdef = Alloc_gen_entry(x,g_NOP,lab);
  copyto_(jump_around_labdef,lab,type,nja_type);
  copyto_(jump_around_labdef,lab,loc,nja_loc);
  copyto_(jump_around_labdef,lab,n,null_node);
  copyto_(jump_around_labdef,lab,is_lp_targ,FALSE);
  jump_around_labdef.isize = 0;
  post_lab(jump_around_labdef,curr_gen_sect);
  if (DEBUG_CONSTANT_POOL) {
      printf("..creating new label: ");
      print_gp(jump_around_labdef);
      }
  }
// we have a label to jump to, since the constant pool is
// going to go out next and we're in the instruction stream,
// insert branch to it.
if (DEBUG_CONSTANT_POOL) {
  printf("..insert branch around after: ");
  print_gp(x);
  }
int loc = get_(jump_around_labdef,lab,loc);
label_type type = get_(jump_around_labdef,lab,type);
gentab *branch_around = Alloc_gen_entry(x,g_Bcc,jmp);
copyto_(branch_around,jmp,loc,loc);
copyto_(branch_around,jmp,type,type);
```

```
            copyto_(branch_around,jmp,cc,Cond_NULL);
            // don't try to fill the delay-slot. We want the 2-byte form
            // for the branch, not the 4-byte that would be used if there
            // was a delay-slot here.
            copyto_(branch_around,jmp,dd,delay_none);
            branch_around.off = x.off+x.isize;
            size_instr(&branch_around,NULL,NULL,0);
            if (DEBUG_CONSTANT_POOL) {
              printf("..added branch around: ");
              print_gp(branch_around);
            }
            // zpool entry will be inserted after this instruction
            // and before the jump around labdef.
            x = branch_around;
         }
         if (!is_u10((x.off+x.isize+2)-start_off)) {
            // one final sanity check...
            // (only need to check for align here, not branch and align)
            system_error("gen_compress","dwcp(12)",ABORT);
         }
         // ok, we can now finally go flush the pool
         insert_before = gp_next(x);

//////////////////////////////////////////////////////////////////////
force_flush: ;
         gentab *zpt; zpt = flush_zpool(gp_prev(insert_before));
         post_lab(zpt,curr_gen_sect);
         did_something++;
         // can't insert before this table
         last_conditional_jmp = prev_conditional_jmp = NULL;
         prev_unconditional_jmp = NULL;
         // but we can insert after this table (this table appears to be
         // an unconditional jmp
         last_unconditional_jmp = zpt;
         // we must recalculate all of the downstream offsets before
         // init'ing the locked region.
         redo_offsets_with_no_transformations();
         init_locked_range(zpt);
         // if the instruction we're currently looking at needs a constant
         // pool entry itself, and it finds that entry in the zpt we just
         // created, there may be a problem with 'within_locked_range'
         // since the offset of the current is less then the offset of the
         // start of the new locked range.
         dont_lock = (zpt.off > gp.off);
//////////////////////////////////////////////////////////////////////
         // convert appropriate instructions...
Cvt_entry: ;
         if (process_gp(gp,TRUE,dont_lock)) {
            did_something++;
            // ugly place for this, but this is a quick way to catch it:
            //    mov    r1,.L1
            //    bl     printf
            // which now that we've made a pc-rel ld, we can put it in
            // the delay slot.
            gentab *j = next_gen_exec_or_lab(gp);
            if (j && needs_delay(j)) {
               for r,rut <- gen_reg_used(gp,TRUE) do {
```

```
                if (rut == used_defined) {
                    for r1,rut1 <- gen_init_reg_used(j,TRUE) do {
                        if (r1 == r && rut1 == used_referenced) {
                            // dependency between, can't move down
                            goto failed;
                        }
                    }
                }
            }
//printf("w00t!\n");
            move_to_delay(gp,j,dt_execute_always,FALSE);
//printf("..after: "); print_gp(j);
//printf("..after: "); print_gp(gp);
failed:          ;
            }
        }
    }
    free_zlist();
    if (did_something) redo_offsets_with_no_transformations();
    check_lp_exclude_ranges();
    if (trace_compress_tog || DEBUG_CONSTANT_POOL) {
      print_info("gentab after constant placement",NULL);
    }
    stop_phase(DWCP_PHASE);
    return did_something;
    } static zpool_entry *check_and_alloc(gentab *gp) {
    if (++zpool_ndx >= zpool_hbnd) {
        if (zpool_hbnd == 0) {
            zpool = alloc_dynarray(200,sizeof (*zpool),"zpool");
            }
        else zpool = extend_dynarray(zpool,20);
        zpool_hbnd = dynarray_size(zpool);
    }
    zpool[zpool_ndx].label = current_zpool_label;
    zpool[zpool_ndx].off = __current_zpool_size;
    zpool[zpool_ndx].gp = gp;
    zpool[zpool_ndx].disp = zpool_ndx;
    zpool[zpool_ndx].sect = current_gen_section();
    zpool[zpool_ndx].out = FALSE;
    return &zpool[zpool_ndx];
    } static int offset_of_entry(zpool_entry *zp) {
    if (zp.gp == NULL) system_error("zpool","no gp for offset of",ABORT);
    long off = zp.gp.off;
    if (gp_klass(zp.gp) == zpool_table_INSTR) {
      off += zp.off;
      }
    return off;
    }

//  __X = zt_type
```

```
// __Y = item
#define if_found_then_return_it(__X,__Y) \
     for (int i = zpool_ndx; i >= 0; i--) {\
         if (zpool[i].type == __X && zpool[i].un.__Y == __Y && zcheck(i)) \
{\
            return &zpool[i];\
         }\
       }
// __X = zpool index
#define zcheck(__X) (zpool[__X].sect == current_gen_section() &&\
                  (backward_ok || !zpool[__X].out) &&\
                     is_s11((offset_of_entry(&zpool[__X]) & ~7) - gp.off))

PUBLIC zpool_entry *add_to_zpool(symbol s,gentab *gp,bool backward_ok) {
    if_found_then_return_it(zt_string,s);
    zpool_entry *zp = check_and_alloc(gp);
    int len = string_symbol_length(s);
    zp.size = len;
    zp.type = zt_string;
    zp.un.s = s;
    // need to align this string if need be to the next 4-byte boundary
    // Note: we add 4 since we need to account for the '\0' at the end
    // of the string...
    int pad = 4 - ((len+4) & 3);
    if (pad) {
      zpool_entry *zp_pad = check_and_alloc(gp);
      zp.size = pad;
      zp.type = zt_pad;
      zp.un.limm = 0;
      }
    __current_zpool_size += pad;
    return zp;
    }

PUBLIC zpool_entry *add_to_zpool(long limm,gentab *gp, bool backward_ok) {
    if_found_then_return_it(zt_imm,limm);
    zpool_entry *zp = check_and_alloc(gp);
    zp.size = REGSIZE;
    zp.type = zt_imm;
    zp.un.limm = limm;
    __current_zpool_size += REGSIZE;
    return zp;
    }

PUBLIC zpool_entry *add_to_zpool(Memref *m,gentab *gp,bool backward_ok) {
    //
    // WARNING: The macro below uses '==' to compare two memrefs
    // This is done using a C++ defined operator.
    // The definition is from gen.h....
    //
    //          extern int operator==(Memref &m1,Memref &m2);
    //
    // Also, I believe there is a problem with the compare
    // So that I have provided an alternative to test for duplicate
```

```
    // symbols.
    //
#if 0
    // copy memref
    Memref *mp = m;
    {
    Memref m = *mp;
    // printf("ZPOOL: %s\n", m.name ? symbol_ptr(m.name) : "<null>");
    if_found_then_return_it(zt_memref,m);
    }
else
    /*
    printf("ZPOOL: k=%d %s\n", m->klass,
      m->name ? symbol_ptr(m->name) : "<null>");
    */
    for (int i = zpool_ndx; i >= 0; i--)
      {
      if (zpool[i].type == zt_memref && zcheck(i))
          {
          Memref *zm = &zpool[i].un.m;
          int k1 = zm->klass;
          int k2 = m->klass;
          bool ok = k1 == k2 || Oneof2(k1,SYMBOL,ABSOLUTE)
                       && Oneof2(k2,SYMBOL,ABSOLUTE);
          bool found = ok && zm->off == m->off;
          if (found) switch (m->klass)
             {
             case ABSOLUTE:
             case SYMBOL:
                  found = zm->name == m->name;
                  break;
             case FUNCTION:
                  found = zm->u.func == m->u.func;
                  break;
             default:
                  // == here is a defined C++ operator defined in gen.h
                  found = *zm == *m;
                  break;
             }
          if (found)
            return &zpool[i];
          }
      }
endif zpool_entry *zp = check_and_alloc(gp);
    zp.type = zt_memref;
    zp.un.m = *m;
    zp.size = REGSIZE;
    __current_zpool_size += REGSIZE;
    if (m->klass == NODE_REL) zp.func = curr_func;
    else if (m->klass == LABEL_REL && m->u.label.type > LAB_end) {
      zp.func = curr_func;
      }
    return zp;
    }
```

```
PUBLIC long current_zpool_size(void) {
    return __current_zpool_size;
    }

PUBLIC long first_zpool_offset_not_flushed(void) {
    int j = 0;
    while (j <= zpool_ndx) {
      if (zpool[j].out == FALSE) break;
      j++;
      }
    if (j > zpool_ndx) return -1;
#if 1
    // we can have the situation where the constant pool is growing
    // faster then the instruction stream. As we shrink instructions
    // down in size, and recalculate offsets, we may not be able to
    // address everything in the pool. Originally,
    // we could always guarantee that the first gentab
    // entry that referenced the first zpool entry was always the
    // furthest away from all the other gentab entries that referenced
    // later zpool entries. But when the pool is growing faster then
    // the instruction stream, the tenth zpool entry and its gentab
    // that references it may have a greater span then the first. To
    // compensate for this, so we don't have to add much code
    // to dwcp.cc, we find the span that is the greatest and return it
    // as the "first" entry that references the first zpool entry.
    //
    // example: if zpool entry 5's gentab entry offset was 0x114, we
    // would return 0x100 as the "first" offset referencing the
    // constant pool.
    //
    zpool_entry *zp1 = &zpool[j];
    for (int k = j+1; k <= zpool_ndx; k++) {
      zpool_entry *zp2 = &zpool[k];
      if (zp2.gp.off-zp2.off < zp1.gp.off-zp1.off) zp1 = zp2;
      }
    return zp1.gp.off-zp1.off;
#else
    return offset_of_entry(&zpool[j]);
#endif
    }
```

APPENDIX V

© 2000-2002 ARC International. All rights reserved.

```c
static void try_to_fold_cmp_0(gentab *p, gentab *cmp, gentab *cjmp,
          IL_condition cc, Register cmp_ a)
{
// we expanded a op.f, cjmp to a op, cmp0, cjmp during expand.
// in hopes of saving 2 bytes. But the cjmp turns out to
// be long anyway. So now we attempt to revert back to the
// original op.f,cjmp form for speed since the space saving
// is a wash.
  bool *fp = 0;      // pointer to .f flag in instr
  Register rd = null_reg;
  class_type k = gp_klass(p);
  switch (k)
     {
     case rrr_INSTR: case rrr_16b_INSTR:
        rd = get_(p, rrr, a);
        fp = &p->un.rrr.f;
        k = rrr_INSTR;
        break;
     case rr_INSTR: case rr_16b_INSTR:
        rd = get_(p, rr, a);
        fp = &p->un.rr.f;
        k = rr _INSTR;
        break;
     case rr_imm_INSTR: case rr_imm_16b_INSTR:
        rd = get_(p, rr_imm, a);
        fp = &p->un.rr_imm.f;
        k = rr_imm_INSTR;
        break;
     case r_imm_INSTR: case r_imm_16b_INSTR:
        rd = get_(p, r_imm, a);
        fp = &p->un.r_imm.f;
        k = r_imm_INSTR;
        break;
     default: return;
     }
  if (rd == cmp_a)
     {
     cg_opcode newop = gp_op(p);
     // select 32-bit form
     switch (newop)
        {
        case g_ADD_16:    newop = g_ADD; break;
        case g_AND_16:    newop = g_AND; break;
        case g_ASL_16:    newop = g_ASL; break;
        case g_ASR_16:    newop = g_ASR; break;
        case g_BIC_16:    newop = g_BIC; break;
        case g_EXT_16:    newop = g_EXT; break;
        case g_LSL_16:    newop = g_LSL; break;
        case g_LSR_16:    newop = g_LSR; break;
        case g_MOV_16:    newop = g_MOV; break;
        case g_OR_16:     newop = g_OR; break;
        case g_SEX_16:    newop = g_SEX; break;
        case g_SUB_16:    newop = g_SUB; break;
        case g_XOR_16:    newop = g_XOR; break;
        case g_BSET_16:   newop = g_BSET; break;
        case g_BCLR_16:   newop = g_BCLR; break;
        case g_BXOR_16:   newop = g_BX0R; break;
        case g_BMSK_16:   newop = g_BMSK; break;
        case g_NOT_16:    newop = g_NOT; break;
        // case g_NEG_16:   newop = g_NEG; break;
        case g_ADD1_16:   newop = g_ADD1; break;
        case g_ADD2_16:   newop = g_ADD2; break;
        case g_ADD3_16:   newop = g_ADD3; break;
        default: return;
        }
     // do the transform . . .
     gp_op(p) = newop;
     gp_klass(p) = k;
     *fp = TRUE;             // set .f
     p->isize = p->isize >4 ? 8 : 4;    // modify size
     // convert cjmp
     gp_klass(cjmp) = jmp_INSTR;
     gp_op(cjmp) = g_Bcc;
     cjmp->isize = 4;
     cjmp->un.jmp.cc = cc == Cond_LT ? Cond_MI : CondPL;
     // remove cmp, but keep linked becaus do_branch is using it.
     unlink_gen(cmp);
     }
```

APPENDIX V-continued

© 2000-2002 ARC International. All rights reserved.

```
    }
static void do_branch_reductions(void) {
    if (!branch_reductions_tog)
        return;
    start_phase(CMPJMP_PHASE);
    do_lp_count_nop_reduction( );
    if (DEBUG_CMPJMP) {
        print_info("gentab before branch reduction", NULL);
    }
    int did_something = 0;
    for _gp <- each_gentab_entry(func_gentab_block) do {
        gentab *cmp = *_gp;
        if (!Oneof4(gp_op(cmp), g_CMP, g_CMP_16, g_BTST, g_BTST_16)) continue;
        gentab *pjmp = prev_gen_exec_or_lab(cmp);
        if (pjmp) {
            // bits_INSTR can have a CMP in the delay slot since the code
            // preserves %status across the call that we generate
            IL_condition pcc;
            arc_delay pdd;
            get_jmp_call_info(pjmp, pdd, pcc);
            if (pdd == delay_d) continue;
        }
        IL_ condition cc = Cond_EQ;
        if (DEBUG_CMPJMP) {
            printf("[cmpjmp] looking at: "); print_gp(cmp);
        }
        Register cmp_a = null_reg,cmp_b = null_reg;
        int cmp_val = 0;
        bool isimm = FALSE;
        switch (gp_klass(cmp)) {
            case rr_16b INSTR: case rr_INSTR:
                cc = get_Tcmp, rr, cc);
                cmp_a = get_(cmp, rr, a);
                cmp_b = get_(cmp, rr, b);
                break;
            case r_imm_16b_INSTR: case r_imm_INSTR:
                cc = get_(cmp, r_imm, cc);
                cmp_a = get (cmp, r_imm, a);
                cmp_val= get_(cmp, r_imm, limm);
                isimm = TRUE;
                break;
        }
        if (cc != Cond NULL) {
            if (DEBUG_CMPJMP) printf(". . cmp has condition code: failed!\n");
            continue;
        }
        gentab *branch = cmp;
        //////////////////////////////////////////////////////////
        int validate(gentab **branch) {
            if (is_bb_delimiter(*branch)) {
                if (DEBUG_CMPJMP) {
                    printf(". . this interferes with cmp moving: ");
                    print_gp(*branch);
                }
                *branch = NULL;
                return 0;
            }
            for r,rut <- gen_reg_used(*branch) do {
                if (rut == used_referenced && r == STATUS_REG ||
                    rut == used_defined && Oneof3(r, cmp_a, cmp_b, STATUSREG)) {
                    // we can't move the compare down since instruction
                    // redefines one of the cmp regs. (or needs the status
                    // reg itself)
                    if (DEBUG_CMPJMP) {
                        printf(". . this interferes with cmp moving: ");
                        print_gp(*branch);
                    }
                    *branch = NULL;
                    return 0;
                }
            }
            if (DEBUG_CMPJMP) {
                printf(". . skip over: "); print_gp(*branch);
            }
            return 1;
        }
```

APPENDIX V-continued

© 2000-2002 ARC International. All rights reserved.

```
//////////////////////////////////////////////////////////
    while (branch = gp_next(branch),branch != NULL &&
    !Oneof2(gp_op(branch), g_Bcc_16, g_Bcc)) {
        if (!validate(&branch)) goto L1;
    }
L1: ;
    if (!(branch && Oneof2(gp_klass(branch), jmp_INSTR, jmp_16b_INSTR))) {
        if (DEBUG_CMPJMP) {
            printf(". . cmp can't be moved: failed!\n");
        }
        continue;
    }
    if (DEBUG_CMPJMP) {
        printf(". . found: "); print_gp(branch);
    }
    gentab *delay_slot = NULL;
    if (get_(branch, jmp, dd) != delay_none) {
        delay_slot = gp_next(branch);
        if (!validate(&delay_slot)) {
            if (DEBUG_CMPJMP) {
                printf(". . cmp can't be moved: failed!\n");
            }
            continue;
        }
        else if (DEBUG_CMPJMP) {
            printf(". . found delay slot: "); print_gp(delay_slot);
        }
    }
    // we now have something like:
    // 001a 0000           cmp_s       %r0,0
    // 001c 0000           bgt_s       .LN178.6
    IL_condition cjmp_cc = get_(branch, jmp, cc);
    int keep_delay_slot_as_delay_slot = 1;
    switch (cjmp_cc) {
        case Cond_EQ: case Cond_NE:
            // there are no compressed forms of the rest of the Conds.
            // we rewire the delay-slot for these 2 only in the hope
            // that we compress this cmpjmp instruction.
            keep_delay_slot_as_delay_slot = 0;
        case Cond_GEU: case Cond_LTU:
        case Cond_LT: case Cond_GE:
        case Cond_LEU: case Cond_GTU:
        case Cond_LE: case Cond GT:
            break;
        default:
            if (DEBUG_CMPJMP) printf(". . bad IL_condition: failed!\n");
            continue;
    }
    if (get_(branch, jmp, ccreg_live)) {
        if (DEBUG_CMPJMP) printf(". . status reg must be set: failed\n");
        continue;
    }
    long that_off = 0;
    bool found_lab = find_posted_lab(branch, curr_gen_sect, &that_off);
    if (!found_lab) {
        if (DEBUG_CMPJMP) printf(". . labdef not found: failed!\n");
        continue;
    }
    long this_off = branch.off - cmp.isize;
    if (delay_slot) {
        if (this_off > that_off && !keep_delay_slot_as_delay_slot) {
            // backward branch, account for the size of the delay slot
            // that will be moved up
            this_off += delay_slot->isize;
        }
    }
    // adjust for possible PCL truncation. Problem is that we think
    // we're on an OK address (0x1660) and we're jumping to 0x175c
    // which looks ok. But after we delete the CMP, the jmp is at
    // 0x165e which the processor will back up to 0x165c (PCL is used
    // for branch instructions). So we need to always take the size
    // of the cmp into account and adjust our offset and then
    // truncate it down to what the PCL will use. Note: for backward
    // branches, this gives us a little more room since the
    // PCL will be to our advantage. Forward references thus have a
    // offset of 252 bytes due to the PCL. Backward branches have
    // an offset of -256 (under some rare conditions, we could go
    // back -258, but the assembler may not allow it). So for forward
```

APPENDIX V-continued

© 2000-2002 ARC International. All rights reserved.

```
// jumps, we'll back up 2.
  if (this_off & 3) this_off &= ~3;
  if (DEBUG_CMPJMP) {
      printf(". . found
lab,lab offset=0x%04.4x,t his_off=0x%04.4x,howfar=%d, is-
s9=%c\n", that_off, this_off, that_off-this_off, "FT"[is_s9(that_off-
this_off)]);
      }
  if (!is_s9(that_off-this_off)) {
      // before continue, look to remove the compare
      // We might have a comp 0 that can be folded into the
      // previous .f instr. This happens because we unfolded
      // them in code.cc to try to eliminate 4-byte PL/MI cjmps
      if (isimm && cmp_val== 0 && Oneof2(cjmp_cc, Cond_GE, Cond_LT)) {
          gentab *p = gp_prev(cmp);
          if (p) try_to_fold_cmp_0(p, cmp, branch, cjmp_cc, cmp_a);
          }
      continue;
      }
  // merge them . . . Note: if there was a delay slot, then we'll
  // be inserting the new instruction after the delay slot.
  int rewire = delay_slot && !keep_delay_slot_as_delay_slot;
  gentab *after = branch;
  if (rewire) after = delay_slot;
  gentab *cjmp = merge(cmp, branch, after, rewire);
  cjmp.off = this_off;
  compression_pass_type scpt = cpt_phase;
  // size the cmp and branch as well as the cmpjmp to see if
  // we really want to use the cmpjmp. If the actual size is going
  // to be bigger, then we don't want to use it. To get the actual
  // size though will require us to change the phase so that
  // gen_arc5.cc doesn't assume worst case. It's ok though, we're
  // querying it only, so we will get the actual size, but the
  // instruction won't be changed.
  cpt_phase = cpt_shrink_disp_related_instrs;
  int csize = size_instr(&cmp, NULL, NULL, hte_query_only);
  int bsize = size_instr(&branch, NULL, NULL, hte_query_only);
  int cbsize = size_instr(&cjmp, NULL, NULL, hte_query_only);
  cpt_phase = scpt;
  int osize = csize + bsize;
  if (Oneof3(unk, csize, bsize, cbsize) | |
      Oneof3(bogus, csize, bsize, cbsize) | |
      cbsize > osize) {
          if (DEBUG_CMPJMP) {
              printf(". . csize=%d, bsize=%d, cbsize=%d: too big: failed!\n",
              csize,bsize,cbsize);
              }
          delete_gen(cjmp);
          redo_downstream_ offsets(cmp);
          continue;
          }
  // ok, 1 now we can use it . . . .
  if (DEBUG_CMPJMP) {
      printf("chg (size=%d) : ", cmp.isize); print_gp(cmp);
      printf("and (size=%d): ", branch.isize); print_gp(branch);
      printf("into: (size=%d): ", cjmp.isize); print_gp(cjmp);
      }
  gentab *pgp = gp_prev(cmp);
  delete_gen(cmp);
  delete_gen(branch);
  if (delay_slot) delay_slot->stopper = st_no_stopper;
  did_ something++;
  *_gp = cjmp;
  redo_downstream_offsets(pgp);
  }
if (did_ something) {
  // may have shrunk enough branches down to allow other reductions
  do_branch_reductions( );
  }
else if (trace_compress_tog | | DEBUG_CMPJMP) {
  print_info("gentab after branch reduction", NULL);
  }
stop_phase(CMPJMP_PHASE);
return;
}
```

APPENDIX VI

© 2000-2002 ARC International. All rights reserved.

```
static Register reg_alloc_order_int_float_a5[LAST_ARC_REG+1] = {
    R0,R1,R2,R3,/*R12,*/ R13,R14,R15,R4,R5,R6,R7,R8,R9,R10,R11,
    R16,R17,R18,R19,R20,R21,R22,R23,R24,R25,null_reg
    };

static Register spill_to_int_class(Register reg) {
    regtab[reg].rclass |= SPILLED_CLASS;
    Register newreg = get_unique_reg(regtab[reg].tc,regtab[reg].size);
    regtab[newreg].rclass =
        INT_CLASS|SPILLED_CLASS|CANNOT_BE_ACCUM_CLASS;
    if (trace_color || trace_spills) {
      printf("[spill] reg_to_spill_to remapped reg=R%d to R%d...\n",
            reg,newreg);
    }
    reg_to_spill_to_called = TRUE;
    return newreg;
    } static Register reg_to_spill_to(Register reg) {
    rclass_type prev_mask = regtab[reg].rclass;
    if (prev_mask & SPILLED_CLASS) return null_reg;
      return spill_to_int_class(reg);
    }
    if (code_compression_tog && code_compression_color_tog &&
      !IS_MACHINE_REG(reg)) {
      if (prev_mask == -1) {
          system_error("reg_to_spill_to","unassigned reg class",ABORT);
          }
      if ((prev_mask & SPILL_CLASS) == 0) {
          // coloring determined which regs it wants to spill. during
          // spill_init(), this code is called to there is another
          // register class (via a new virtual register) that we can
          // allocate.
          // If want a general int-class reg, we can allocate a
          // new register that can then be colored into the
          // non-compressable registers. This way, we get the use
          // of the entire reg bank before we actually go and spill
          // the register to memory (returning null_reg from this
          // function causes a spill location to be created.)
          rclass_type r1 = SPILL_CLASS;
          Register newreg =
              get_unique_reg(regtab[reg].tc,regtab[reg].size);
          regtab[newreg].rclass = r1;
          if (trace_color || trace_spills) {
            printf("[spill] reg_to_spill_to remapped"
                  " reg=R%d to R%d...\n",
                reg,newreg);
            }
          reg_to_spill_to_called = TRUE;
          return newreg;
          }
```

```
        }
     return null_reg;
     } static void set_rclasses_for_machine_regs(void) {
    memcpy(scratch_regs,Reset_scratch_regs,sizeof(Reset_scratch_regs));
    mwassert(Regsize_for_bank[REG_BANKS-1] != 0); // Otherwise a bank
    if (code_compression_tog && code_compression_color_tog) {
      Mask_for_bank[SPILL_BANK] = SPILL_CLASS;
      Regsize_for_bank[SPILL_BANK] = REGSIZE;
      allocable_regs[SPILL_BANK] = !use_sdata_tog ?
        reg_alloc_order_A5_spill_no_sdata : reg_alloc_order_A5_spill;
      first_reg_in_bank[SPILL_BANK] = R4;
      allocable_regs[INT_FLOAT_BANK] = reg_alloc_order_A5;
      }
    for (Register R = FIRST_ARC_REG; R <= LAST_ARC_REG; R++) {
        reg_size[R] = REGSIZE;
      switch (R) {
          case STATUS_REG:
            Reg_class[R] = CC_REG | AUX_REG;
            break;
          case SEMAPHORE_REG:
          case LP_START_REG:
          case LP_END_REG:
          case IDENTITY_REG:
          case DEBUG_REG:
            Reg_class[R] = AUX_REG;
            break;
          case MLO_REG:
            Reg_class[R] = MULT32_REG;
            break;
          case R10: case R11:
            if (code_compression_tog && code_compression_color_tog) {
                Reg_class[R] = SPILL_CLASS;
                }
            else {
                // we reserve some scratch regs as not allocatable for
                // an argument to il_ASMCALL so that the user can count
                // on those registers as available inside the call.
                Reg_class[R] = DATA_REG2;
                }
            break;
          default:
            if (code_compression_tog && code_compression_color_tog) {
                // when doing compressed code, we set all general regs
                // not in the set of {r0-r3,r13-r16} to a different
                // class.
                // see notes in arc.h and reg_to_spill_to() for why.
                if (is_comp_reg(R)) {
                    Reg_class[R] = (DATA_REG1 | DATA_REG2);
                    }
                else Reg_class[R] = SPILL_CLASS;
                }
            else Reg_class[R] = DATA_REG1 | DATA_REG2;
       }
    }
    if (xmult32_tog) append_to_scratch_regs(MLO_REG);
```

```
        else Mask_for_bank[MULT32_BANK] = UNUSABLE_CLASS;
    }
/*
 * For ARC5, each variable in ".sdata" or ".sbss" must be in its own
section.
*/
static void map_each_near_var_in_own_section(void) {
    section_index sdata = lookup_section(".sdata");
    section_index sbss = lookup_section(".sbss");
    if (sdata == 0 && sbss == 0) return;   // No variables in .sdata
    for_each_var(v) {
        var_info_record *vp = varinfo(v);
        section_index s = var_section(vp);
        if (s != null_section && Oneof2(s,sdata,sbss)) {
            char buf[32];
            sprintf(buf,".sdata$%d",v);
            s = make_section(buf,DATA_SECTION);
            set_section_flag(s,IN_SDATA);   // inform canonizer
            var_section(vp) = s;
          SET_SECT_IS_NEVER_DEFAULT(&sectab[s]);
            if (opt_vars) {
                printf("[arc-V] remapped v=%d(\"%s\") to section=%d(\"%s\")\n",
                   v,var_name_ptr(vp),s,buf);
            }
            }
        } end_for
    return;
    } static bool coalescable(IL_entry *This,IL_entry *That) {
    if (This) switch (This->op) {
        case il_ARGDEF: case il_DEFINE: case il_NOP:
        case_DANGEROUS: case il_XFER:
            return FALSE;
      case il_PSEUDO: {
            switch (_arc_case_type(PSEUDO_NO(This))) {
                case STORE_UNCACHED_BITS_func:
                case STORE_UNCACHED_BITU_func:
                case LOAD_UNCACHED_BITS_func:
                case LOADU_UNCACHED_BITS_func:
                case STORE_BITS_func: case STORE_BITU_func:
                case LOAD_BITS_func: case LOADU_BITS_func:
                case ARC_CMACRDW31_func:
                    return FALSE;
                }
            } break;
        }
    if (That) switch (That->op) {
        case il_ARGDEF: case il_DEFINE:
        case il_NOP: case_DANGEROUS: case il_XFER:
            return FALSE;
      case il_PSEUDO: {
            switch (_arc_case_type(PSEUDO_NO(That))) {
                case STORE_UNCACHED_BITS_func:
                case STORE_UNCACHED_BITU_func:
                case LOAD_UNCACHED_BITS_func:
```

```
                case LOADU_UNCACHED_BITS_func:
                case STORE_BITS_func: case STORE_BITU_func:
                case LOAD_BITS_func: case LOADU_BITS_func:
                case ARC_CMACRDW31_func:
                    return FALSE;
                }
            } break;
        }
    return TRUE;
    }

PUBLIC bool coalescable(void *a,void *b) {
    IL_entry *This = (IL_entry *) a;
    IL_entry *That = (IL_entry *) b;
    return coalescable(This,That);
    } static bool spills_ok_in_this_context(Register ra, bool ra_spilled,
                            Register rc, bool rc_spilled,
                            IL_entry *il, bool is_next)
    {
    // determine whether substitution of spill is acceptable
    // return TRUE if they are ok
    if (rc_spilled) return FALSE;
    Register r = is_next ? ra : rc;
    for o <- each_operand_referencing_reg(il, r) do
      if (o->dead) return TRUE;
    return FALSE;
    } static bool virtuals_OK(Register ra,bool ra_spilled,
                Register rc,bool rc_spilled,
                IL_entry *il,IL_entry *prev,int next)
    {
    if ((ra_spilled == 0) ^ (rc_spilled == 0))
       {
       // regs are different (one compressable, one not)
       if
(!spills_ok_in_this_context(ra,ra_spilled,rc,rc_spilled,prev,next))
            return FALSE;
        // a copy of a non-spilled register into a spilled register is
        // OK to deal with (or vice versa).
        if (trace_trivial) {
            printf("[arc coalesce] OK by us to coalesce (spill):\n");
            if (next) { print_il(il); print_il(prev); }
            else { print_il(prev); print_il(il); }
            }
        return TRUE;
        }
    return FALSE;
    } static bool can_be_coalesced_with(IL_entry *il,
                        IL_entry *prev,
                        IL_opd *opd,
                        Register r) {
////////////////////////////////////////////////////////////////////
```

```
bool interferes_with(Register ra,Register rc) {
  if Oneof2(regtab[ra].rclass,-1,0) {
      if (prev) print_il(prev,stderr);
      print_il(il,stderr);
      system_error("machine","no rclass for register 'ra'",ABORT);
      }
  if Oneof2(regtab[rc].rclass,-1,0) {
      print_il(il,stderr);
      system_error("machine","no rclass for register 'rc'",ABORT);
      }
  // don't let regs like %fp, %gp, %sp, %pc, and %status to even be
  // considered.
  if Oneof5(ra,FP_REG,PC_REG,GP_REG,SP_REG,STATUS_REG) return TRUE;
  if Oneof5(rc,FP_REG,PC_REG,GP_REG,SP_REG,STATUS_REG) return TRUE;
  if Oneof2(MLO_REG,ra,rc) {
      // MUL_LO is not up for consideration either
      return TRUE;
      }
  if (regtab[ra].rclass == regtab[rc].rclass
      && Oneof2(regtab[ra].rclass,XMEM_REG,YMEM_REG)
      && !IS_MACHINE_REG(ra)
      && !IS_MACHINE_REG(rc))
      return FALSE;
  static const unsigned bad = MULT32_REG | CC_REG | AUX_REG |
      DUAL_ACCUM1_CLASS|DUAL_ACCUM2_CLASS|ACCUM24_CLASS |
      XMEM_REG|YMEM_REG|UNUSABLE_REG|MACMODE_REG;
  if ((regtab[ra].rclass & bad) != 0 || (regtab[rc].rclass & bad) !=
0){
      // any of these classes need to be left alone too,...
      return TRUE;
      }
  // did we forget something?
  return FALSE;
  }
/////////////////////////////////////////////////////////////////////
if (opd == &DEST1(il)) {
  if (il->op != il_COPY) return FALSE;
  IL_entry *next = next_executable_il(il);
  if (!coalescable(il,next)) return FALSE;
  Register r1 = oREG(*opd);      // DEST(il)
  Register r2 = r;               // SRC1(il)
  if (r1 == r2) return FALSE;
  if (!reg_referenced_in_il(r1,next,NULL)) return FALSE;
  /*
   * Look for:    COPY    R1,R2;
   *              op      R3,R1_,R4
   */
  if (interferes_with(r1,r2)) {
      // take into account things like MLO_REG or its rclass since
      // we cannot coalesce it with "normal" registers; the COPY
      // must be done here.
      return FALSE;
      }
  if (r1 == ACC24_REG || r2 == ACC24_REG){
      // We don't have an extension core register it
      return FALSE;
      }
```

```
   if IS_MACHINE_REG(r1) {
      if (arg_regs_protected && !(il->flags & ARG_REG_SETUP_IL)) {
         // after coloring, we can back-substitute the COPY src into
         // the next as long as the COPY isn't setting up for a CALL
         // (or the like).
         if (trace_trivial) {
            printf("[arc coalesce] OK to coalesce (unprotected):\n");
            print_il(il); print_il(next);
         }
         return TRUE;
      }
      // prior to coloring, we cannot delete this COPY.
      return FALSE;
   }
   else if IS_MACHINE_REG(r2) {
      // we can replace the virtual register in r1 with this
      // machine register since we will only be extending the
      // lifetime by exactly one instruction.
      if (trace_trivial) {
         printf("[arc coalesce] OK to coalesce (r2 machine reg):\n");
         print_il(il); print_il(next);
      }
      return TRUE;
   }
   bool r1_spilled, r2_spilled;
   r1_spilled = (regtab[r1].rclass & SPILL_CLASS) != 0;
   r2_spilled = (regtab[r2].rclass & SPILL_CLASS) != 0;
   return virtuals_OK(r1,r1_spilled,r2,r2_spilled,il,next,1);
   }
else {
   if (prev == NULL || !coalescable(il,prev)) {
      // cannot back-substitute into things like ARGDEFs....
      return FALSE;
   }
// NOPs are generated by SSA to constrain lifetimes. We never
// want to generate this:
//    NOP    %r0 <-
// \  COPY   %r18 <- %r0
if (prev->op == il_NOP) return TRUE;
// now, we're looking at the tougher case. Can we replace the current
// opd with the destination and replace the definition of the opd with
// the dest of this IL?
//
// Basically, we're looking for this:
//    op    ra <- ...
//    ...
//    op    rc <- ra_,rb
// This is problematic for us due to the SPILL_CLASS
// that we use during reg_to_spill_to(). Here is the problem:
//    if the register ra_ was spilled, and the dest of IL is a
//    compressable register, then we cannot color across
//    the span (since we spilled to a non-compressable register,
//    we know that there are not enough compressable registers
//    to color this span).
// The only time we can coalesce these two is if there is no
// other instruction between the definition and this use.
// The other time we can do it is if the dest reg of this IL
```

```
        // is also a non-compressable register, then we know that we
        // can safely back-substitute it.
        Register ra = oREG(*opd);// opd == SRCN(il,n) && opd == DEST(prev)
        Register rc = r;    // DEST(il)
        if (ra == rc) return FALSE;
        if (interferes_with(ra,rc) &&
           !(rc == LP_COUNT_REG && il->op == il_COPY)) {
              // take into account things like MLO_REG or its rclass since
              // we cannot coalesce it with "normal" registers; the COPY
              // must be done here.
              return FALSE;
              }
        if IS_MACHINE_REG(ra) {
            if IS_MACHINE_REG(rc) {
               if (arg_regs_protected) {
                   if (il->op != il_COPY) return FALSE;
                   // after coloring, we can do this if the previous was
                   // not setting up for a call. But we can be deceived
                   // with things like loading from the small data
                   // area since we really want to use %r0, but if we
                   // force a copy afterwords, then it's useless. If this
                   // was truly an arg register, then it would be alive
                   // after this IL.
                   if ((prev->flags & ARG_REG_SETUP_IL) == 0 ||
                      opd->dead) {
                      if (trace_trivial) {
                          printf("[arc coalesce] OK to coalesce"
                              " (unprotected):\n");
                          print_il(prev); print_il(il);
                          }
                      return TRUE;
                      }
                   }
               return FALSE;
               }
            else if IS_MACHINE_REG(rc) {
               // 'ra' is virtual and 'rc' is a machine register. Always OK
               // when 'prev' is really previous. Otherwise, we may make
               // the graph uncolorable since we're potentially extending
               // the lifetime of a machine register.
               if (prev_executable_il(il) == prev && rc != LP_COUNT_REG) {
                  if (trace_trivial) {
                      printf("[arc coalesce] OK to coalesce (prev is prev):\n");
                      print_il(prev);
                      print_il(il);
                      }
                  return TRUE;
                  }
               return FALSE;
               }
            else {
               bool ra_spilled = (prev->flags & SPILL_IL) != 0;
               bool rc_spilled = (il->flags & SPILL_IL) != 0;
               return virtuals_OK(ra,ra_spilled,rc,rc_spilled,il,prev,0);
               }
        }
```

```
    return FALSE;
  } static void set_destruct_il_and_refine_reg_classes(IL_entry *il) {
    if (trace_expand)
        {
          printf("REFINE: ");
          print_il(il);
        }
#   define make_non_destruct(il)    (1 && ((il)->flags &= ~DESTRUCT_IL))
    // for code compression, we want trinaries and unaries in the form
    // of a <- a,b or a <- a
    // these forms can be compressed down to 16-bit instrs. with some
    // additional constraints on imm size etc. Colorer needs to see
    // DESTRUCT_IL as a hint so it commons up src1 with the dest
    // whenever possible...
    bool f = il->def_cnt() == 1 && DEST(il).type == REG_i
                && oREG(DEST(il)) == STATUS_REG
       ||   il->def_cnt() == 2 && DEST2(il).type == REG_i
                && oREG(DEST(il)) == STATUS_REG;
    switch (il->op) {
      case il_PSEUDO:
          switch (PSEUDO_NO(il))
            {
            case MPYADD_func:
            case MPYSUB_func:
                make_destructive_and_nonreversable(il);
                if (!f) make_comp_il(il);
                break;
            case BSET_func:
            case BCLR_func:
            case BXOR_func:
            case BMSK_func:
                make_destructive_and_nonreversable(il);
                if (!f && IS_IMM_OPD(SRC2(il))
                        && is_u5(int_value(SRC2(il))))
                  make_comp_il(il);
                else
                  make_non_destruct(il);
                break;
            case BTST_func:
                if (IS_IMM_OPD(SRC2(il)) && is_u5(int_value(SRC2(il))))
                  make_comp_il(il);
                break;
            case RSUB_func:
                make_destructive_and_nonreversable(il);
                if (SRC2(il).type == REG_i
                  || IS_IMM_OPD(SRC2(il)) &&
                  is_u6(int_value(SRC2(il))))
                    make_non_destruct(il);
                break;
            default:
                // assume the best
                if (!f) make_comp_il(il);
                break;
            }
          break;
```

```
case il_CMP: case il_CMPU:
    if (il->src_cnt() == 2)    // int cmp
      {
      if (IS_IMM_OPD(SRC2(il)) && is_u7(int_value(SRC2(il))))
               ||
        SRC1(il).type == REG_i && SRC2(il).type == REG_i)
          make_comp(SRC1(il));
      }
    else                   // long long
      {
      if (IS_IMM_OPD(SRC3(il)) && is_u7(int_value(SRC3(il))))
               ||
        SRC1(il).type == REG_i && SRC3(il).type == REG_i)
          make_comp(SRC1(il));
      if (IS_IMM_OPD(SRC4(il)) && is_u7(int_value(SRC4(il))))
               ||
        SRC2(il).type == REG_i && SRC4(il).type == REG_i)
          make_comp(SRC2(il));
      }
    break;
case il_SRA: case il_SLL: case il_SRL:
    make_destructive_and_nonreversable(il);
    if (!f && (SRC2(il).type == REG_i
         || IS_IMM_OPD(SRC2(il)) && int_value(SRC2(il)) == 1))
      make_comp_il(il);
    break;
case il_EXTZB: case il_EXTSB: case il_EXTZH: case il_EXTSH:
    il->flags |= DESTRUCT_IL;
    if (!f && SRC1(il).type == REG_i)
      make_comp_il(il);
    break;
case il_ANDNOT:
    make_destructive_and_nonreversable(il);
    // fallthru
case il_AND: case il_OR: case il_XOR:
    {
    bool isimm = IS_IMM_OPD(SRC2(il));
    int v = 0;
    bool is_bit_candidate = FALSE;
    if (isimm)
      {
      v = int_value(SRC2(il));
      if (il->op == il_AND)
          is_bit_candidate = power_of_two(v+1,0)
             || power_of_two(v,0) && oREG(DEST(il)) == STATUS_REG;
      else
          is_bit_candidate = power_of_two(v,0);
      }
    il->flags |= DESTRUCT_IL;
    if (is_bit_candidate)
      make_comp_il(il);
    else if (IS_IMM_OPD(SRC2(il)) &&
      In_range(int_value(SRC2(il)),0,63))
      make_non_destruct(il);
    else if (!f && SRC2(il).type == REG_i)
      make_comp_il(il);
    }
```

```
      break;
case il_SUB:
    make_destructive_and_nonreversable(il);
    if (!f && SRC1(il).type == REG_i &&
           (SRC2(il).type == REG_i
           || IS_IMM_OPD(SRC2(il)) &&
              is_u5(int_value(SRC2(il)))))
      make_comp_il(il);
    break;
case il_ADD: case il_ADDA:
    il->flags |= DESTRUCT_IL;
    if (!f && SRC1(il).type == REG_i &&
           (SRC2(il).type == REG_i
           || IS_IMM_OPD(SRC2(il)) &&
              is_u7(int_value(SRC2(il)))))
      make_comp_il(il);
    break;
case il_NOT:
case il_NEG:
case il_ABS:
    if (!f && SRC1(il).type == REG_i)
      make_comp_il(il);
    break;
case il_COPY:
    // Hmmmm???
    // Except for copies to/from machine regs, assume compressed
    if (regtab[oREG(SRC1(il))].recomputable)
      make_comp_il(il);
    else if (!In_range(oREG(DEST(il)),R0,R3)
            && !In_range(oREG(SRC1(il)),R0,R3))
      make_comp_il(il);
    break;
case il_ARGDEF:
case il_DEFINE:
    break;
case il_CALL:                                  (
case il_XCALL:
    break;
case il_LOAD:
case il_LOADU:
case il_STORE:
    // these may be refined further
    // but only with carefull analysis of the ea's
    make_comp_il(il);
    break;
case il_LA:
    // probably a pcld
    make_comp_il(il);
    break;
case il_LI:
    if (IS_IMM_OPD(SRC1(il)) && il->len <= 4)
       {
       int v = int_value(SRC1(il));
       if (!f && is_u8(v) || !is_s12(v))
          make_comp(DEST(il));
       }
    else
```

```
               // a pcld
               make_comp(DEST(il));
            break;
         default:
            // for any that we miss, assume best case
            // and make it compressable
            if (!f) make_comp_il(il);
            break;
      }
   }

/*--------------------------------------------------------------
   Post-spill fixup phase.

Here we run a mini-expander after spilling to clean up instructions
   inserted by the spiller.  spiller inserts instructions that create
   new opportunities for merging of load addresses with following
   loads and stores.
*/

/*
 * Process a basic block.
 */
static bool post_spill_process_node(Node_entry *bp) {
   bool did_something = FALSE;
   clear_rtab();
   for_each_il(il,bp) {
      if (trace_expand || print_post_spill_fixup_tog) {
         printf("looking at: "); print_il(il);
      }
      /*
       * Process according to opcode.
       */
      switch(il->op) {
         case il_LA: {
do_LA:               ;
            IL_entry *changed = il;
            if ( check_merge_la_la(il) ) {
               if (print_post_spill_fixup_tog) {
                  printf("POST_SPILL_FIXUP DID LA_LA near line %d\n",
                     line_number);
                  printf("..now: "); print_il(il);
               }
               did_something = TRUE;
            }
            il = changed;
         } break;

case il_SUB:
            if (!(il->flags & SPILL_IL)) {
               // nothing to be concerned about...
               break;
            }
         case il_ADD: case il_ADDA: {
            if (il->flags & SPILL_IL) {
               // we allow spilling of addresses into srcs.
               // so we can get some interesting calculations...
```

```
//      ADDA    r1 <- section x,2052,-128
//      ADD     r2 <- 2052,var y,12
//      SUB     r3 <- r2,var y,2072
//      SUB     r3 <- var y,r2,2072
// the added opd always belongs to the address....
// so in the last case, that would be var y[2072] - r2
// SPILL_IL is set when an address is back-substituted.
// (which means that the spiller, in conjunction with
// back_substitute_address(), only allowed a GLOBAL_i,
// VAR_i, or SECTION_i to come through). Also note that
// back_substitute_address() allows the address into
// the second source...
if (Oneof3(SRC2(il).type,GLOBAL_i,VAR_i,SECTION_i) &&
    IS_IMM_OPD(SRC1(il))) {
    // we're going to convert this into an LA
    IL_opd t = SRC1(il); SRC1(il) = SRC2(il); SRC2(il) = t;
}
if Oneof3(SRC1(il).type,GLOBAL_i,VAR_i,SECTION_i) {
    if (IS_IMM_OPD(SRC2(il)) &&
        il_opd_cnt(il) > 3 && IS_IMM_OPD(SRC3(il))) {
        // common up the 2 constants and convert this
        // into an LA.
        int v2 = int_value(SRC2(il));
        int v3 = int_value(SRC3(il));
        if (il->op == il_SUB) v2 = -v2;
        cvt_to_rri_instr(il,il_LA,DEST1(il),SRC1(il),v2+v3);
        goto do_LA;
    }
    else if (il_opd_cnt(il) == 3 && IS_IMM_OPD(SRC2(il))) {
        if (il->op == il_SUB) {
            int v2 = int_value(SRC2(il));
            make_int_opd(&SRC2(il),-v2);
        }
        il->op = il_LA;
        goto do_LA;
    }
    else if (SRC2(il).type == REG_i) {
        if (il->op == il_SUB) {
            // leave this for code generator to handle...
            break;
        }
        else {
            // code gen wants to see memref in src2.
            IL_opd t = SRC1(il);
            SRC1(il) = SRC2(il);
            SRC2(il) = t;
        }
    }
}
if (il->op == il_SUB) {
    break;
}
}
IL_entry *new_il = check_merge_la_adda(il);
if (new_il != il) {
    if (print_post_spill_fixup_tog) {
        printf("POST_SPILL_FIXUP DID LA_ADDA near line %d\n",
```

```
                    line_number);
                printf("..now: "); print_il(new_il);
                }
            did_something = TRUE;
            }
        else {
            new_il = check_merge_la_adda2(il);
            if (new_il != il) {
                if (print_post_spill_fixup_tog) {
                    printf("POST_SPILL_FIXUP DID LA_ADDA2 near"
                        " line %d\n",
                        line_number);
                    printf("..now: "); print_il(new_il);
                    }
                did_something = TRUE;
                }
            }
        il = new_il;
        } break;

case il_LOADU: case il_LOAD: case il_STORE: {
    if ( check_merge_la_ldst(il) ) {
        if (print_post_spill_fixup_tog) {
            printf("POST_SPILL_FIXUP DID LA_LDST near line %d\n",
                line_number);
            printf("..now: "); print_il(il);
            }
        did_something = TRUE;
        }
    if (il->op == il_STORE) {
        if (check_merge_mlo_store(il)) did_something = TRUE;
        }
    } break;

case il_KILL:
    if (DEST(il).type == REG_i) kill_reg(oREG(DEST(il)),il);
    goto skip_def_use;

case il_LINE:
    line_number = oSHORT(SRC1(il));
    break;

case il_CALL: case il_XCALL: case il_ASMCALL: case il_ASM: {
    bool xcalls_present = calls_present;
    bool xnon_saving_calls_present = non_saving_calls_present;
    handle_call(il);
    calls_present = xcalls_present;
    non_saving_calls_present = xnon_saving_calls_present;
    } break;
case il_KILL_MACHINE_REGS: {
    Register r, rend;
    rend = use_sdata_tog ? GP_REG : FP_REG;
    for (r = R0; r < rend; r++) kill_reg(r,il);
    kill_reg(STATUS_REG,il);
    goto skip_def_use;
    }
default:
```

```
          break;
        }
      def_use_il(il);
skip_def_use: ;
    } end_for return did_something;
    }

PUBLIC bool post_spill_fixup(int spilling_happened) {
    bool did_something = FALSE;
    expand_where = EXPAND_SPILL;
    if (spilling_happened) {
      redo_live_dead = TRUE;
      expand_cleanup_graph(AFTER_EXPAND);
      }
    if (print_phases) printf("Post-spill fixup\n");
    if (print_post_spill_fixup_tog) {
      printf("[X]Output before post_spill_fixup:\n");
      display_flow_graph();
      }
    alloc_tables();
    for_each_node(bp,n) {
      if (delete_superfluous_spills(bp)) did_something = TRUE;
      if (post_spill_process_node(bp)) did_something = TRUE;
      } end_for;
    if (did_something) {
      expand_cleanup_graph(spilling_happened ? AFTER_EXPAND : AFTER_SSA);
      }
    did_something += force_trivial_coalescing(tc_from_expand);
    protect_arg_regs();
    free_tables();
    if (print_post_spill_fixup_tog) {
      printf("[spill arc] Output after post_spill_fixup:\n");
      display_flow_graph();
      }
    return did_something;
    }

/*---------------------------------------------------------------------------
*/
static int something_in_rtab = 0;
static void clear_candidates(int line) {
    if (something_in_rtab) {
      clear_rtab();
      something_in_rtab = 0;
      }
    if (trace_expand) {
      printf("clear_candidates called from line=%d\n",line);
      }
    return;
    } static void replace_all_uses(IL_entry *to,Register vreg,Register mreg) {
    IL_entry *q = next_executable_il(to);
    for (IL_entry *p = rtab[vreg].def; p != q; p = next_executable_il(p)) {
      void use(IL_opd *o) {
```

```
        switch (o->type) {
          case REG_i: {
              if (oREG(*o) == vreg) {
                SET_oREG(*o,mreg);
                if (trace_expand) {
                    printf("pre-coloring: "); print_il(p);
fflush(stdout);
                }
              }
            } break;
          case EA_i: {
              for_each_ea_opd(o1,oEA(*o)) { use(o1); } end_for
              } break;
          }
        }
    for_each_opd(o,p) { use(o); } end_for
    }
    // typically, we have only one thing in the rtab at a time, if so,
    // we can zero out the rtab quickly....
    IL_entry *x = rtab[vreg].def;
    rtab[vreg].def = NULL; something_in_rtab--;
    clear_candidates(__LINE__);
    rtab[mreg].def = x; something_in_rtab++;
    if (trace_expand) {
      printf("..%%r%d is alive: ",mreg-R0); print_il(x);
      }
    return;
    } static void check_side_effects(IL_entry *p,Register reg) {
    if (!something_in_rtab) return;
    // any killing of %r0 invalidates and candidates for direct %r0
assignment.
    // this is also true for a direct assignment into %r0 as well.
    if (HAS_SIDE_EFFECTS(p)) {
      for_each_reg_modified_by(r,p) {
          if (r == reg) {
            clear_candidates(__LINE__);
            return;
            }
          } end_for
      }
    if (HAS_OBJECT_SIDE_EFFECTS(p)) {
      for o,r,rs,ws <- machine->each_implicit_object(p) do {
          if (r == reg && Oneof3(ws,MAYBE_WRITTEN,IS_WRITTEN,IS_TRASHED)) {
            clear_candidates(__LINE__);
            return;
            }
          }
      }
    for_each_def_opd(o,p) {
      if (o->type == REG_i) {
        Register r = oREG(*o);
        if (rtab[r].def != NULL) {
          rtab[r].def = NULL;
          something_in_rtab--;
          return;
```

```
                }
            else if (r == reg) {
                clear_candidates(__LINE__);
                return;
                }
            }
        } end_for
    return;
    } static void pre_color(void) {
    clear_rtab();
    for_each_node(bp,n) {
        for_each_reg_live_on_input(rp,n) {
            if (*rp == R0) {
                goto next_node;
                }
            } end_for
        if (trace_expand) {
            printf("[pre-color] looking at node=%d\n",n); fflush(stdout);
            }
        for_each_il(il,bp) {
            if (trace_expand) {
                printf("..looking at: "); print_il(il); fflush(stdout);
                }
            for_each_reg_src_opd(o,il) {
                if (!o->dead) continue;
                Register r = oREG(*o);
                if (!IS_MACHINE_REG(r) && rtab[r].def != NULL) {
                    replace_all_uses(il,r,R0);
                    }
                if (il->op == il_COPY &&
                   DEST1(il).type == REG_i && SRC1(il).type == REG_i &&
                   oREG(DEST1(il)) == oREG(SRC1(il))) {
                    IL_entry *t = il;
                    il = il_prev(il);
                    if (trace_expand) {
                        printf("superfluous: "); print_il(t);
                        }
                    unlink_il(t,bp);
                    goto next_il;
                    }
                } end_for
            check_side_effects(il,R0);
            for_each_def_opd(o,il) {
                if (o->type == REG_i && oREG(*o) == R0) {
                    if (trace_expand) {
                        printf("..%%r0 is alive: "); print_il(il);
                        }
                    rtab[R0].def = il;
                    something_in_rtab++;
                    }
                } end_for
            switch (il->op) {
              case il_LOAD: case il_LOADU: case il_LA: {
                    Register r1 = oREG(DEST1(il));
                    if (IS_MACHINE_REG(r1)) {
```

```
                if (r1 == R0) {
                    clear_candidates(__LINE__);
                    rtab[R0].def = il;
                    something_in_rtab++;
                }
              break;
            }
            if (machine->preferred_machine_reg(il,&DEST1(il)) == R0) {
              if (rtab[R0].def != NULL) {
                if (trace_expand) {
                  printf("..not a candidate, %%r0 is alive: ");
                  print_il(il,stdout);
                }
              }
              else {
                if (trace_expand) {
                  printf("R%d is candidate and defined by: ",r1);
                  print_il(il); fflush(stdout);
                }
                rtab[oREG(DEST1(il))].def = il;
                something_in_rtab++;
              }
            } break;
          }
next_il:    ;
          } end_for
next_node: ;
        clear_candidates(__LINE__);
        } end_for
    return;
    } static void compute_machine_regs_written_before_coloring() { memset(machine_regs_written_before_coloring,0,sizeof(machine_regs_written_b
efore_coloring));
    for_each_node(bp,n) {
      for_each_il(il,bp) {
        for_each_def_opd(optr,il) {
          if (optr->type == REG_i) {
            Register r = oREG(*optr);
            if (r < _NELEM(machine_regs_written_before_coloring)) {
              machine_regs_written_before_coloring[r] = TRUE;
            }
          }
        } end_for;
        if (HAS_OBJECT_SIDE_EFFECTS(il)) {
          for o,r,rs,ws <- machine->each_implicit_object(il) do {
            if (ws != NOT_WRITTEN &&
              r < _NELEM(machine_regs_written_before_coloring)) {
              machine_regs_written_before_coloring[r] = TRUE;
            }
          }
        }
        if (HAS_SIDE_EFFECTS(il)) {
          for_each_reg_modified_by(r,il) {
```

```
                if (r < _NELEM(machine_regs_written_before_coloring)) {
                  machine_regs_written_before_coloring[r] = TRUE;
                }
              } end_for;
            }
          } end_for;
      } end_for;
    }
```

APPENDIX VII

© 2000-2002 ARC International. All rights reserved.

```
// routine to determine if number-of-instrs (cnt) is within
// the limit based on cuirrent model.
//
static bool icount_within_range(int cnt)
  {
  int max_ops = 0;
  if (xmult32_tog) {
     if (optimize_for_space) max_ops = 1;
     else {
        // the fast multiplier is 2 clks. The slow is 10.
        // maybe we need a -X to tell us to use the slow . . .
        max_ops = 2;
        }
     }
  else if (optimize_for_space) max_ops = 8;
  else max_ops = 17;
//fprintf(stderr, "cnt=%d,max_ops=%d\n", cnt, max_ops);
  return (max_ops >= cnt);
  }
// insert_mpyadd
//
// used to generate pseudo.MPYADD/MPYSUB instruction
//
static IL_entry * insert_mpy_pseudo(IL_entry *p, int pseudo, int multiplier,
            Register dest, Register src1, Register src2)
  {
  p = alloc_n_after(p, il_PSEUDO, REGSIZE, 1, 3);
  DEST1(p).type = REG_i; SET_oREG(DEST1(p), dest);
  SRC1(p).type = REG_i; SET_oREG(SRC1(p), src1);
  SRC2(p).type = REG_i; SET_oREG(SRC2(p), src2);
  make_int_opd(&SRC3(p), multiplier);
  SET_ PSEUDO _NO(p,pseudo);
  return p;
  }
// mikes_screwy_factors(. .)
//
// return list of factors; return 0 if cant be factored conveniently.
// If this routine returns 0, then we fall back on original constmpy
//
// These are actial factors -- not just bit shifts. So the
// array is an int array.
//
// e.g. . . . .
//    30 --> 2 * 5 * 3
//    -28 -> -7 * 4
//
// work area (saved for posterity. . . . .
// 1:                          neg
// 2:lsl 1                       add,ne (4)
// 3:addl                      sub2 (4)
// 4: lsl 2                      lsl 2; neg (4)
// 5 add2                      add2; neg (4)
// 6: add; add1; (4)              add; sub3 (6)
// 7: lsl 3; sub (4)              sub3; (4)
// 8: lsl 3                      lsl 3; neg (4)
// 9: add3;                      neg; add3 (4)
// 10: add; add2 (4)              neg (6)
// 11: add3; add1 (6)             neg (8)
// 12: lsl 2; add1 (4)            lsl 2; sub2 (6)
// 13:
// 14: lsl 4; sub1 (6)            add; sub3 (6)
// 15: add1; add2 (4)             sub2; add2 (6)
// 16: lsl 4                      neg
// 17: lsl 4; add (4)             neg
// 18: add; add3 (4)              neg
// 19: lsl 4; add2; sub (6)       neg
// 20: lsl 2; add 2               neg
// 21: 7 * 3 (6)               sub3, add1
//
```

APPENDIX VII-continued

© 2000-2002 ARC International. All rights reserved.

```
static int mikes_screwy_factors(int *factors, int val);
#if 0
static void display_factors(int val, int fc, int *facts)
  {
  int x;
  printf("FACTORS FOR %3d cnt=%d", val, fc);
  for (x = 0; x < fc; x++) printf (" %d", facts[x]);
  printf("\n") ;
  }
endif
static int find_fact(int val, int *facts, int *rem)
  {
  int *xp;
  for (xp = facts; *xp; xp ++)
    {
    int fl = val / *xp;
    int ml = val % *xp;
    if (ml == 0) { *rem = fl; return *xp; }
    }
  return 0;
  }
static int factor (int *factors, int m, int rem)
  {
  factors [0] = m;
  if (rem == 1) return 1;
  int x = mikes_screwy_factors (factors + 1, rem);
  if (x) x ++;
  return x;
  }
static int mikes_ screwy_ factors(int *factors, int val)
    {
    // arrays of optimal factors for positve and negative multipliers
    static int pfacts[ ] ={ 9, 5, 3, 0 };
    static int nfacts[ ] ={ 7, 3, 0 };
    int fc = 0;
    int x, rem;
    if (val == 0) return 0;
    if (val < 0)
      {
      int av = _abs (val);
      if (val == 0x80000000) return 0;
      x = find_fact(av, nfacts, &rem);
      // special caveate for factor −3. . . if −9 is also a factor, abort
      if (x == 0 | | x == 3 && (av % 9) == 0) x = 1, rem = av;
      return factor(factors, −x, rem);
      }
    // positive val
    // look for power of 2
    x = 0;
    if ((val & 3) == 2) x++, val >>= 1);
    else if (xbarrel_shifter_tog)
       for (x = 0; (val & 1) == 0; x++, val >>= 1);
    if (x) return ( factor(factors, 1<<x, val));
    // now try screwy positive factors
    x = find_fact(val, pfacts, &rem);
    if (x) return factor(factors, x, rem);
    return 0;
    }
static bool reduce_mikes_screwy_factors(IL_entry *il, int fc, int *facts)
    {
    Register src = oREG(SRC1(il));
    Register dest = oREG(DEST(il));
    IL_entry *p = il;
    int shiftby = 0;
    // According to factor, produce mult instruction
    for (int x = 0; x < fc; x++)
        {
        int f = facts[x];
        if (f < 0)
          {
          // negative factors are either −1, −3 or −7
          if (f == −1)
             p = insert_rr(p, il_NEG, 4, dest, src, FALSE);
          else
             // −3 or −7
             p = insert_mpy_pseudo(p, MPYSUB_func, −f + 1, dest, src, src);
          }
```

APPENDIX VII-continued

© 2000-2002 ARC International. All rights reserved.

```
    else, if (power_of_two(f, &shiftby))
        {
        if (f == 2)
            p = insert_rrr(p, il_ADD, 4, dest, src, FALSE, src, FALSE);
        else
            p= insert_rri(p, il_SLL, 4, dest, src, FALSE, shiftby);
        }
    else // positive factor
        p = insert_mpy_pseudo(p, MPYADD_func, f-1, dest, src, src);
    // now set src to dest -- all other computation is destructive
    src = dest;
    if (trace_expand) {printf(". . added: "); print_il (p);)
    }
    unlink_il(il, NULL);
    return TRUE;
}
static int shift_cnt(unsigned x) {
    // examples . . .
    // x=y*32
    //     mov      z,0
    //     add3     t1, z, y;    y*8
    //     add2     x, z, t1;         (y*8)*4
    // x=y*256
    //     mov      z,0
    //     add3     t1, z, y;    y*8
    //     add3     t2, z, t1;   (y*8)*8
    //     add2     x, z, t2;         ((y*8)*8)*4)
    int swap = 0;
    if (xswap_tog && x >= 16) {
        // easy way to get rid of 16-bits: mask and then swap
        swap = 2; x -= 16;
    }
    int add3s = x / 3; x -= (add3s * 3);
    int add2s = x / 2; x -= (add2s * 2);
    int add1s = x;
    return add3s+add2s+add1s+swap;
    }
//
// Rotine to take a stand-alone multiplier const and determine
// if it is factorable or reducable without knowing anything
// else about its context.This is required for immediat_opd_permitted
//
PUBLIC bool will_reduce_mpy(Register dst, Register src, long multiplier,
            signed char stack[17], int *sp, int from_ssa);
PUBLIC bool mpy_is_factorable(int val)
    {
    int facts[32];
    int ic = mikes_screwy_factors(facts, val);
    if (ic) return icount_within_range(ic);
    signed char stack[17];
    int dummy;
    return will_reduce_mpy(R0, R1, val, stack, &dummy, FALSE);
    }
// Routine to examine an IL as to whether it is recudable
PUBLIC bool will_ reduce_mpy(Register dst, Register src, long multiplier,
            signed char stack[17], int *sp, int from_ssa) {
    static int facts[32];
    int ic = mikes_screwy_factors(facts, multiplier);
    *sp = constmpy(multiplier < 0 ? -multiplier : multiplier, stack);
    // calculate out how many instructions this will take
    int k = *sp, cnt = (src == dst || from_ssa) ? 2 : 0;
    while (k > 0) {
    int ts = stack[--k];
    int shift = _abs(ts);
    switch (shift) {
      case 1. . 3:
        if (ts > 0) {
          // we can generate MPYADD sequence
          cnt++;
          break;
          }
        /* fall-thru */
      default:
        if (!xbarrel_shifter_tog) {
          // we can only do one bit at a time (unless we can
          // generate a smaller sequence off addX/shifts)
          int icnt = shift_cnt(shift);
          cnt += icnt;
```

APPENDIX VII-continued

© 2000-2002 ARC International. All rights reserved.

```
            if (ts < 0) {
                // see comments below on why we need to generate SUB
                cnt++;
            }
        }
        else {
            // each shift-by requres a shift and an add/sub
            cnt += 2;
        }
        break;
        }
    }
    if (multiplier < 0 && (-multiplier != multiplier)) {
        // we need to negate the results
        cnt++;
    }
    // ok, we now have the number of shifts/adds, mpyadds, and mpysubs
    // that we will need. Is it profitable to do so?
    return icount_within _range(cnt);
}
PUBLIC bool a5_reduce_MPY(IL_entry *il, int from_ssa,
            Register (*get_reg)(type_class tc, int len, IL_entry *il)) {
    if (il->len > REGSIZE) return FALSE;
    signed char stack[17];
    int fstack[17];
    long multiplier = int_value(SRC2(il));
    if (il->op == il_SLL) multiplier = 1 << multiplier;
    int len = il->len;
    int sp = 0;
    if (multiplier == 0) {
        il->op = il_LI;
        make_int_opd(&SRC1(i1),0);
        il->set_src_cnt(1);
        return TRUE;
    }
    // fc indicates number of factors
    // if we found a way to reduce it to these factors, then
    // the sequence will always be smaller/faster then the normal way
    // So jump to the special routine for these factors
    int fc = mikes _ screwy_ factors(fstack, multiplier);
    if (fc) return reduce mikes_screwy_factors(il, fc, fstack);
    Register src = oREG(SRC1(il));
    Register dest = oREG(DEST1(il));
    if (!will_reduce_mpy(dest, src, multiplier, stack, &sp, from_ssa))
        return FALSE;
    // ok, now generate the instructions
    IL_entry *p = il;
    Register original_src = src;
    // for non-fc model use temp reg if needed
    if (sp > 1 && src == dest) {
        original_src = TEMP_REG;
        p = insert_rr(p, il_COPY, len, original src, src, TRUE);
        if (trace_expand) {printf(". . added: "); print_il(p); }
    }
    Register zreg = null_reg;
    int ts = 0,shift_amount = 0;
    IL_opcode op = il_ADD;
    //////////////////////////////////////////////////////
    void make_mpyadd(int shift_amount, Register original_src) {
        p = alloc_IL_after(p, il_PSEUDO, REGSIZE, 1, 3);
        DEST1(p).type = REG_i; SET_oREG(DEST1(p), dest);
        SRC1(p).type = REG_i; SET_oREG(SRC1(p), original_src);
        SRC2(p).type = REG_i; SET_oREG(SRC2(p), src);
        make_int_opd (&SRC(p), 1 << shift_amount);
        SET_PSEUEDO_NO (p, MPYADD func);
        if trace_expand) {printf(". . added: "); print_il(p); }
    }
    //////////////////////////////////////////////////////
    void maybe_cvt_to_lsl (void) {
        if (p->op == il_PSEUDO &&
            int_value(SRC3(p) ) == 2 && oREG(SRC1(p) ) == zreg) {
            // let this shrink down to a compresssable instr.
            p->op = il_SLL;
            p->cond = Cond_NULL;
            SRC1(p) = SRC2(p);
            make_int_opd (&SRC2(p),1);
```

APPENDIX VII-continued

© 2000-2002 ARC International. All rights reserved.

```
            p->set_src_cnt(2);
            if (trace_expand) {printf(". . changed: "); print_il(p);}
        }
    }
//////////////////////////////////////////////////////////////
void do_shifts(void) {
    if (zreg == null_reg) {
        IL_entry *li = alloc_IL_after(p, il_LI, REGSIZE,1,1);
        make_int_opd (&SRC1(li), 0);
        zreg = get_reg(tc_INT, REGSIZE, li);
        DEST1(li).type = REG_i;
        SET_oREG (DEST1(li), zreg);
        p = li;
        if (trace_expand) {printf(". . added: "); print_il(p);}
    }
    if (xswap_tog && shift_amount >= 16) {
        p = insert_rri(p,il_AND, len, dest, src, FALSE, 0xffff);
        if (trace_expand) {printf(". . added: "); print_il(p); }
        src = dest;
        p = insert_rr(p,il PSEUDO, len, dest, src, FALSE);
        SET_PSEUDO_NO (p, ARC_SWAP_func);
        shift_ amount -= 16;
        src = dest;
        if (trace_expand) {printf (". . added: "); print_il(p);)
    }
    int add3s = shift_amount / 3; shift_amount -=(add3s * 3);
    for (int i = 0; i < add3s; i++) {
        make_mpyadd(3, zreg);
        src = dest;
    }
    int add2s = shift_amount / 2; shift_amount -=(add2s * 2);
    for (int j = 0; j < add2s; j++) {
        make_mpyadd(2, zreg);
        src = dest;
    }
    int add1s = shift_amount;
    for (int k = 0; k < add1s; k++) {
        make_mpyadd(1, zreg);
        src = dest;
    }
    return;
}
//////////////////////////////////////////////////////////////
while (sp > 1) {
    ts = stack[--sp];
    if (ts < 0) {shift_amount = -ts; op = il_SUB; }
    else {shift_amount = ts; op = il_ADD; }
    if (Oneof3(shift_amount, 1, 2, 3) && op == il_ADD) {
        make_mpyadd(shift_amount, original_src);
    }
    else if (xbarrel_shifter_tog) {
        p = insert_rri(p, il_SLL, len, dest, src, FALSE, shift_amount);
        if (trace_expand) {printf(". . added: "); print_il(p);)
        p = insert_rrr(p, op, len, dest, dest, FALSE, original_src, FALSE);
        if (trace_expand) (printf(". . added: "); print_il (p);)
    }
    else {
        do_shifts( );
        if (op == il_ADD) {
            // fixup last mpyadd to reflect the next add as well
            SET_oREG(SRC1(p), original_src);
            if (trace_expand) {printf(". . added: "); print_il (p);}
        }
        else {
            // we need to generate the SUB because of
            // signedness problems. The problem is that we
            // don't know the sign of the first src.
            maybe_cvt_to_lsl( );
            P =
                insert_rrr(p, il_SUB, len, dest, dest, 0, original_src,0);
            if (trace_expand) {printf(". . added: "); print_il(p);}
        }
    }
    src = dest;
}
```

APPENDIX VII-continued

© 2000-2002 ARC International. All rights reserved.

```
if (stack[0]) {
   // this last one is always a positive shift
   shift_amount = stack[0];
if (xbarrel_shifter_tog) {
   p = insert_rri(p, il_SLL, len, dest, src, FALSE, stack[0]);
   if (trace_expand) (printf(". . added: "); print_il(p);}
   }
else {
   do_shifts( );
   maybe_cvt_to_lsl( );
   }
src = dest;
}
if (multiplier < 0 && (-multiplier != multiplier)) {
   p = insert_rr(p, il_NEG, len, dest, src, FALSE);
   if (trace_expand) {printf(". . added: "); print_il(p);}
   src = dest;
   }
if (src != dest) {
   p = insert_rr(p, il_COPY, len, dest, src, FALSE);
   if (trace_expand) {printf(". . added: "); print_il(p); }
   }
unlink_il(il, NULL);
return TRUE;
}
```

We claim:

1. A method of register allocation for use by a pipelined digital processor having a mixed-length instruction set architecture, the method executed by the processor and comprising:
   storing data in a register from a first set of registers, the first set of registers associated with a first instruction set of a first length;
   evaluating, using graph theory, whether spilling of the register from the first set of registers to a second set of registers is required, the second set of registers associated with a second instruction set of a second length; and
   responsive to evaluating that spilling is required, reassigning the data in the register from the first set of registers to a register from the second set of registers.

2. The method of claim 1, wherein the first instruction set of the first length comprises instructions of a 16-bit length and the second instruction set of the second length comprises instructions of a 32-bit length.

3. The method of claim 1, further comprising:
   responsive to evaluating that spilling is required, coalescing instructions associated with one or more registers from the first set of registers and the second set of registers to reduce a number of instructions.

4. The method of claim 3, wherein coalescing instructions comprises:
   determining a first version of a plurality of instructions associated with the first set of registers and the second set of registers, the first version determined according to the first instruction set of the first length;
   determining a second version of the plurality of instructions associated with the first set of registers and the second set of registers, the second version determined according to the second instruction set of the second length;
   determining for a portion of the plurality of instructions whether the first version or the second version is better in terms of size of instruction or number of instructions; and
   selecting the better version of the portion of the plurality of instructions.

5. The method of claim 4, wherein determining whether the first version or the second version is better is based on size of the portion of the plurality of instructions in the first version and second version.

6. The method of claim 4, wherein determining whether the first version or the second version is better is based on a number of instructions in the first version and second version of the portion of the plurality of instructions.

7. The method of claim 1, further comprising:
   assigning a different characteristic to the register that is going to be spilled; and
   performing a common sub-expression elimination process.

8. The method of claim 1, further comprising:
   assigning a priority to each register from the first set of registers.

9. The method of claim 1, further comprising:
   assigning a specific characteristic for at least one register from the first set of registers based at least in part on at least one of: (i) compressing a size of an instruction of the at least one register, or (ii) reducing an overall size of a compiled function.

10. The method of claim 1, further comprising:
    assigning characteristics to each register from the first set of registers and the second set of registers; and
    assigning a different characteristic to the register from the first set of registers that is going to be spilled.

11. A digital processor having a mixed-length instruction set architecture, the processor comprising:
    a first set of registers associated with a first instruction set of a first length; and
    a second set of registers associated with a second instruction set of a second length;
    wherein data stored in a register from the first set of registers is reassigned to a register from the second set of registers responsive to evaluating that spilling is required.

12. The digital processor of claim 11, wherein the first instruction set of the first length comprises instructions of a 16-bit length and the second instruction set of the second length comprises instructions of a 32-bit length.

13. The digital processor of claim 11, wherein instructions associated with one or more registers from the first set of registers and the second set of registers is coalesced to reduce a number of instructions responsive to spilling.

14. The digital processor of claim 13, wherein the digital processor is configured to reduce the number of instructions by:
- determining a first version of a plurality of instructions associated with the first set of registers and the second set of registers, the first version determined according to the first instruction set of the first length;
- determining a second version of the plurality of instructions associated with the first set of registers and the second set of registers, the second version determined according to the second instruction set of the second length;
- determining for a portion of the plurality of instructions whether the first version or the second version is better in terms of size of instruction or number of instructions; and
- selecting the better version of the portion of the plurality of instructions.

15. The digital processor of claim 14, wherein determining whether the first version or the second version is better is based on size of the portion of the plurality of instructions in the first version and second version.

16. The digital processor of claim 14, wherein determining whether the first version or the second version is better is based on a number of instructions in the first version and second version of the portion of the plurality of instructions.

17. The digital processor of claim 11, wherein the digital processor is configured to:
- assign a different characteristic to the register that is going to be spilled; and
- perform a common sub-expression elimination process.

18. The digital processor of claim 11, wherein each register from the first set of registers is assigned a priority.

19. The digital processor of claim 11, wherein the digital processor is configured to:
- assign characteristics to each register from the first set of registers and the second set of registers; and
- assign a different characteristic to the register from the first set of registers that is going to be spilled.

20. The digital processor of claim 11, wherein evaluating that spilling is required comprising using graph coloring for the evaluation.

* * * * *